US012066248B2

(12) United States Patent
Karkow et al.

(10) Patent No.: US 12,066,248 B2
(45) Date of Patent: Aug. 20, 2024

(54) BURNER SYSTEM INCLUDING A PLURALITY OF PERFORATED FLAME HOLDERS

(71) Applicant: ClearSign Technologies Corporation, Tulsa, OK (US)

(72) Inventors: Douglas W. Karkow, Mount Vernon, IA (US); James K. Dansie, Seattle, WA (US); Venkatesh Iyer, Bothell, WA (US); Donald Kendrick, Bellevue, WA (US); Colin James Deller, Tulsa, OK (US); Christopher A. Wiklof, Everett, WA (US)

(73) Assignee: ClearSign Technologies, Inc., Tulsa, OK (US)

( * ) Notice: Subject to any disclaimer, the term of this patent is extended or adjusted under 35 U.S.C. 154(b) by 726 days.

(21) Appl. No.: 17/014,589

(22) Filed: Sep. 8, 2020

(65) Prior Publication Data

US 2021/0063086 A1 Mar. 4, 2021

Related U.S. Application Data

(63) Continuation-in-part of application No. PCT/US2019/020988, filed on Mar. 6, 2019.
(Continued)

(51) Int. Cl.
*F27B 17/00* (2006.01)
*F23C 5/08* (2006.01)
(Continued)

(52) U.S. Cl.
CPC ............ *F27B 17/0016* (2013.01); *F23C 5/08* (2013.01); *F23D 11/406* (2013.01);
(Continued)

(58) Field of Classification Search
CPC .................... F27B 17/0016; F23C 5/08; F23C 2900/05081; F23D 11/406; F23D 14/145;
(Continued)

(56) References Cited

U.S. PATENT DOCUMENTS

| | | | | |
|---|---|---|---|---|
| 11,313,553 | B2 * | 4/2022 | Dansie | F23D 11/406 |
| 2011/0076628 | A1 | 3/2011 | Miura et al. | |
| 2018/0038589 | A1 | 2/2018 | Karkow et al. | |

FOREIGN PATENT DOCUMENTS

| | | | |
|---|---|---|---|
| EP | 0628146 | B1 | 12/1998 |
| JP | 402109127 | | 8/1990 |

(Continued)

OTHER PUBLICATIONS

Extended European Search Report for Application No. EP19763845.5 dated Mar. 14, 2023.

(Continued)

*Primary Examiner* — David J Laux
(74) *Attorney, Agent, or Firm* — Launchpad IP, Inc.; Christoper A. Wiklof; Harold H. Bennett, II

(57) ABSTRACT

A combustion system includes a fuel and oxidant source, a first distal flame holder body, a second distal flame holder body, and a thermal load. The fuel and oxidant source outputs fuel and oxidant. The first and second distal flame holder bodies simultaneously or alternately hold combustion reaction portions of the fuel and oxidant and/or of combustion products. The thermal load receives thermal energy from the first and second combustion reaction portions.

50 Claims, 34 Drawing Sheets

Related U.S. Application Data

(60) Provisional application No. 62/640,115, filed on Mar. 8, 2018.

(51) Int. Cl.

| | |
|---|---|
| ***F23D 11/40*** | (2006.01) |
| ***F23D 14/14*** | (2006.01) |
| ***F23D 14/70*** | (2006.01) |
| ***F23D 14/72*** | (2006.01) |
| ***F23Q 9/00*** | (2006.01) |
| ***F27D 1/00*** | (2006.01) |

(52) U.S. Cl.
CPC ........... *F23D 14/145* (2013.01); *F23D 14/70* (2013.01); *F23D 14/72* (2013.01); *F23C 2900/05081* (2013.01); *F23Q 9/00* (2013.01); *F27D 2001/0059* (2013.01)

(58) Field of Classification Search
CPC . F23D 14/70; F23D 14/72; F23Q 9/00; F27D 2001/0059
See application file for complete search history.

(56) References Cited

FOREIGN PATENT DOCUMENTS

| | | |
|---|---|---|
| JP | 404332306 | 11/1992 |
| WO | 2014127308 A1 | 8/2014 |
| WO | 2017124008 A1 | 7/2017 |

OTHER PUBLICATIONS

International Search Report and Written Opinion dated Jun. 21, 2019 for International Application No. PCT/US2019/020988.
Extended European Search Report for Application No. EP19763845.5 dated Nov. 23, 2021.

* cited by examiner

BURNER SYSTEM INCLUDING A PLURALITY OF PERFORATED FLAME HOLDERS

CROSS REFERENCE TO RELATED APPLICATIONS

The present application is a U.S. Continuation-in-Part (CIP) Application which claims priority benefit under 35 U.S.C. § 120 of co-pending International Patent Application No. PCT/US2019/020988, entitled "BURNER SYSTEM INCLUDING A PLURALITY OF PERFORATED FLAME HOLDERS," filed Mar. 6, 2019. International Patent Application No. PCT/US2019/020988 claims priority benefit from U.S. Provisional Patent Application No. 62/640,115, entitled "BURNER SYSTEM INCLUDING A PLURALITY OF PERFORATED FLAME HOLDERS," filed Mar. 8, 2018, now expired. Each of the foregoing applications, to the extent not inconsistent with the disclosure herein, is incorporated by reference.

SUMMARY

According to an embodiment, a combustion system includes a fuel and combustion air source and a distal flame holder complex configured to receive a fuel and combustion air mixture and provide adaptive combustion reaction positioning responsive to fuel flow, temperature, and thermal load conditions.

According to an embodiment, a combustion system includes a fuel and oxidant source configured to output a flow of fuel and oxidant along an axis and a first distal flame holder body aligned to receive at least a portion of the flow of fuel and oxidant from the fuel and oxidant source. The combustion system includes a second distal flame holder body aligned to receive a fluid flow from the first distal flame holder body, the fluid flow comprising at least one of the flow of fuel and oxidant received by the first distal flame holder body, a flow of combustion products produced by combustion adjacent to the first distal flame holder body from the received flow of fuel and oxidant, and a flow including a mixture of fuel and oxidant and combustion products. The combustion system includes a thermal load surface disposed peripherally to the axis and the first and second distal flame holder bodies. The first distal flame holder body supports at least a portion of combustion of the flow of fuel and oxidant from the fuel and oxidant source. The combustion system 100 may further include a distal pilot burner 112 disposed near the first and second distal flame holder bodies 102*a*, 120*b*.

According to an embodiment, conditions within the combustion system can result in the first distal flame holder body being unable to hold a combustion reaction of the fuel and oxidant. For example, when the flow rate of fuel and oxidant is high, or when the thermal load is high, the fuel may not have time to reach its autoignition temperature inside the first distal flame holder body. In this case, the second distal flame holder body can support a combustion reaction of the flow of fuel and oxidant while combustion is substantially absent within or adjacent to the first distal flame holder body. The second distal flame holder body transfers heat to the first distal flame holder body. As the flow of fuel and oxidant passes through or adjacent to the first distal flame holder body, the first distal flame holder body heats the flow of fuel and oxidant. Preheating the flow of fuel and oxidant in this manner can enhance the ability of the second distal flame holder body to stably support a combustion reaction of the flow of fuel and oxidant, including more complete combustion of the flow of fuel and oxidant.

According to an embodiment, the first distal flame holder body can hold a combustion reaction of the fuel and oxidant. However, the combustion reaction within or adjacent to the first distal flame holder body can result in incomplete combustion of the fuel and oxidant. Combustion products from the combustion reaction within or adjacent to the first distal flame holder body flow downstream to the second distal flame holder body. The combustion products can include compounds that are at intermediate steps in the process of complete combustion and thus have not been completely combusted.

For example, the first distal flame holder body may react methane and oxygen to produce carbon monoxide and hydrogen or carbon monoxide and water (depending on how much oxygen is present) according to the reaction:

$$2CH_4+3O_2\rightarrow 2CO+4H_2O.$$

Because this reaction to partially oxidize the methane to carbon monoxide is fast compared to the reaction to fully oxidize the CO to $CO_2$, the reaction occurring in the first distal flame holder body may not have time to produce $CO_2$. When the flow of carbon monoxide, water, and combustion air carrying additional oxygen reaches the second distal flame holder body, the carbon monoxide may be fully oxidized to carbon dioxide, according to the reaction:

$$2CO+O_2\rightarrow 2CO_2.$$

Adding the two reactions, the overall combustion reaction can be expressed as:

$$2CH_4+4O_2\rightarrow 2CO_2+4H_2O;$$

wherein the complete, overall combustion reaction is distributed between the first and second distal flame holder bodies.

In other words, the second distal flame holder body may receive the incompletely combusted combustion products and the combustion process continues within or adjacent to the second distal flame holder body, resulting in complete, or more complete, combustion of the incompletely combusted combustion products from the first distal flame holder body. In this way, the combustion of the flow of fuel and oxidant can be spread between the first and second distal flame holder bodies. According to an embodiment, the second distal flame holder body holds a combustion reaction of a portion of the flow of fuel and oxidant and the incompletely combusted combustion products.

According to an embodiment, a method includes outputting a flow of fuel and oxidant along an axis, receiving at least a portion of the flow of fuel and oxidant at a first distal flame holder body aligned relative to the axis, and supporting a first combustion reaction of the fuel and oxidant within or adjacent to the first distal flame holder body. The method can include heating a second distal flame holder body, positioned downstream from the first distal flame holder body, with the first combustion reaction; receiving, at the second distal flame holder body, at least one of the flow of fuel and oxidant received at the first distal flame holder body, and a flow including a mixture of fuel and oxidant and combustion products; and heating a thermal load with the first combustion reaction supported within or adjacent to the first distal flame holder body. The method can include supporting, within or adjacent to the second distal flame holder body, a second combustion reaction of at least one of the flow of fuel and oxidant and a flow including a mixture of fuel and oxidant and combustion products.

According to an embodiment, a method includes outputting a flow of fuel and oxidant, passing the flow of fuel and oxidant through or adjacent to a first distal flame holder body, and receiving the flow of fuel and oxidant at a second distal flame holder body positioned downstream from the first distal flame holder body. The method also includes supporting a combustion reaction of the fuel and oxidant within or adjacent to the second distal flame holder body, heating the first distal flame holder body with the combustion reaction supported by the second distal flame holder body, and preheating the flow of fuel and oxidant with the first distal flame holder body. The method also includes heating a thermal load with the combustion reaction. The method also includes supporting a pilot flame at a location near the first and second distal flame holder bodies.

According to an embodiment, a combustion system includes a fuel and oxidant source configured to output a flow of fuel and oxidant, and at least one first distal flame holder body aligned to receive at least a portion of the flow of fuel and oxidant from the fuel and oxidant source and to hold a first portion of a combustion reaction of the fuel and oxidant within or adjacent to the at least one first distal flame holder body. The combustion system can include at least one second distal flame holder body positioned downstream from the at least one first distal flame holder body relative to the fuel and oxidant source and aligned to receive a fluid flow from one or both of the fuel and oxidant source and the at least one first distal flame holder body. The at least one second distal flame holder body are configured to hold a second portion of the combustion reaction supported by the fluid flow within or adjacent to the at least one second distal flame holder body. The combustion system can include a thermal load surface disposed peripherally to the first and second distal flame holder bodies and to receive heat from the respective first and second combustion reaction portions.

DETAILED DESCRIPTION

Figure 1A:
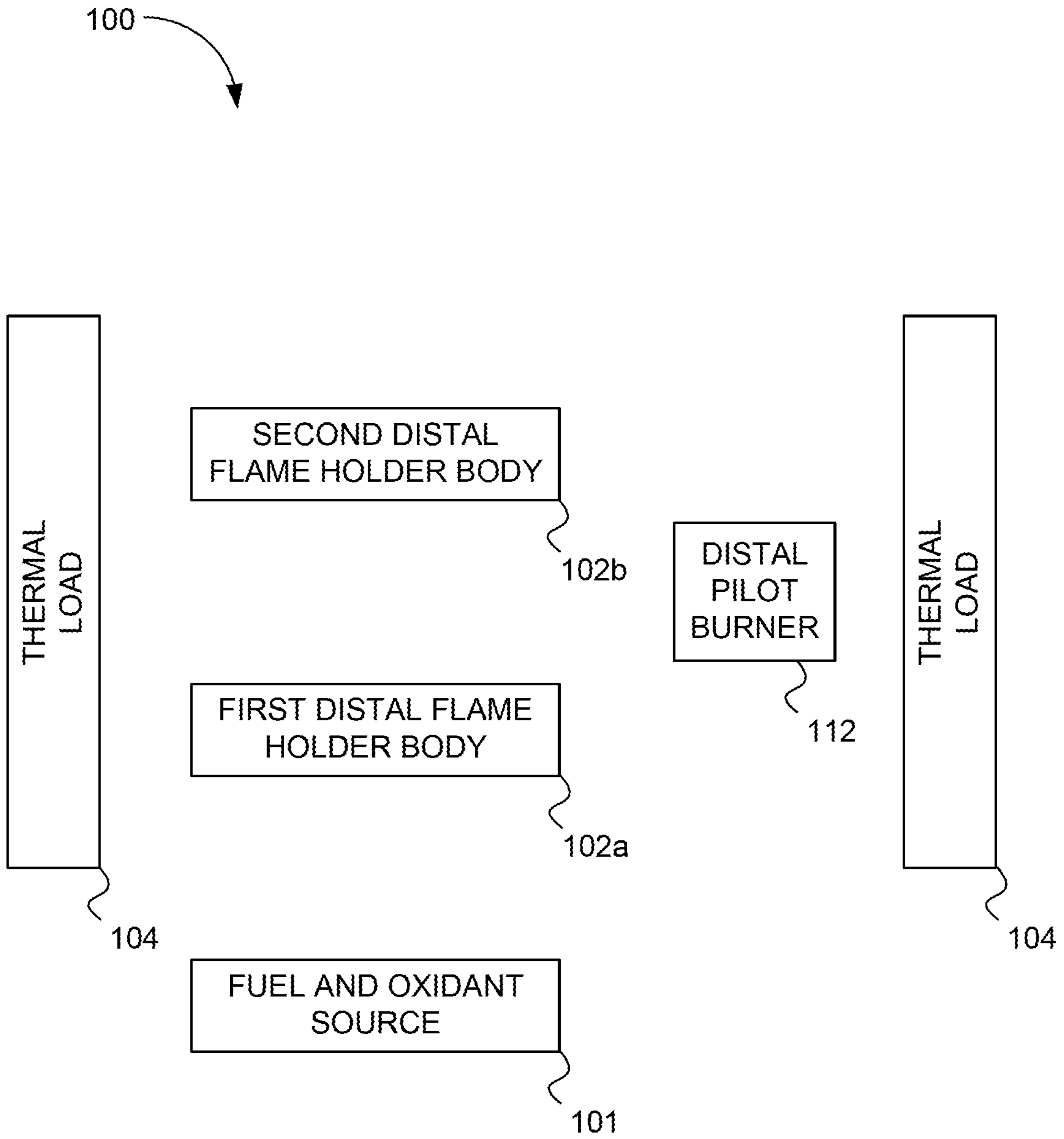
FIGS. 1A-1D are block diagrams of a combustion system including multiple distal flame holder bodies in various states of operation, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1A is a diagram of a combustion system 100, according to an embodiment. The combustion system 100 includes a fuel and oxidant source 101, a first distal flame holder body 102*a*, a second distal flame holder body 102*b*, a thermal load 104, and a distal pilot burner 112. The components of the combustion system 100 cooperate together to support combustion reactions and provide heat to the thermal load 104.

In some embodiments, the distal flame holder bodies 102*a*, 102*b* may include conventional, substantially non-porous refractory tiles or composite tile bodies. In some embodiments, the distal flame holder bodies 102*a*, 102*a* may include perforated flame holders or perforated flame holder tiles. In some embodiments, substantially non-porous tiles and perforated flame holder tiles may be intermixed. As used herein, the term “refractory” is used to refer to any high temperature non-metallic material. Refractory tiles may include conventional composite materials and/or high temperature ceramic materials such as silicon carbide, alumina, and zirconia. In some embodiments, the applicants have used silicon carbide rods in combination with mullite tiles.

According to an embodiment, the fuel and oxidant source 101 is configured to output a flow of fuel and oxidant 106 (see FIG. 1B) along an axis. The fuel and oxidant source 101 can include one or more fuel nozzles configured to output a fuel. The fuel and oxidant source 101 can include an oxidant source configured to output an oxidant. The fuel and oxidant mix together in a flow of fuel and oxidant 106.

According to an embodiment, the first distal flame holder body 102*a* is positioned proximal to the fuel and oxidant source 101. The first distal flame holder body 102*a* is positioned to receive at least a portion of the flow of fuel and oxidant 106 from the fuel and oxidant source 101 and to hold a first combustion reaction of the fuel and oxidant. According to an embodiment, the first distal flame holder body 102*a* is configured to hold the first combustion reaction of the fuel and oxidant at least partially within the first distal flame holder body 102*a*.

According to an embodiment, the second distal flame holder body 102*b* is positioned distal to the fuel and oxidant source 101 relative to the first distal flame holder body 102*a*. Thus, the second distal flame holder body 102*b* is positioned downstream from the first distal flame holder body 102*a* with respect to the fuel and oxidant source 101.

According to an embodiment, the second distal flame holder body 102*b* is positioned to receive the flow of fuel and oxidant 106 downstream from the first distal flame holder body 102*a*. The second distal flame holder body 102*b* can receive the flow of fuel and oxidant 106 from the first distal flame holder body 102*a*. The second distal flame holder body 102*b* can receive the flow of fuel and oxidant 106 as uncombusted fuel and oxidant that passes through perforations of the first distal flame holder body 102*a*. Additionally, or alternatively, the second distal flame holder body 102*b* can receive the flow of fuel and oxidant 106 via a central aperture of the first distal flame holder body 102*a*.

According to an embodiment, the second distal flame holder body 102*b* is positioned to receive a flow of combustion products from the first distal flame holder body 102*a*. The combustion products can result from the first combustion reaction held by or adjacent to the first distal flame holder body 102*a*. The combustion products can include incompletely combusted fuel and oxidant. The combustion products can include flue gases.

According to an embodiment, the combustion system 100 further includes a distal pilot burner 112 disposed near the first and second distal flame holder bodies 102*a*, 102*b*. The distal pilot burner 112 may be run continuously to guarantee ignition. In another embodiment, the distal pilot burner 112 may be turned down when one or more distal flame holder bodies maintains a temperature greater than a fuel and combustion air autoignition temperature.

According to an embodiment, the second distal flame holder body 102*b* is configured to hold a second combustion reaction of the fuel and oxidant. The second distal flame holder body 102*b* can hold the second combustion reaction with the flow of fuel and oxidant 106 received from the fuel and oxidant source 101, either via the first distal flame holder body 102*a* or via a central aperture in the first distal flame holder body 102*a*.

According to an embodiment, the second distal flame holder body 102*b* is configured to hold the second combustion reaction with combustion products received in the flow of combustion products from the first distal flame holder body 102*a*. Because the combustion products from the first combustion reaction can include incompletely combusted fuel, the second combustion reaction can include further combustion of the incompletely combusted fuel. This can result in complete combustion, or more complete combustion, of the combustion products from the first combustion reaction.

According to an embodiment, the second distal flame holder body 102*b* is configured to hold the second combustion reaction with a combination of combustion products received in the flow of combustion products from the first distal flame holder body 102*a*, and fuel and oxidant received in the flow of fuel and oxidant 106 from the fuel and oxidant source 101. Thus, the second combustion reaction can include combustion of fuel and oxidant received at the second distal flame holder body 102*b* from the fuel and oxidant source 101, as well as combustion products received in the flow of combustion products from the first distal flame holder body 102*a*. In this way, the second combustion reaction can be supported by a flow including a mixture of fuel and oxidant 106 and combustion products.

According to an embodiment, prior to outputting the flow of fuel and oxidant 106 from the fuel and oxidant source 101, the combustion system 100 preheats the first distal flame holder body 102*a* to a threshold temperature. The threshold temperature can correspond to an autoignition temperature of the fuel and oxidant. Thus, the threshold temperature can correspond to a temperature at which the first distal flame holder body 102*a* is able to ignite the fuel and oxidant and hold a stable combustion reaction of the fuel and oxidant.

According to an embodiment, after the first distal flame holder body 102*a* is heated to the threshold temperature, the fuel and oxidant source 101 outputs the flow of fuel and oxidant 106. Because the first distal flame holder body 102*a* has been heated to the threshold temperature, the first distal flame holder body 102*a* supports the first combustion reaction of the fuel and oxidant.

According to an embodiment, the first distal flame holder body 102*a* supports at least a portion of the combustion of the flow of fuel and oxidant 106 from the fuel and oxidant source 101. In an embodiment, the first distal flame holder body 102*a* transfers heat to the receive flow of fuel and oxidant 106 from the fuel and oxidant source 101. In an embodiment, the first distal flame holder body 102*a* includes a perforated flame holder tile. In an embodiment, the second distal flame holder body 102*b* includes a perforated flame holder tile. In an embodiment, the first distal flame holder body 102*a* includes a solid bluff body. In an embodiment, the second distal flame holder body 102*b* includes a solid bluff body.

According to an embodiment, the second distal flame holder body 102*b* is configured to support combustion of the received fuel and oxidant.

According to an embodiment, the first distal flame holder body 102*a* is aligned with the axis. In another embodiment, the first distal flame holder body 102*a* is aligned peripheral to the axis. In an embodiment, the second distal flame holder body 102*b* is aligned with the axis. In another embodiment, the second distal flame holder body 102*b* is aligned peripheral to the axis.

According to an embodiment, the combustion system 100 is configured to preheat the second distal flame holder body 102*b* to the threshold temperature. When the second distal flame holder body 102*b* is preheated to the threshold temperature, the second distal flame holder body 102*b* is able to support and hold the second combustion reaction of the fuel and oxidant and/or a mixture of the combustion products and the fuel and oxidant.

According to an embodiment, the combustion system 100 includes a preheating mechanism configured to preheat the first distal flame holder body 102*a*. The preheating mechanism can include a preheating fuel nozzle configured to support a preheating flame adjacent to the first distal flame holder body 102*a*. Alternatively, the preheating mechanism can include an electrical resistance heater configured to generate heat by passing an electrical current through a resistive element positioned on or adjacent to the first distal flame holder body 102*a*. Alternatively, the preheating mechanism can include other kinds of mechanisms for heating the first distal flame holder body 102*a* to the threshold temperature.

According to an embodiment, the combustion system 100 includes a preheating mechanism configured to preheat the second distal flame holder body 102*b*. The preheating mechanism can include a preheating fuel nozzle configured to support a preheating flame adjacent to the second distal flame holder body 102*b*. Alternatively, the preheating mechanism can include an electrical resistance heater configured to generate heat by passing an electrical current through a resistive element positioned on or adjacent to the second distal flame holder body 102*b*. Alternatively, the preheating mechanism can include other kinds of mechanisms for heating the second distal flame holder body 102*b* to the threshold temperature.

According to an embodiment, the first combustion reaction held by the first distal flame holder body 102*a* preheats the second distal flame holder body 102*b* to the threshold temperature. The flow of combustion products from the first combustion reaction can be very hot. When the second distal flame holder body 102*b* receives hot combustion products 110 (see FIG. 1B) from the first combustion reaction, the hot combustion products 110 heat the body of the second distal flame holder body 102*b*. Additionally, thermal energy can be radiated from the first distal flame holder body 102*a* to the second distal flame holder body 102*b*. The second distal flame holder body 102*b* receives the radiated thermal energy. Eventually, the flow of the hot combustion products 110 and the radiated thermal energy heat the second distal flame holder body 102*b* to the threshold temperature.

According to an embodiment, conditions within the combustion system 100, including one or more of fuel flow parameters, oxidant flow parameters, fuel type, thermal load 104 conditions, and relative positioning of the components of the combustion system 100, can result in the first distal flame holder body 102*a* being unable to hold a combustion reaction of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support the second combustion reaction of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame body 102*b* holder to stably support the second combustion reaction of the flow of fuel and oxidant 106, including more complete combustion of the flow of fuel and oxidant 106.

According to an embodiment, the temperature of the first distal flame holder body 102*a* may tend to drop due to conditions within the combustion system 100. In these circumstances, the second combustion reaction held by the second distal flame holder body 102*b* can radiate thermal energy to the first distal flame holder body 102*a*, thereby heating the first distal flame holder body 102*a* so that the first distal flame holder body 102*a* can continue to support the first combustion reaction.

According to an embodiment, the first and second distal flame holder bodies 102*a* and 102*b* simultaneously hold the first and second combustion reactions, respectively. According to an embodiment, the first combustion reaction accounts for all, or most, of the combustion within the combustion system 100. Accordingly, in various circumstances the first combustion reaction is present while the second combustion reaction is substantially absent. According to an embodiment, the second combustion reaction accounts for all, or most, of the combustion within the combustion system 100. Accordingly, in various circumstances the second combustion reaction is present while the first combustion reaction is substantially absent.

According to an embodiment, the combustion system 100 includes one or more additional distal flame holder bodies downstream from the second distal flame holder body 102*b*. The one or more additional distal flame holder bodies can receive combustion products from the second combustion reaction held by the second distal flame holder body 102*b* and/or the flow of fuel and oxidant 106 from the fuel and oxidant source 101. The one or more additional distal flame holder bodies can hold combustion reactions of the combustion products and/or the fuel and oxidant.

According to an embodiment, the thermal load 104 includes a furnace wall configured to receive heat from the first and second combustion reactions. The thermal load 104 can include a hot wall, such as a refractory wall in an up fired furnace. Alternatively, the thermal load 104 can include a cold wall such as a boiler tube. The manner in which the thermal load 104 receives heat from the first and/or second combustion reactions can cost cooling or further heating of the first and second distal flame holder bodies 102*a*, 102*b*. The decision to hold combustion reactions in one or both of the first and second distal flame holder bodies 102*a*, 102*b* can depend on cooling or heating within the combustion volume caused by the thermal load 104. According to an embodiment, a small thermal load 104 can cause the first distal flame holder body 102*a* to retain heat sufficient to support combustion of the received fuel and oxidant within the first distal flame holder body 102*a*. According to an embodiment, a large thermal load 104 can cause the first distal flame holder body 102*a* to retain heat insufficient to support combustion of the received fuel and oxidant within the first distal flame holder body 102*a*.

According to an embodiment, the second distal flame holder body 102*b* is configured to radiate heat energy to the first distal flame holder body 102*a* when the second distal flame holder body 102*b* supports combustion.

According to an embodiment, the first and second distal flame holder bodies 102*a*, 102*b* each include respective perforations. The perforations of the second distal flame holder body 102*b* may be narrower than the perforations of the first distal flame holder body 102*a*.

According to an embodiment, the thermal load 104 includes water in a fluid chamber positioned to be heated by combustion of the fuel and oxidant. In an embodiment, the thermal load 104 includes a wall of a combustion chamber.

According to an embodiment, the combustion system 100 further includes multiple first distal flame holder bodies 102*a* arranged around the axis. In an embodiment, the combustion system 100 further includes multiple second distal flame holder bodies 102*b* arranged around the axis. In an embodiment, the first distal flame holder body 102*a* is a torus. In an embodiment, the second distal flame holder body 102*b* is a torus. A central aperture of the second distal flame holder body 102*b* may be narrower than a central aperture of the first distal flame holder body 102*a*.

According to an embodiment, the combustion system 100 can include a support structure configured to support the first and second distal flame holder bodies 102*a*, 102*b* relative to the fuel and oxidant source 101. Further details regarding a support structure are found in International Patent Application No. PCT/US2017/013523, filed on Jan. 13, 2017, titled "PERFORATED FLAME HOLDER WITH GAPS BETWEEN TILE GROUPS". To the extent not inconsistent with the present disclosure, International Patent Application No. PCT/US2017/013523 is incorporated herein by reference in its entirety.

Figure 1B:
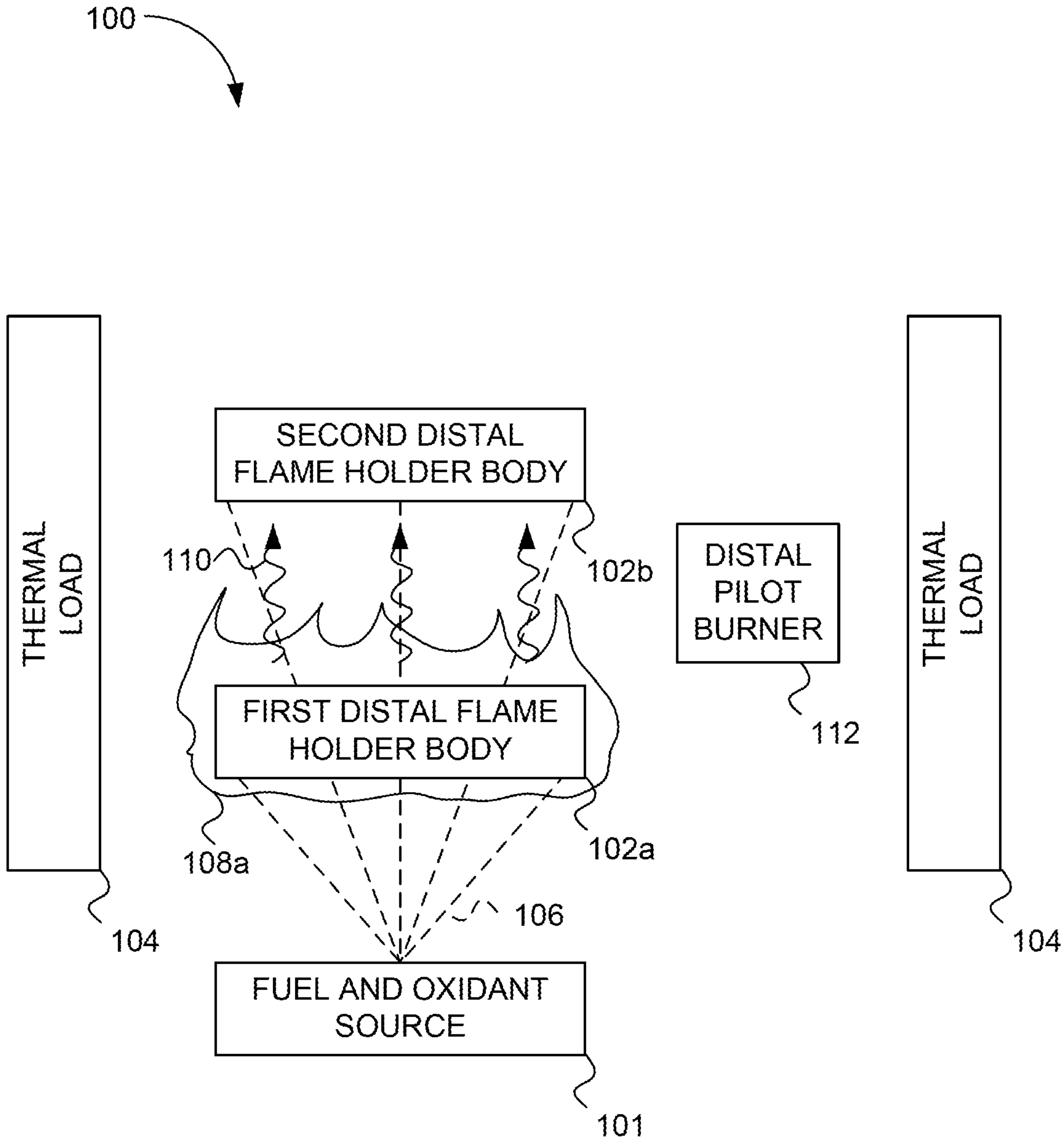

FIG. 1B is an illustration of the combustion system 100 in a first operating condition, according to an embodiment. The fuel and oxidant source 101 outputs a flow of fuel and oxidant 106, according to one embodiment. The first distal flame holder body 102*a* receives the flow of fuel and oxidant 106 from the fuel and oxidant source 101. Because the first distal flame holder body 102*a* has been preheated to the threshold temperature, the first distal flame holder body 102*a* supports and holds a first combustion reaction 108*a* of the fuel and oxidant.

According to an embodiment, the first distal flame holder body 102*a* generates combustion products 110 with the first combustion reaction 108*a*. The combustion products 110 can include products of the first combustion reaction 108*a* including partially combusted fuel, oxidant, and flue gases. According to an embodiment, the combustion products 110 are very hot. The flow of hot combustion products 110 is received by the second distal flame holder body 102*b*. The flow of hot combustion products 110 heat the second distal flame holder body 102*b*.

According to an embodiment, a portion of the flow of fuel and oxidant 106 is received by the second distal flame holder body 102*b*. The portion of the flow of fuel and oxidant 106 received by the second distal flame holder body 102*b* is heated by passing through or adjacent to the first distal flame holder body 102*a*.

While FIG. 1B shows that the second combustion reaction is not present, in practice, a relatively small amount of combustion may be held by the second distal flame holder body 102*b* while the first distal flame holder body 102*a* holds nearly all of the combustion occurring within the combustion system 100, according to one embodiment.

Figure 1C:
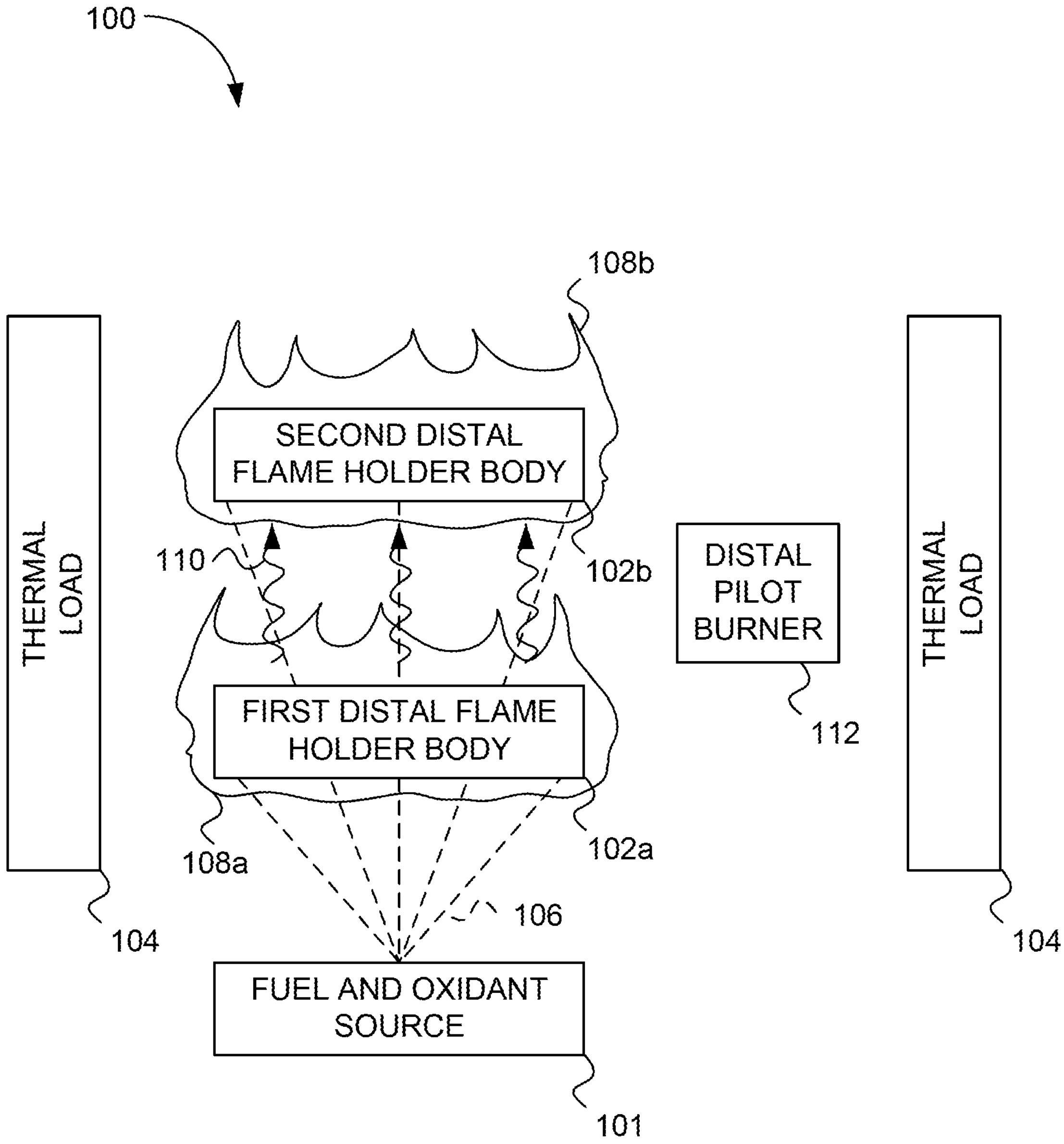

FIG. 1C is an illustration of the combustion system 100 in a second operating condition, according to an embodiment. In the second operating condition, the first distal flame holder body 102*a* holds the first combustion reaction 108*a* and the second distal flame holder body 102*b* holds a second combustion reaction 108*b*.

According to an embodiment, the fuel and oxidant source 101 outputs a flow of fuel and oxidant 106. The first distal flame holder body 102*a* receives the flow of fuel and oxidant 106 from the fuel and oxidant source 101. Because the first distal flame holder body 102*a* has been preheated to the threshold temperature, the first distal flame holder body 102*a* supports and holds a first combustion reaction 108*a* of the fuel and oxidant.

According to an embodiment, the second distal flame holder body 102*b* receives a portion of the flow of fuel and oxidant 106 and/or a flow of combustion products 110. Because the second distal flame holder body 102*b* has been preheated to the threshold temperature, the second distal flame holder body 102*b* supports the second combustion reaction 108*b*. Thus, in one embodiment, the combustion system 100 can operate in a second operating condition in which the first distal flame holder body 102*a* and the second distal flame holder body 102*b* simultaneously support substantial first and second combustion reactions 108*a*, 108*b*.

According to an embodiment, the combustion products 110 can include compounds that are at intermediate steps in the process of complete combustion and thus have not been completely combusted. The second distal flame holder body 102*b* receives the incompletely combusted combustion products 110 and the combustion process continues within the second distal flame holder body 102*b*, resulting in complete or more complete combustion of the incompletely combusted combustion products 110 from the first combustion reaction 108*a*. In this way, the combustion of the flow of fuel and oxidant 106 can be spread between the first and second distal flame holder bodies 102*a*, 102*b*. According to an embodiment, the second distal flame holder body 102*b* holds a second combustion reaction 108*b* of a portion of the flow of fuel and oxidant 106 and the incompletely combusted combustion products 110.

Figure 1D:
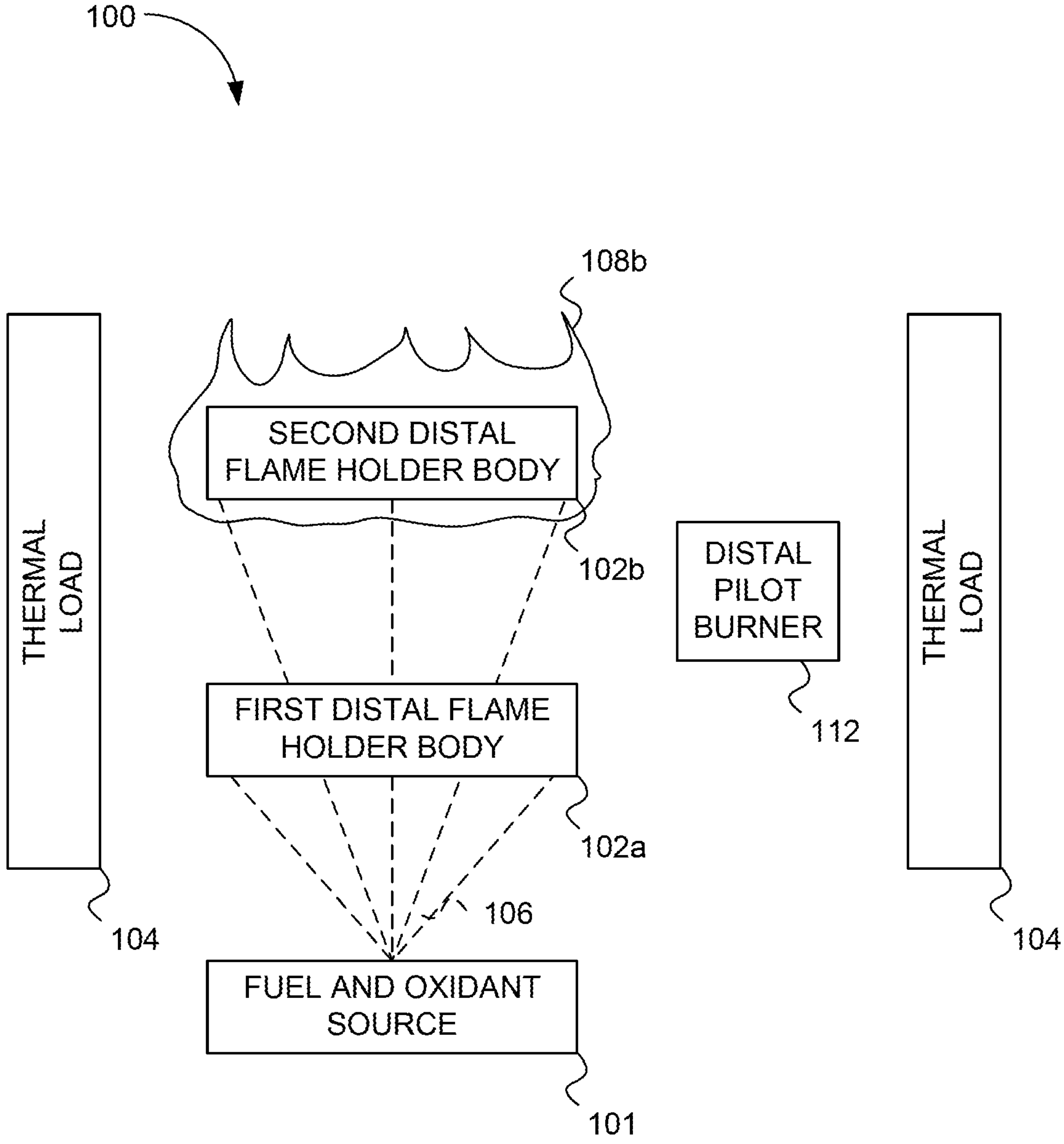

FIG. 1D is an illustration of the combustion system 100 in a third operating condition, according to an embodiment. The fuel and oxidant source 101 outputs a flow of fuel and oxidant 106, according to one embodiment. The second distal flame holder body 102*b* receives the flow of fuel and oxidant 106 from the fuel and oxidant source 101. Because the second distal flame holder body 102*b* has been preheated to the threshold temperature, the second distal flame holder body 102*b* supports and holds a second combustion reaction 108*b* of the fuel and oxidant.

According to an embodiment, conditions within the combustion system 100, including one or more of fuel flow parameters, oxidant flow parameters, fuel type, thermal load 104 conditions, and relative positioning of the components of the combustion system, can result in the first distal flame holder body 102*a* being unable to hold the first combustion reaction 108*a* of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support a second combustion reaction 108*b* of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame holder body 102*b* to stably support a second combustion reaction 108*b* of the flow of fuel and oxidant 106, including more complete combustion of the flow of fuel and oxidant 106.

While FIG. 1D shows that the first combustion reaction 108*a* is not present, in practice, a relatively small amount of combustion reaction may be held by the first distal flame holder body 102*a* while the second distal flame holder body 102*b* holds nearly all of the combustion occurring within the combustion system 100, according to one embodiment.

According to an embodiment, the combustion system 100 can transfer between the various operating conditions based on the parameters of the combustion system 100 including fuel type, fuel speed, the type of thermal load 104, and current conditions of the thermal load 104.

As may be appreciated, a plurality of distal flame holder bodies may form a distal flame holder complex that adapts to fuel flow, temperature, and thermal load conditions to provide adaptive combustion reaction positioning.

Accordingly, a combustion system 100 may include a fuel and combustion air source 101 and a distal flame holder complex 102*a*, 102*b* configured to receive a fuel and combustion air mixture and provide adaptive combustion reaction positioning responsive to fuel flow, temperature, and thermal load 104 conditions. The combustion system 100 may include a thermal load 104 configured to receive heat energy from a combustion reaction collectively held by the distal flame holder complex 102*a*, 102*b*. The combustion system 100 may include a distal pilot burner 112 configured to maintain a source of ignition for the fuel and combustion air mixture.

According to embodiments, the distal flame holder 102 may include perforated flame holder tiles.

Figure 2:
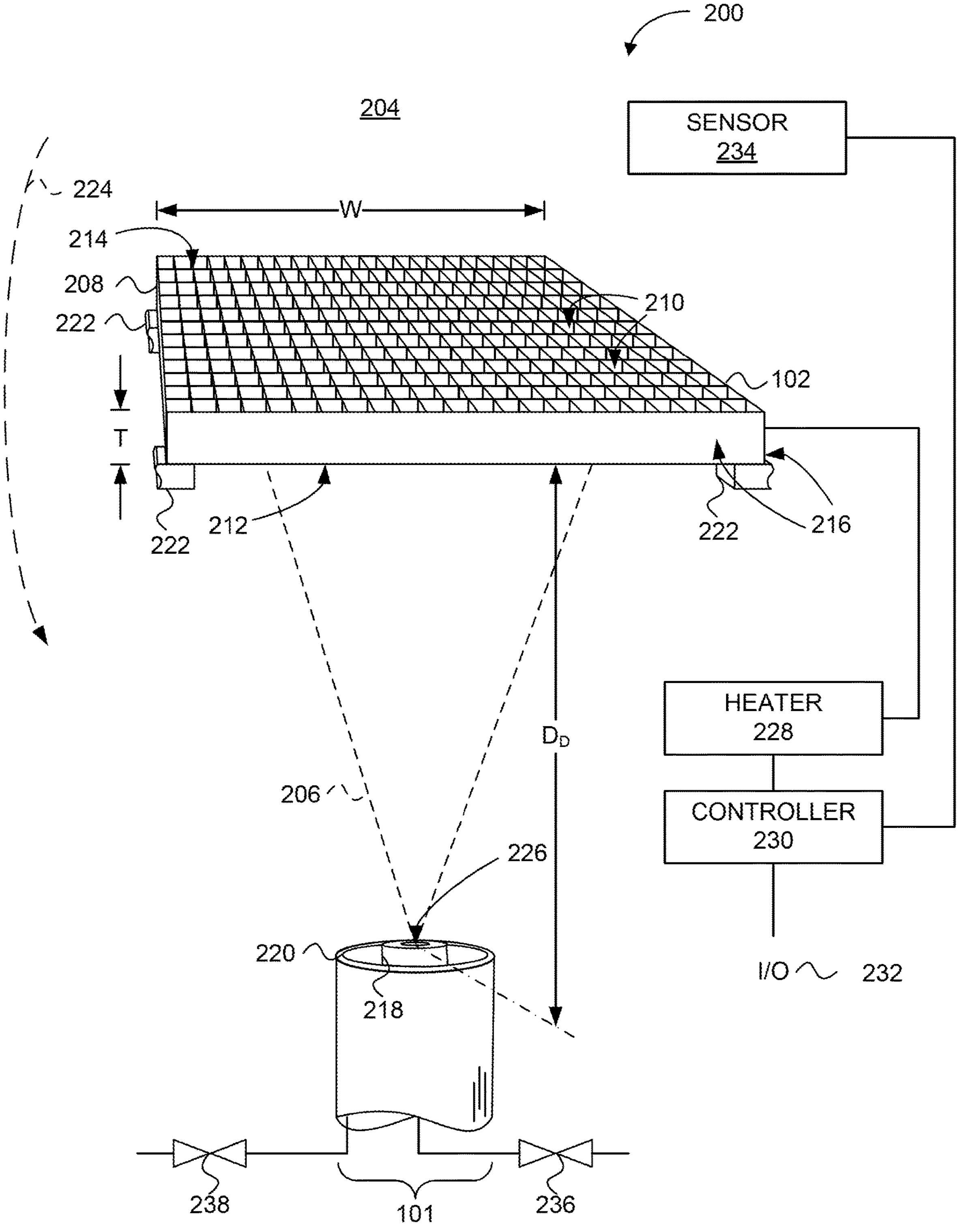
FIG. 2 is a simplified diagram of a burner system including a perforated flame holder configured to hold a combustion reaction, according to an embodiment.

FIG. 2 is a simplified diagram of a burner system 200 including a perforated flame holder 102 configured to hold a combustion reaction, according to an embodiment. As used herein, the terms perforated flame holder, perforated reaction holder, porous flame holder, porous reaction holder, duplex, and duplex tile shall be considered synonymous unless further definition is provided.

Experiments performed by the inventors have shown that perforated flame holders 102 described herein can support very clean combustion. Specifically, in experimental use of burner systems 200 ranging from pilot scale to full scale, output of oxides of nitrogen (NOx) was measured to range from low single digit parts per million (ppm) down to undetectable (less than 1 ppm) concentration of NOx at the stack. These remarkable results were measured at 3% (dry) oxygen ($O_2$) concentration with undetectable carbon monoxide (CO) at stack temperatures typical of industrial furnace applications (1400-1600° F.). Moreover, these results did not require any extraordinary measures such as selective catalytic reduction (SCR), selective non-catalytic reduction (SNCR), water/steam injection, external flue gas recirculation (FGR), or other heroic extremes that may be required for conventional burners to even approach such clean combustion.

According to embodiments, the burner system 200 includes a fuel and oxidant source 101 disposed to output fuel and oxidant into a combustion volume 204 to form a fuel and oxidant mixture 206. As used herein, the terms fuel and oxidant mixture and fuel stream may be used interchangeably and considered synonymous depending on the context, unless further definition is provided. As used herein, the terms combustion volume, combustion chamber, furnace volume, and the like shall be considered synonymous unless further definition is provided. The perforated flame holder 102 is disposed in the combustion volume 204 and positioned to receive the fuel and oxidant mixture 206.

Figure 3:
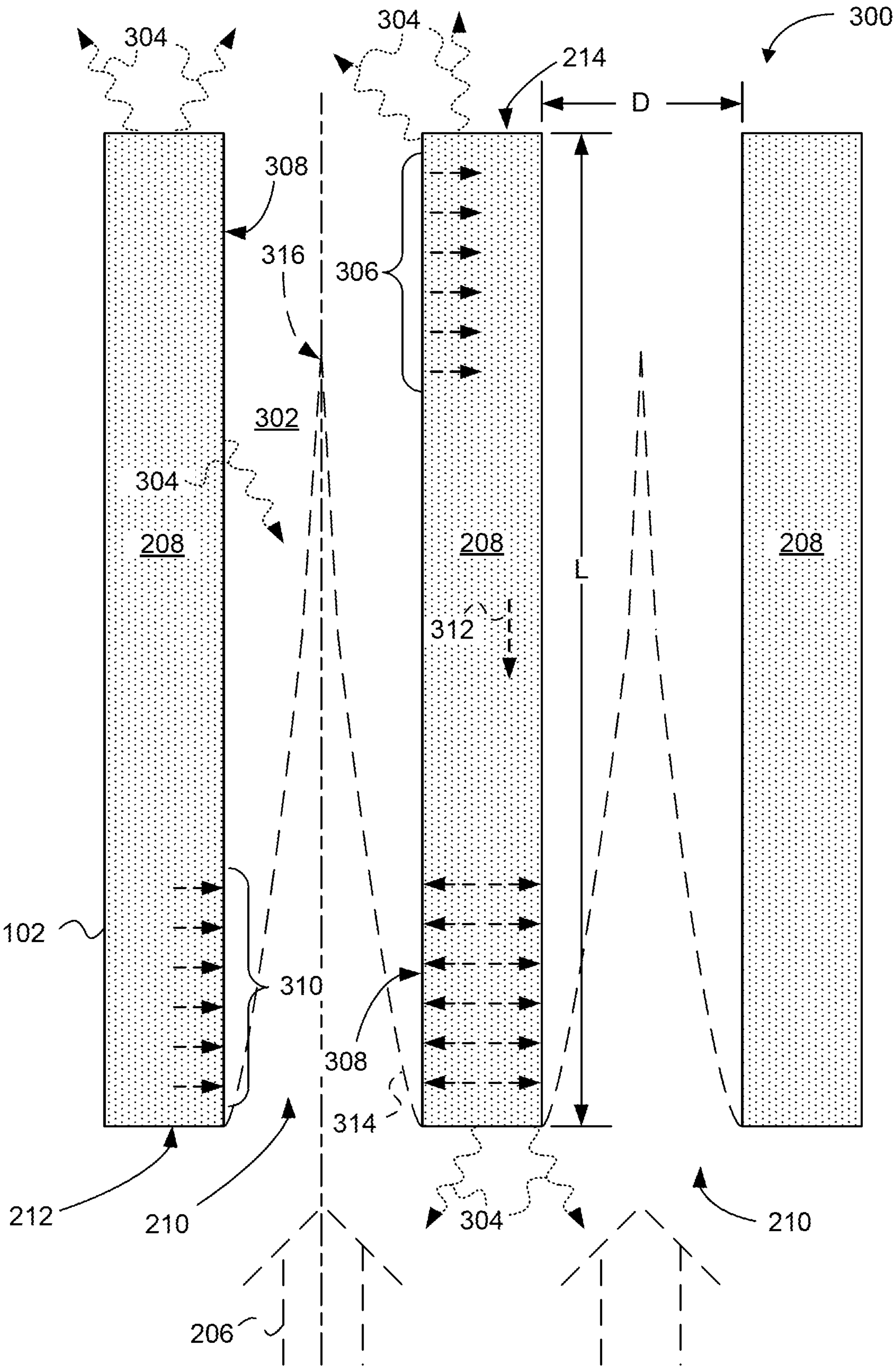
FIG. 3 is a side sectional diagram of a portion of the perforated flame holder of FIG. 2, according to an embodiment.

FIG. 3 is a side sectional diagram 300 of a portion of the perforated flame holder 102 of FIGS. 1 and 2, according to an embodiment. Referring to FIGS. 2 and 3, the perforated flame holder 102 includes a perforated flame holder body 208 defining a plurality of perforations 210 aligned to receive the fuel and oxidant mixture 206 from the fuel and oxidant source 101. As used herein, the terms perforation, pore, aperture, elongated aperture, and the like, in the context of the perforated flame holder 102, shall be considered synonymous unless further definition is provided. The perforations 210 are configured to collectively hold a combustion reaction 302 supported by the fuel and oxidant mixture 206.

The fuel can include hydrogen, a hydrocarbon gas, a vaporized hydrocarbon liquid, an atomized hydrocarbon liquid, or a powdered or pulverized solid. The fuel can be a single species or can include a mixture of gas(es), vapor(s), atomized liquid(s), and/or pulverized solid(s). For example, in a process heater application the fuel can include fuel gas or byproducts from the process that include carbon monoxide (CO), hydrogen ($H_2$), and methane ($CH_4$). In another application the fuel can include natural gas (mostly $CH_4$) or propane ($C_3H_8$). In another application, the fuel can include #2 fuel oil or #6 fuel oil. Dual fuel applications and flexible fuel applications are similarly contemplated by the inventors. The oxidant can include oxygen carried by air, flue gas, and/or can include another oxidant, either pure or carried by a carrier gas. The terms oxidant and oxidizer shall be considered synonymous herein.

According to an embodiment, the perforated flame holder body 208 can be bounded by an input face 212 disposed to receive the fuel and oxidant mixture 206, an output face 214 facing away from the fuel and oxidant source 101, and a peripheral surface 216 defining a lateral extent of the perforated flame holder 102. The plurality of perforations 210 which are defined by the perforated flame holder body 208 extend from the input face 212 to the output face 214. The plurality of perforations 210 can receive the fuel and oxidant mixture 206 at the input face 212. The fuel and oxidant mixture 206 can then combust in or near the plurality of perforations 210 and combustion products can exit the plurality of perforations 210 at or near the output face 214.

According to an embodiment, the perforated flame holder 102 is configured to hold a majority of the combustion reaction 302 within the perforations 210. For example, on a steady-state basis, more than half the molecules of fuel output into the combustion volume 204 by the fuel and oxidant source 101 may be converted to combustion products between the input face 212 and the output face 214 of the perforated flame holder 102. According to an alternative interpretation, more than half of the heat or thermal energy output by the combustion reaction 302 may be output between the input face 212 and the output face 214 of the perforated flame holder 102. As used herein, the terms heat, heat energy, and thermal energy shall be considered synonymous unless further definition is provided. As used above, heat energy and thermal energy refer generally to the released chemical energy initially held by reactants during the combustion reaction 302. As used elsewhere herein, heat, heat energy and thermal energy correspond to a detectable temperature rise undergone by real bodies characterized by heat capacities. Under nominal operating conditions, the perforations 210 can be configured to collectively hold at least 80% of the combustion reaction 302 between the input face 212 and the output face 214 of the perforated flame holder 102. In some experiments, the inventors produced a combustion reaction 302 that was apparently wholly contained in the perforations 210 between the input face 212 and the output face 214 of the perforated flame holder 102. According to an alternative interpretation, the perforated flame holder 102 can support combustion between the input face 212 and output face 214 when combustion is "time-averaged." For example, during transients, such as before the perforated flame holder 102 is fully heated, or if too high a (cooling) load is placed on the system, the combustion may travel somewhat downstream from the output face 214 of the perforated flame holder 102. Alternatively, if the cooling load is relatively low and/or the furnace temperature reaches a high level, the combustion may travel somewhat upstream of the input face 212 of the perforated flame holder 102.

While a "flame" is described in a manner intended for ease of description, it should be understood that in some instances, no visible flame is present. Combustion occurs primarily within the perforations 210, but the "glow" of combustion heat is dominated by a visible glow of the perforated flame holder 102 itself. In other instances, the inventors have noted transient "huffing" or "flashback" wherein a visible flame momentarily ignites in a region lying between the input face 212 of the perforated flame holder 102 and the fuel nozzle 218, within the dilution region $D_D$. Such transient huffing or flashback is generally short in duration such that, on a time-averaged basis, a majority of combustion occurs within the perforations 210 of the perforated flame holder 102, between the input face 212 and the output face 214. In still other instances, the inventors have noted apparent combustion occurring downstream from the output face 214 of the perforated flame holder 102, but still a majority of combustion occurred within the perforated flame holder 102 as evidenced by continued visible glow from the perforated flame holder 102 that was observed.

The perforated flame holder 102 can be configured to receive heat from the combustion reaction 302 and output a portion of the received heat as thermal radiation 304 to heat-receiving structures (e.g., furnace walls and/or radiant section working fluid tubes) in or adjacent to the combustion volume 204. As used herein, terms such as radiation, thermal radiation, radiant heat, heat radiation, etc. are to be construed as being substantially synonymous, unless further definition is provided. Specifically, such terms refer to blackbody-type radiation of electromagnetic energy, primarily at infrared wavelengths, but also at visible wavelengths owing to elevated temperature of the perforated flame holder body 208.

Referring especially to FIG. 3, the perforated flame holder 102 outputs another portion of the received heat to the fuel and oxidant mixture 206 received at the input face 212 of the perforated flame holder 102. The perforated flame holder body 208 may receive heat from the combustion reaction 302 at least in heat receiving regions 306 of perforation walls 308. Experimental evidence has suggested to the inventors that the position of the heat receiving regions 306, or at least the position corresponding to a maximum rate of receipt of heat, can vary along the length of the perforation walls 308. In some experiments, the location of maximum receipt of heat was apparently between ⅓ and ½ of the distance from the input face 212 to the output face 214 (i.e., somewhat nearer to the input face 212 than to the output face 214). The inventors contemplate that the heat receiving regions 306 may lie nearer to the output face 214 of the perforated flame holder 102 under other conditions. Most probably, there is no clearly defined edge of the heat receiving regions 306 (or for that matter, the heat output regions 310, described below). For ease of understanding, the heat receiving regions 306 and the heat output regions 310 will be described as particular regions 306, 310.

The perforated flame holder body 208 can be characterized by a heat capacity. The perforated flame holder body 208 may hold thermal energy from the combustion reaction 302 in an amount corresponding to the heat capacity multiplied by temperature rise, and transfer the thermal energy from the heat receiving regions 306 to heat output regions 310 of the perforation walls 308. Generally, the heat output regions 310 are nearer to the input face 212 than are the heat receiving regions 306. According to one interpretation, the perforated flame holder body 208 can transfer heat from the heat receiving regions 306 to the heat output regions 310 via thermal radiation, depicted graphically as 304. According to another interpretation, the perforated flame holder body 208 can transfer heat from the heat receiving regions 306 to the heat output regions 310 via heat conduction along heat conduction paths 312. The inventors contemplate that multiple heat transfer mechanisms including conduction, radiation, and possibly convection may be operative in transferring heat from the heat receiving regions 306 to the heat output regions 310. In this way, the perforated flame holder 102 may act as a heat source to maintain the combustion reaction 302, even under conditions where a combustion reaction 302 would not be stable when supported from a conventional flame holder.

The inventors believe that the perforated flame holder 102 causes the combustion reaction 302 to begin within thermal boundary layers 314 formed adjacent to walls 308 of the perforations 210. Insofar as combustion is generally understood to include a large number of individual reactions, and since a large portion of combustion energy is released within the perforated flame holder 102, it is apparent that at least a majority of the individual reactions occur within the perforated flame holder 102. As the relatively cool fuel and oxidant mixture 206 approaches the input face 212, the flow is split into portions that respectively travel through individual perforations 210. The hot perforated flame holder body 208 transfers heat to the fluid, notably within thermal boundary layers 314 that progressively thicken as more and more heat is transferred to the incoming fuel and oxidant mixture 206. After reaching a combustion temperature (e.g., the autoignition temperature of the fuel), the reactants continue to flow while a chemical ignition delay time elapses, over which time the combustion reaction 302 occurs. Accordingly, the combustion reaction 302 is shown as occurring within the thermal boundary layers 314. As flow progresses, the thermal boundary layers 314 merge at a merger point 316. Ideally, the merger point 316 lies between the input face 212 and output face 214 that define the ends of the perforations 210. At some position along the length of a perforation 210, the combustion reaction 302 outputs more heat to the perforated flame holder body 208 than it receives from the perforated flame holder body 208. The heat is received at the heat receiving region 306, is held by the perforated flame holder body 208, and is transported to the heat output region 310 nearer to the input face 212, where the heat is transferred into the cool reactants (and any included diluent) to bring the reactants to the ignition temperature.

In an embodiment, each of the perforations 210 is characterized by a length L defined as a reaction fluid propagation path length between the input face 212 and the output face 214 of the perforated flame holder 102. As used herein, the term reaction fluid refers to matter that travels through a perforation 210. Near the input face 212, the reaction fluid includes the fuel and oxidant mixture 206 (optionally including nitrogen, flue gas, and/or other “non-reactive” species). Within the combustion reaction 302 region, the reaction fluid may include plasma associated with the combustion reaction 302, molecules of reactants and their constituent parts, any non-reactive species, reaction intermediates (including transition states), and reaction products. Near the output face 214, the reaction fluid may include reaction products and byproducts, non-reactive gas, and excess oxidant.

The plurality of perforations 210 can be each characterized by a transverse dimension D between opposing perforation walls 308. The inventors have found that stable combustion can be maintained in the perforated flame holder 102 if the length L of each perforation 210 is at least four times the transverse dimension D of the perforation. In other embodiments, the length L can be greater than six times the transverse dimension D. For example, experiments have been run where L is at least eight, at least twelve, at least sixteen, and at least twenty-four times the transverse dimension D. Preferably, the length L is sufficiently long for thermal boundary layers 314 to form adjacent to the perforation walls 308 in a reaction fluid flowing through the perforations 210 to converge at merger points 316 within the perforations 210 between the input face 212 and the output face 214 of the perforated flame holder 102. In experiments, the inventors have found L/D ratios between 12 and 48 to work well (i.e., produce low NOx, produce low CO, and maintain stable combustion).

The perforated flame holder body 208 can be configured to convey heat between adjacent perforations 210. The heat conveyed between adjacent perforations 210 can be selected to cause heat output from the combustion reaction portion 302 in a first perforation 210 to supply heat to stabilize a combustion reaction portion 302 in an adjacent perforation 210.

Referring especially to FIG. 2, the fuel and oxidant source 101 can further include a fuel nozzle 218, configured to output fuel, and an oxidant source 220 configured to output a fluid including the oxidant. For example, the fuel nozzle 218 can be configured to output pure fuel. The oxidant source 220 can be configured to output combustion air carrying oxygen, and optionally, flue gas. The perforated flame holder 102 can be held by a perforated flame holder support structure 222 configured to hold the perforated flame holder 102 at a dilution distance $D_D$ away from the fuel nozzle 218. The fuel nozzle 218 can be configured to emit a fuel jet selected to entrain the oxidant to form the fuel and oxidant mixture 206 as the fuel jet and oxidant travel along a path to the perforated flame holder 102 through the dilution distance $D_D$ between the fuel nozzle 218 and the perforated flame holder 102. Additionally or alternatively (particularly when a blower is used to deliver oxidant contained in combustion air), the oxidant or combustion air source 220 can be configured to entrain the fuel and the fuel and oxidant travel through the dilution distance Do. In some embodiments, a flue gas recirculation path 224 can be provided. Additionally or alternatively, the fuel nozzle 218 can be configured to emit a fuel jet selected to entrain the oxidant and to entrain flue gas as the fuel jet travels through the dilution distance $D_D$ between the fuel nozzle 218 and the input face 212 of the perforated flame holder 102.

The fuel nozzle 218 can be configured to emit the fuel through one or more fuel orifices 226 having an inside diameter dimension that is referred to as "nozzle diameter." The perforated flame holder support structure 222 can support the perforated flame holder 102 to receive the fuel and oxidant mixture 206 at the distance $D_D$ away from the fuel nozzle 218 greater than 20 times the nozzle diameter. In another embodiment, the perforated flame holder 102 is disposed to receive the fuel and oxidant mixture 206 at the distance $D_D$ away from the fuel nozzle 218 between 100 times and 1100 times the nozzle diameter. Preferably, the perforated flame holder support structure 222 is configured to hold the perforated flame holder 102 at a distance about 200 times or more of the nozzle diameter away from the fuel nozzle 218. When the fuel and oxidant mixture 206 travels about 200 times the nozzle diameter or more, the mixture is sufficiently homogenized to cause the combustion reaction 302 to produce minimal NOx.

The fuel and oxidant source 101 can alternatively include a premix fuel and oxidant source, according to an embodiment. A premix fuel and oxidant source can include a premix chamber (not shown), a fuel nozzle configured to output fuel into the premix chamber, and an oxidant (e.g., combustion air) channel configured to output the oxidant into the premix chamber. A flame arrestor can be disposed between the premix fuel and oxidant source and the perforated flame holder 102 and be configured to prevent flame flashback into the premix fuel and oxidant source.

The oxidant source 220, whether configured for entrainment in the combustion volume 204 or for premixing, can include a blower configured to force the oxidant through the fuel and oxidant source 101.

The perforated flame holder support structure 222 can be configured to support the perforated flame holder 102 from a floor or wall (not shown) of the combustion volume 204, for example. In another embodiment, the perforated flame holder support structure 222 supports the perforated flame holder 102 from the fuel and oxidant source 101. Alternatively, the perforated flame holder support structure 222 can suspend the perforated flame holder 102 from an overhead structure (such as a flue, in the case of an up-fired system). The perforated flame holder support structure 222 can support the perforated flame holder 102 in various orientations and directions.

The perforated flame holder 102 can include a single perforated flame holder body 208. In another embodiment, the perforated flame holder 102 can include a plurality of adjacent perforated flame holder sections that collectively provide a tiled perforated flame holder 102.

The perforated flame holder support structure 222 can be configured to support the plurality of perforated flame holder sections. The perforated flame holder support structure 222 can include a metal superalloy, a cementatious, and/or ceramic refractory material. In an embodiment, the plurality of adjacent perforated flame holder sections can be joined with a fiber reinforced refractory cement.

The perforated flame holder 102 can have a width dimension W between opposite sides of the peripheral surface 216 at least twice a thickness dimension T between the input face 212 and the output face 214. In another embodiment, the perforated flame holder 102 can have a width dimension W between opposite sides of the peripheral surface 216 at least three times, at least six times, or at least nine times the thickness dimension T between the input face 212 and the output face 214 of the perforated flame holder 102.

In an embodiment, the perforated flame holder 102 can have a width dimension W less than a width of the combustion volume 204. This can allow the flue gas recirculation path 224 from above to below the perforated flame holder 102 to lie between the peripheral surface 216 of the perforated flame holder 102 and the combustion volume wall (not shown).

Referring again to both FIGS. 2 and 3, the perforations 210 can be of various shapes. In an embodiment, the perforations 210 can include elongated squares, each having a transverse dimension D between opposing sides of the squares. In another embodiment, the perforations 210 can include elongated hexagons, each having a transverse dimension D between opposing sides of the hexagons. In yet another embodiment, the perforations 210 can include hollow cylinders, each having a transverse dimension D corresponding to a diameter of the cylinder. In another embodiment, the perforations 210 can include truncated cones or truncated pyramids (e.g., frustums), each having a transverse dimension D radially symmetric relative to a length axis that extends from the input face 212 to the output face 214. In some embodiments, the perforations 210 can each have a lateral dimension D equal to or greater than a quenching distance of the flame based on standard reference conditions. Alternatively, the perforations 210 may have lateral dimension D less then than a standard reference quenching distance.

In one range of embodiments, each of the plurality of perforations 210 has a lateral dimension D between 0.05 inch and 1.0 inch. Preferably, each of the plurality of perforations 210 has a lateral dimension D between 0.1 inch and 0.5 inch. For example, the plurality of perforations 210 can each have a lateral dimension D of about 0.2 to 0.4 inch.

The void fraction of a perforated flame holder 102 is defined as the total volume of all perforations 210 in a section of the perforated flame holder 102 divided by a total volume of the perforated flame holder 102 including perforated flame holder body 208 and perforations 210. The perforated flame holder 102 should have avoid fraction between 0.10 and 0.90. In an embodiment, the perforated flame holder 102 can have a void fraction between 0.30 and 0.80. In another embodiment, the perforated flame holder 102 can have a void fraction of about 0.70. Using a void fraction of about 0.70 was found to be especially effective for producing very low NOx.

The perforated flame holder 102 can be formed from a fiber reinforced cast refractory material and/or a refractory material such as an aluminum silicate material. For example, the perforated flame holder 102 can be formed to include mullite or cordierite. Additionally or alternatively, the perforated flame holder body 208 can include a metal superalloy such as Inconel or Hastelloy. The perforated flame holder body 208 can define a honeycomb. Honeycomb is an industrial term of art that need not strictly refer to a hexagonal cross section and most usually includes cells of square cross section. Honeycombs of other cross sectional areas are also known.

The inventors have found that the perforated flame holder 102 can be formed from VERSAGRID® ceramic honeycomb, available from Applied Ceramics, Inc. of Doraville, South Carolina.

The perforations 210 can be parallel to one another and normal to the input and output faces 212, 214. In another embodiment, the perforations 210 can be parallel to one another and formed at an angle relative to the input and output faces 212, 214. In another embodiment, the perforations 210 can be non-parallel to one another. In another embodiment, the perforations 210 can be non-parallel to one another and non-intersecting. In another embodiment, the perforations 210 can be intersecting. The perforated flame holder body 208 can be one piece or can be formed from a plurality of sections.

In another embodiment, which is not necessarily preferred, the perforated flame holder 102 may be formed from reticulated ceramic material. The term "reticulated" refers to a netlike structure. Reticulated ceramic material is often made by dissolving a slurry into a sponge of specified porosity, allowing the slurry to harden, and burning away the sponge and curing the ceramic.

In another embodiment, which is not necessarily preferred, the perforated flame holder 102 may be formed from a ceramic material that has been punched, bored or cast to create channels.

In another embodiment, the perforated flame holder 102 can include a plurality of tubes or pipes bundled together. The plurality of perforations 210 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The perforated flame holder body 208 can alternatively include stacked perforated sheets of material, each sheet having openings that connect with openings of subjacent and superjacent sheets. The perforated sheets can include perforated metal sheets, ceramic sheets and/or expanded sheets. In another embodiment, the perforated flame holder body 208 can include discontinuous packing bodies such that the perforations 210 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic Raschig ring, ceramic Berl saddles, ceramic Intalox saddles, and/or metal rings or other shapes (e.g. Super Raschig Rings) that may be held together by a metal cage.

The inventors contemplate various explanations for why burner systems including the perforated flame holder 102 provide such clean combustion.

According to an embodiment, the perforated flame holder 102 may act as a heat source to maintain a combustion reaction 302 even under conditions where a combustion reaction 302 would not be stable when supported by a conventional flame holder. This capability can be leveraged to support combustion using a leaner fuel-to-oxidant mixture than is typically feasible. Thus, according to an embodiment, at the point where the fuel stream 206 contacts the input face 212 of the perforated flame holder 102, an average fuel-to-oxidant ratio of the fuel stream 206 is below a (conventional) lower combustion limit of the fuel component of the fuel stream 206—lower combustion limit defines the lowest concentration of fuel at which a fuel and oxidant mixture 206 will burn when exposed to a momentary ignition source under normal atmospheric pressure and an ambient temperature of 25° C. (77° F.).

The perforated flame holder 102 and systems including the perforated flame holder 102 described herein were found to provide substantially complete combustion of CO (single digit ppm down to undetectable, depending on experimental conditions), while supporting low NOx. According to one interpretation, such a performance can be achieved due to a sufficient mixing used to lower peak flame temperatures (among other strategies). Flame temperatures tend to peak under slightly rich conditions, which can be evident in any diffusion flame that is insufficiently mixed. By sufficiently mixing, a homogenous and slightly lean mixture can be achieved prior to combustion. This combination can result in reduced flame temperatures, and thus reduced NOx formation. In one embodiment, "slightly lean" may refer to 3% $O_2$, i.e., an equivalence ratio of ~0.87. Use of even leaner mixtures is possible, but may result in elevated levels of $O_2$. Moreover, the inventors believe perforation walls 308 may act as a heat sink for the combustion fluid. This effect may alternatively or additionally reduce combustion temperatures and lower NOx.

According to another interpretation, production of NOx can be reduced if the combustion reaction 302 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the perforated flame holder 102 is very short compared to a conventional flame. The low NOx production associated with perforated flame holder combustion may thus be related to the short duration of time required for the reactants (and entrained nitrogen) to pass through the perforated flame holder 102.

Figure 4:
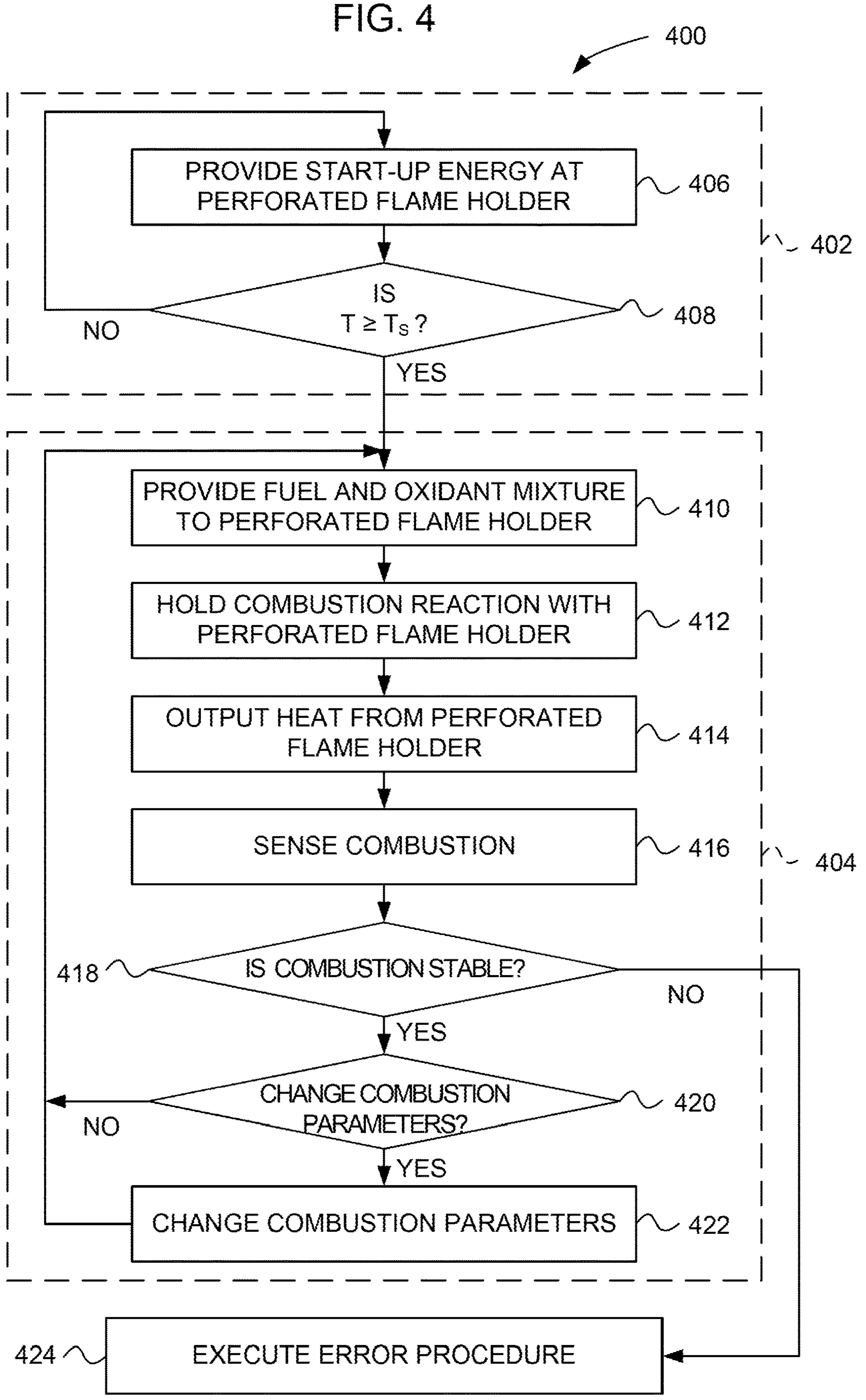
FIG. 4 is a flow chart showing a method for operating a combustion system including a perforated flame holder shown according to an embodiment.

FIG. 4 is a flow chart showing a method 400 for operating a burner system including the perforated flame holder shown and described herein. To operate a burner system including a perforated flame holder, the perforated flame holder is first heated to a temperature sufficient to maintain combustion of the fuel and oxidant mixture.

According to a simplified description, the method 400 begins with step 402, wherein the perforated flame holder is preheated to a start-up temperature, $T_S$. After the perforated flame holder is raised to the start-up temperature, the method proceeds to step 404, wherein the fuel and oxidant are provided to the perforated flame holder and combustion is held by the perforated flame holder.

According to a more detailed description, step 402 begins with step 406, wherein start-up energy is provided at the perforated flame holder. Simultaneously or following providing start-up energy, a decision step 408 determines whether the temperature T of the perforated flame holder is at or above the start-up temperature, $T_S$. As long as the temperature of the perforated flame holder is below its start-up temperature, the method loops between steps 406 and 408 within the preheat step 402. In decision step 408, if the temperature T of at least a predetermined portion of the perforated flame holder is greater than or equal to the start-up temperature, the method 400 proceeds to overall step 404, wherein fuel and oxidant is supplied to and combustion is held by the perforated flame holder.

Step 404 may be broken down into several discrete steps, at least some of which may occur simultaneously.

Proceeding from decision step 408, a fuel and oxidant mixture is provided to the perforated flame holder, as shown in step 410. The fuel and oxidant may be provided by a fuel and oxidant source that includes a separate fuel nozzle and oxidant (e.g., combustion air) source, for example. In this approach, the fuel and oxidant are output in one or more directions selected to cause the fuel and oxidant mixture to be received by the input face of the perforated flame holder. The fuel may entrain the combustion air (or alternatively, the combustion air may dilute the fuel) to provide a fuel and oxidant mixture at the input face of the perforated flame holder at a fuel dilution selected for a stable combustion reaction that can be held within the perforations of the perforated flame holder.

Proceeding to step 412, the combustion reaction is held by the perforated flame holder.

In step 414, heat may be output from the perforated flame holder. The heat output from the perforated flame holder may be used to power an industrial process, heat a working fluid, generate electricity, or provide motive power, for example.

In optional step 416, the presence of combustion may be sensed. Various sensing approaches have been used and are contemplated by the inventors. Generally, combustion held by the perforated flame holder is very stable and no unusual sensing requirement is placed on the system. Combustion sensing may be performed using an infrared sensor, a video sensor, an ultraviolet sensor, a charged species sensor, thermocouple, thermopile, flame rod, and/or other combustion sensing apparatuses. In an additional or alternative variant of step 416, a pilot flame or other ignition source may be provided to cause ignition of the fuel and oxidant mixture in the event combustion is lost at the perforated flame holder.

Proceeding to decision step 418, if combustion is sensed not to be stable, the method 400 may exit to step 424, wherein an error procedure is executed. For example, the error procedure may include turning off fuel flow, re-executing the preheating step 402, outputting an alarm signal, igniting a stand-by combustion system, or other steps. If, in decision step 418, combustion in the perforated flame holder is determined to be stable, the method 400 proceeds to decision step 420, wherein it is determined if combustion parameters should be changed. If no combustion parameters are to be changed, the method loops (within step 404) back to step 410, and the combustion process continues. If a change in combustion parameters is indicated, the method 400 proceeds to step 422, wherein the combustion parameter change is executed. After changing the combustion parameter(s), the method loops (within step 404) back to step 410, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 422. Conversely, if heat demand is increased, then fuel and oxidant flow may be increased. Additionally or alternatively, if the combustion system is in a start-up mode, then fuel and oxidant flow may be gradually increased to the perforated flame holder over one or more iterations of the loop within step 404.

Referring again to FIG. 2, the burner system 200 includes a heater 228 operatively coupled to the perforated flame holder 102. As described in conjunction with FIGS. 3 and 4, the perforated flame holder 102 operates by outputting heat to the incoming fuel and oxidant mixture 206. After combustion is established, this heat is provided by the combustion reaction 302; but before combustion is established, the heat is provided by the heater 228.

Various heating apparatuses have been used and are contemplated by the inventors. In some embodiments, the heater 228 can include a flame holder configured to support a flame disposed to heat the perforated flame holder 102. The fuel and oxidant source 101 can include a fuel nozzle 218 configured to emit a fuel stream 206 and an oxidant source 220 configured to output oxidant (e.g., combustion air) adjacent to the fuel stream 206. The fuel nozzle 218 and oxidant source 220 can be configured to output the fuel stream 206 to be progressively diluted by the oxidant (e.g., combustion air). The perforated flame holder 102 can be disposed to receive a diluted fuel and oxidant mixture 206 that supports a combustion reaction 302 that is stabilized by the perforated flame holder 102 when the perforated flame holder 102 is at an operating temperature. A start-up flame holder, in contrast, can be configured to support a start-up flame at a location corresponding to a relatively unmixed fuel and oxidant mixture that is stable without stabilization provided by the heated perforated flame holder 102.

The burner system 200 can further include a controller 230 operatively coupled to the heater 228 and to a data interface 232. For example, the controller 230 can be configured to control a start-up flame holder actuator configured to cause the start-up flame holder to hold the start-up flame when the perforated flame holder 102 needs to be pre-heated and to not hold the start-up flame when the perforated flame holder 102 is at an operating temperature (e.g., when $T \geq T_S$).

Various approaches for actuating a start-up flame are contemplated. In one embodiment, the start-up flame holder includes a mechanically-actuated bluff body configured to be actuated to intercept the fuel and oxidant mixture 206 to cause heat-recycling and/or stabilizing vortices and thereby hold a start-up flame; or to be actuated to not intercept the fuel and oxidant mixture 206 to cause the fuel and oxidant mixture 206 to proceed to the perforated flame holder 102. In another embodiment, a fuel control valve, blower, and/or damper may be used to select a fuel and oxidant mixture 206 flow rate that is sufficiently low for a start-up flame to be jet-stabilized; and upon reaching a perforated flame holder 102 operating temperature, the flow rate may be increased to "blow out" the start-up flame. In another embodiment, the heater 228 may include an electrical power supply operatively coupled to the controller 230 and configured to apply an electrical charge or voltage to the fuel and oxidant mixture 206. An electrically conductive start-up flame holder may be selectively coupled to a voltage ground or other voltage selected to attract the electrical charge in the fuel and oxidant mixture 206. The attraction of the electrical charge was found by the inventors to cause a start-up flame to be held by the electrically conductive start-up flame holder.

In another embodiment, the heater 228 may include an electrical resistance heater configured to output heat to the perforated flame holder 102 and/or to the fuel and oxidant mixture 206. The electrical resistance heater can be configured to heat up the perforated flame holder 102 to an operating temperature. The heater 228 can further include a power supply and a switch operable, under control of the controller 230, to selectively couple the power supply to the electrical resistance heater 228.

An electrical resistance heater 228 can be formed in various ways. For example, the electrical resistance heater 228 can be formed from KANTHAL® wire (available from Sandvik Materials Technology division of Sandvik AB of Hallstahammar, Sweden) threaded through at least a portion of the perforations 210 defined by the perforated flame holder body 208. Alternatively, the heater 228 can include an inductive heater, a high-energy beam heater (e.g. microwave or laser), a frictional heater, electro-resistive ceramic coatings, or other types of heating technologies.

Other forms of start-up apparatuses are contemplated. For example, the heater 228 can include an electrical discharge igniter or hot surface igniter configured to output a pulsed ignition to the oxidant and fuel. Additionally or alternatively, a start-up apparatus can include a pilot flame apparatus disposed to ignite the fuel and oxidant mixture 206 that would otherwise enter the perforated flame holder 102. The electrical discharge igniter, hot surface igniter, and/or pilot flame apparatus can be operatively coupled to the controller 230, which can cause the electrical discharge igniter or pilot flame apparatus to maintain combustion of the fuel and oxidant mixture 206 in or upstream from the perforated flame holder 102 before the perforated flame holder 102 is heated sufficiently to maintain combustion.

The burner system 200 can further include a sensor 234 operatively coupled to the controller 230. The sensor 234 can include a heat sensor configured to detect infrared radiation or a temperature of the perforated flame holder 102. The control circuit 230 can be configured to control the heater 228 responsive to input from the sensor 234. Optionally, a fuel control valve 236 can be operatively coupled to the controller 230 and configured to control a flow of fuel to the fuel and oxidant source 101. Additionally or alternatively, an oxidant blower or damper 238 can be operatively coupled to the controller 230 and configured to control flow of the oxidant (or combustion air).

The sensor 234 can further include a combustion sensor operatively coupled to the control circuit 230, the combustion sensor being configured to detect a temperature, video image, and/or spectral characteristic of a combustion reaction 302 held by the perforated flame holder 102. The fuel control valve 236 can be configured to control a flow of fuel from a fuel source to the fuel and oxidant source 101. The controller 230 can be configured to control the fuel control valve 236 responsive to input from the combustion sensor 234. The controller 230 can be configured to control the fuel control valve 236 and/or oxidant blower or damper 238 to control a preheat flame type of heater 228 to heat the perforated flame holder 102 to an operating temperature. The controller 230 can similarly control the fuel control valve 236 and/or the oxidant blower or damper 238 to change the fuel and oxidant mixture 206 flow responsive to a heat demand change received as data via the data interface 232.

Figure 5A:
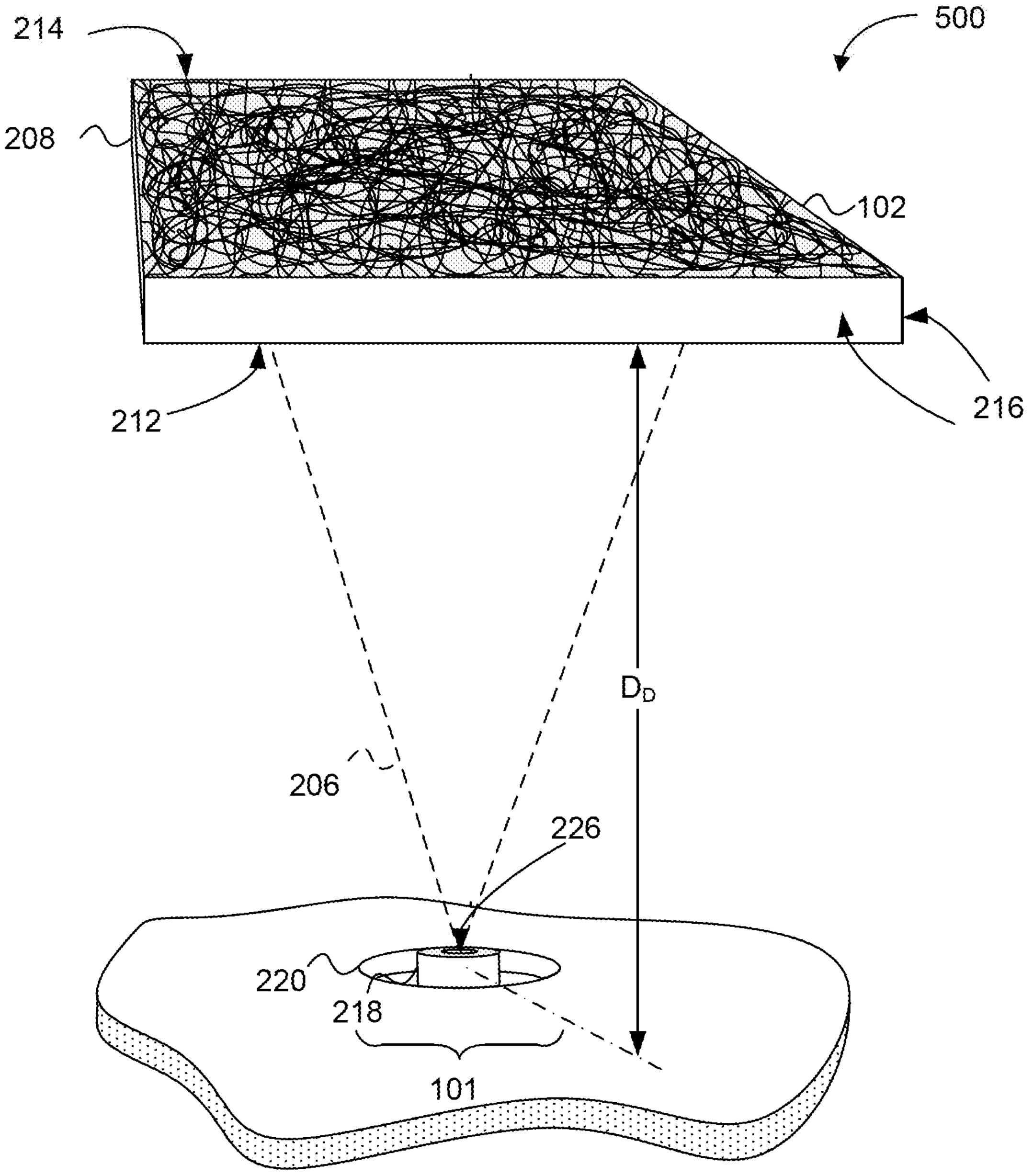
FIG. 5A is a simplified perspective view of a combustion system, including a reticulated ceramic perforated flame holder, according to an embodiment.
Figure 5B:
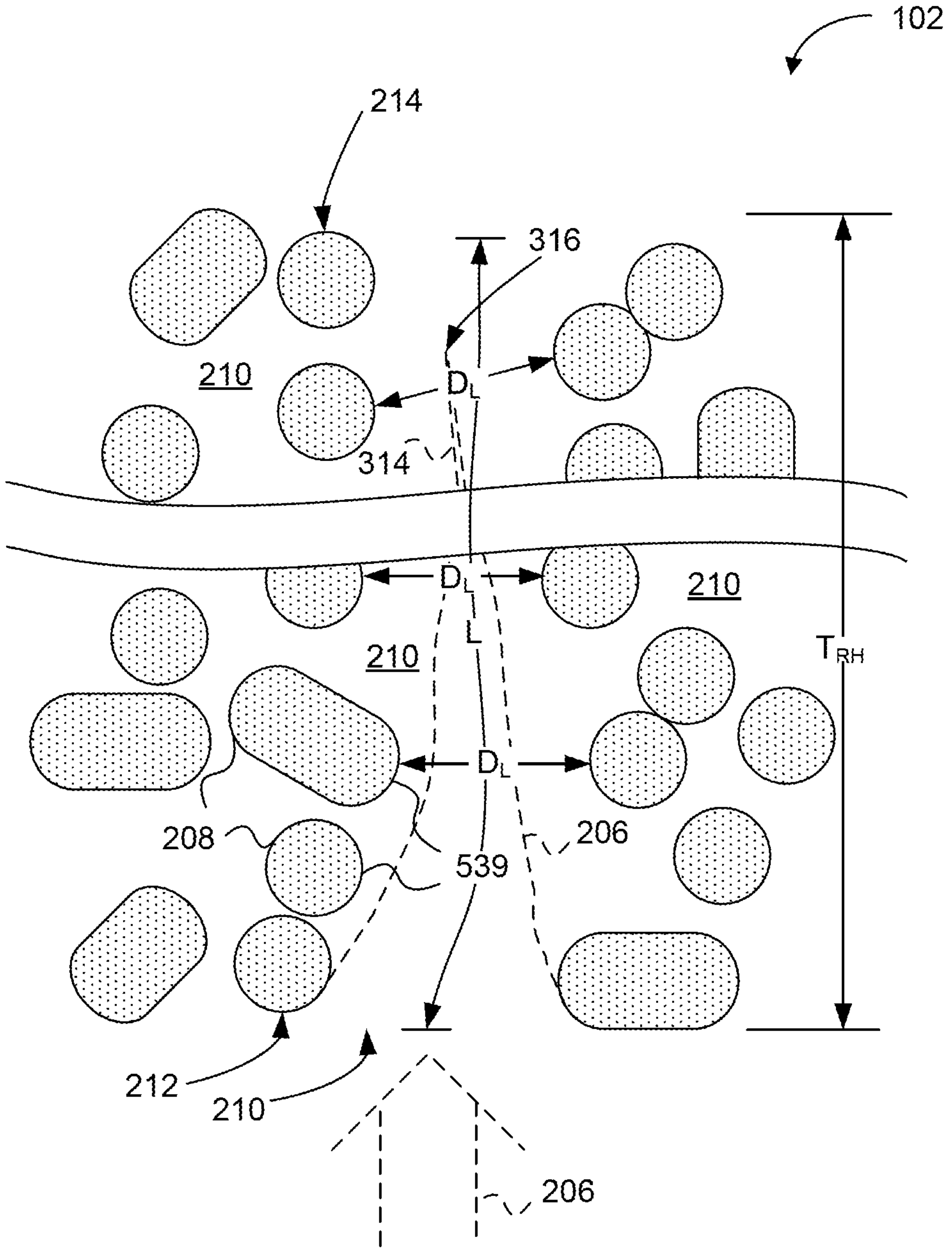
FIG. 5B is a simplified side sectional diagram of a portion of the reticulated ceramic perforated flame holder of FIG. 5A, according to an embodiment.

FIG. 5A is a simplified perspective view of a combustion system 500, including another alternative perforated flame holder 102, according to an embodiment. The perforated flame holder 102 is a reticulated ceramic perforated flame holder, according to an embodiment. FIG. 5B is a simplified side sectional diagram of a portion of the reticulated ceramic perforated flame holder 102 of FIG. 5A, according to an embodiment. The perforated flame holder 102 of FIGS. 5A, 5B can be implemented in the various combustion systems described herein, according to an embodiment. The perforated flame holder 102 is configured to support a combustion reaction (e.g., combustion reaction 302 of FIG. 3) of the fuel and oxidant mixture 206 received from the fuel and oxidant source 101 at least partially within the perforated flame holder 102. According to an embodiment, the perforated flame holder 102 can be configured to support a combustion reaction of the fuel and oxidant mixture 206 upstream, downstream, within, and adjacent to the reticulated ceramic perforated flame holder 102.

According to an embodiment, the perforated flame holder body 208 can include reticulated fibers 539. The reticulated fibers 539 can define branching perforations 210 that weave around and through the reticulated fibers 539. According to an embodiment, the perforations 210 are formed as passages between the reticulated fibers 539.

According to an embodiment, the reticulated fibers 539 are formed as a reticulated ceramic foam. According to an embodiment, the reticulated fibers 539 are formed using a reticulated polymer foam as a template. According to an embodiment, the reticulated fibers 539 can include alumina silicate. According to an embodiment, the reticulated fibers 539 can be formed from extruded mullite or cordierite. According to an embodiment, the reticulated fibers 539 can include Zirconia. According to an embodiment, the reticulated fibers 539 can include silicon carbide.

The term "reticulated fibers" refers to a netlike structure. According to an embodiment, the reticulated fibers 539 are formed from an extruded ceramic material. In reticulated fiber embodiments, the interaction between the fuel and oxidant mixture 206, the combustion reaction, and heat transfer to and from the perforated flame holder body 208 can function similarly to the embodiment shown and described above with respect to FIGS. 2-4. One difference in activity is a mixing between perforations 210, because the reticulated fibers 539 form a discontinuous perforated flame holder body 208 that allows flow back and forth between neighboring perforations 210.

According to an embodiment, the network of reticulated fibers 539 is sufficiently open for downstream reticulated fibers 539 to emit radiation for receipt by upstream reticulated fibers 539 for the purpose of heating the upstream reticulated fibers 539 sufficiently to maintain combustion of a fuel and oxidant mixture 206. Compared to a continuous perforated flame holder body 208, heat conduction paths (such as heat conduction paths 312 in FIG. 3) between reticulated fibers 539 are reduced due to separation of the reticulated fibers 539. This may cause relatively more heat to be transferred from a heat-receiving region or area (such as heat receiving region 306 in FIG. 3) to a heat-output region or area (such as heat-output region 310 of FIG. 3) of the reticulated fibers 539 via thermal radiation (shown as element 304 in FIG. 3).

According to an embodiment, individual perforations 210 may extend between an input face 212 to an output face 214 of the perforated flame holder 102. Perforations 210 may have varying lengths L. According to an embodiment, because the perforations 210 branch into and out of each other, individual perforations 210 are not clearly defined by a length L.

According to an embodiment, the perforated flame holder 102 is configured to support or hold a combustion reaction (see element 302 of FIG. 3) or a flame at least partially between the input face 212 and the output face 214. According to an embodiment, the input face 212 corresponds to a surface of the perforated flame holder 102 proximal to the fuel nozzle 218 or to a surface that first receives fuel. According to an embodiment, the input face 212 corresponds to an extent of the reticulated fibers 539 proximal to the fuel nozzle 218. According to an embodiment, the output face 214 corresponds to a surface distal to the fuel nozzle 218 or opposite the input face 212. According to an embodiment, the input face 212 corresponds to an extent of the reticulated fibers 539 distal to the fuel nozzle 218 or opposite to the input face 212.

According to an embodiment, the formation of thermal boundary layers 314, transfer of heat between the perforated flame holder body 208 and the gases flowing through the perforations 210, a characteristic perforation width dimension D, and the length L can each be regarded as related to an average or overall path through the perforated reaction holder 102. In other words, the dimension D can be determined as a root-mean-square of individual Dn values determined at each point along a flow path. Similarly, the length L can be a length that includes length contributed by tortuosity of the flow path, which may be somewhat longer than a straight line distance $T_{RH}$ from the input face 212 to the output face 214 through the perforated reaction holder 102. According to an embodiment, the void fraction (expressed as (total perforated reaction holder 102 volume—reticulated fiber 539 volume)/total volume)) is about 70%.

According to an embodiment, the reticulated ceramic perforated flame holder 102 is a tile about 1"×4"×4". According to an embodiment, the reticulated ceramic perforated flame holder 102 includes about 10 pores per inch, meaning that a line laid across the surface of the reticulated ceramic perforated flame holder 102 would cross about 10 pores. Other materials and dimensions can also be used for a reticulated ceramic perforated flame holder 102 in accordance with principles of the present disclosure.

According to an embodiment, the reticulated ceramic perforated flame holder 102 can include shapes and dimensions other than those described herein. For example, the perforated flame holder 102 can include reticulated ceramic tiles that are larger or smaller than the dimensions set forth above. Additionally, the reticulated ceramic perforated flame holder 102 can include shapes other than generally cuboid shapes.

According to an embodiment, the reticulated ceramic perforated flame holder 102 can include multiple reticulated ceramic tiles. The multiple reticulated ceramic tiles can be joined together such that each ceramic tile is in direct contact with one or more adjacent reticulated ceramic tiles. The multiple reticulated ceramic tiles can collectively form a single perforated flame holder 102. Alternatively, each reticulated ceramic tile can be considered a distinct perforated flame holder 102.

According to an embodiment, the fuel includes hydrogen. In another embodiment, the fuel includes methane.

According to an embodiment, the first distal flame holder body **102*a* is a reticulated ceramic distal flame holder body. The first distal flame holder body 102*a* may include a plurality of reticulated fibers. In an embodiment, the first distal flame holder body 102*a* includes zirconia. In another embodiment, the first distal flame holder body 102*a* includes alumina silicate. Additionally or alternatively, the first distal flame holder body 102*a* includes silicon carbide. In an embodiment, the reticulated fibers are formed from extruded mullite. In another embodiment, the reticulated fibers are formed from cordierite. In an embodiment, the first distal flame holder body 102*a* is configured to support a combustion reaction of the fuel and oxidant upstream, downstream, and within the first distal flame holder body 102*a*. In an embodiment, a surface of the distal flame holder body 102*a*, 102*b* includes about 10 pores per inch. In an embodiment, the first distal flame holder body 102*a*** includes a plurality of perforations formed as passages between the reticulated fibers. The perforations may be branching perforations.

According to an embodiment, the first distal flame holder body **102*a* includes a perforated flame holder tile including an input face 212 proximal to the fuel and oxidant source 101, and an output face 204 distal to the fuel and oxidant source 101. In an embodiment, the perforated flame holder tile includes perforations extending between the input face 212 and the output face 214. In an embodiment, the input face 212 corresponds to an extent of the reticulated fibers proximal to the fuel and oxidant source 101. In an embodiment, the output face 214 corresponds to an extend of the reticulated fibers distal to the fuel and oxidant source 101. In an embodiment, the perforated flame holder tile is configured to support at least a portion of the combustion reaction within the perforated flame holder tile between the input face 212 and the output face 214**.

Figure 6A:
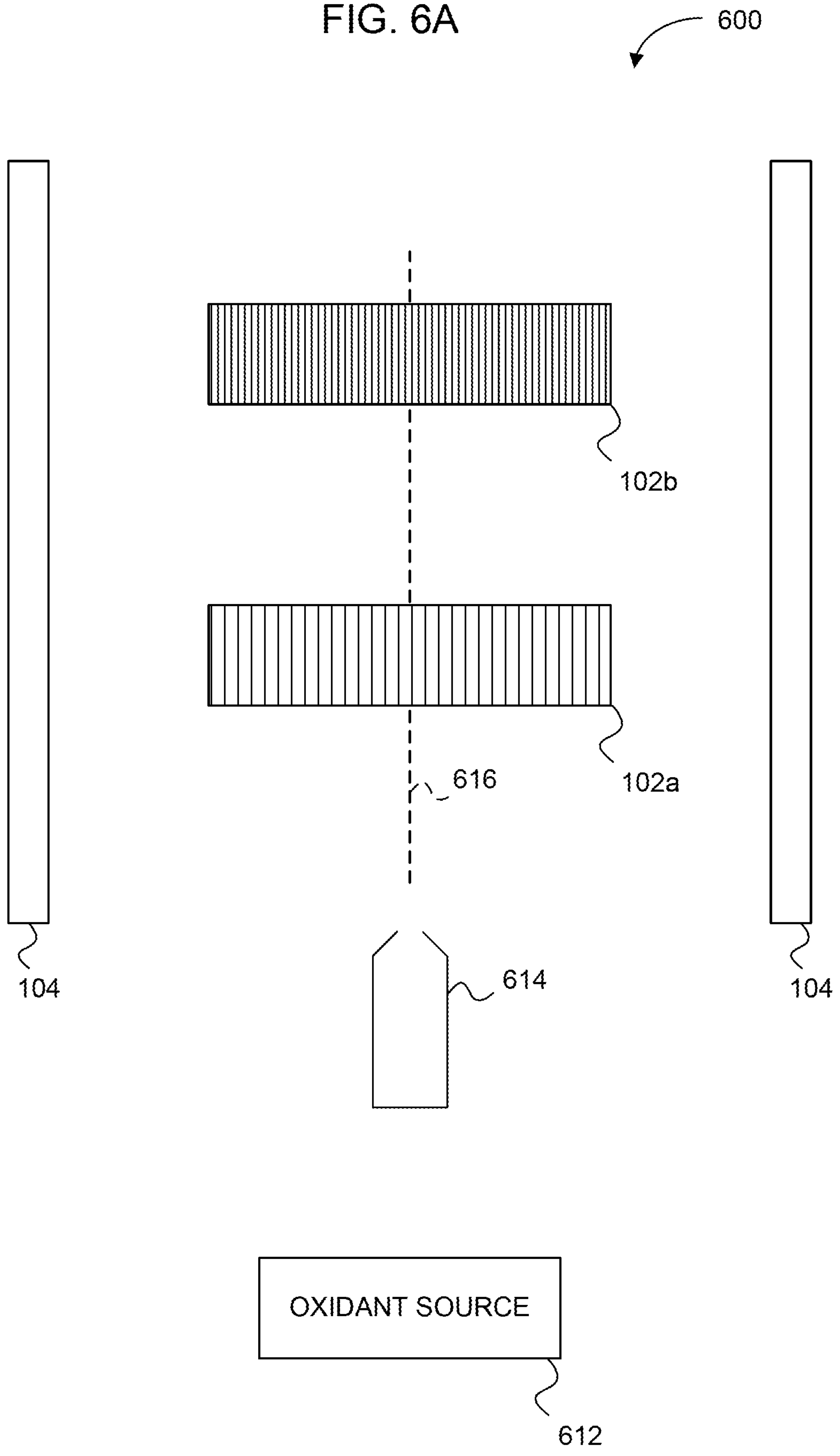
FIGS. 6A-6D are illustrations of a combustion system including multiple distal flame holder bodies in various states of operation, according to an embodiment.

FIG. 6A is an illustration of a combustion system 600, according to an embodiment. The combustion system 600 includes a first distal flame holder body **102*a*, a second distal flame holder body 102*b*, a thermal load 104, a fuel nozzle 614, and an oxidant source 612. According to an embodiment, the fuel nozzle 614, the first distal flame holder body 102*a*, and the second distal flame holder body 102*b* are aligned along an axis 616. The components of the combustion system 600** cooperate together to support one or more combustion reactions, according to one embodiment.

According to an embodiment, the fuel nozzle 614 is configured to output a flow of fuel 620 (see FIGS. 6B-6D) toward the first distal flame holder body **102*a***.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory near to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 6B-6D) into a combustion environment including the fuel nozzle 614, the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow the oxidant 618 into the combustion environment. The oxidant 618 mixes with the flow of fuel 620 to form a flow of fuel and oxidant 106.

According to an embodiment, the first distal flame holder body 102*a* is aligned to receive the flow of fuel and oxidant 106 from the fuel nozzle 614 and the oxidant source 612. The first distal flame holder body 102*a* is configured to support a first combustion reaction 108*a* of the flow of fuel and oxidant 106 at least partially within the first distal flame holder body 102*a*.

According to an embodiment, the second distal flame holder body 102*b* is configured to receive combustion products 110 from the first combustion reaction 108*a*. Alternatively, or additionally, the second distal flame holder body 102*b* is configured to receive a portion of the flow of fuel and oxidant 106 via the first distal flame holder body 102*a*. The second distal flame holder body 102*b* configured to support a second combustion reaction 108*b* from one or both of the combustion products 110 and the flow of fuel and oxidant 106.

According to an embodiment, the combustion system 600 can include one or more preheating mechanisms to preheat the first distal flame holder body 102*a* and/or the second distal flame holder body 102*b* to a threshold temperature. According to an embodiment, the first combustion reaction 108*a* preheats the second distal flame holder body 102*b* to the threshold temperature.

Figure 6B:
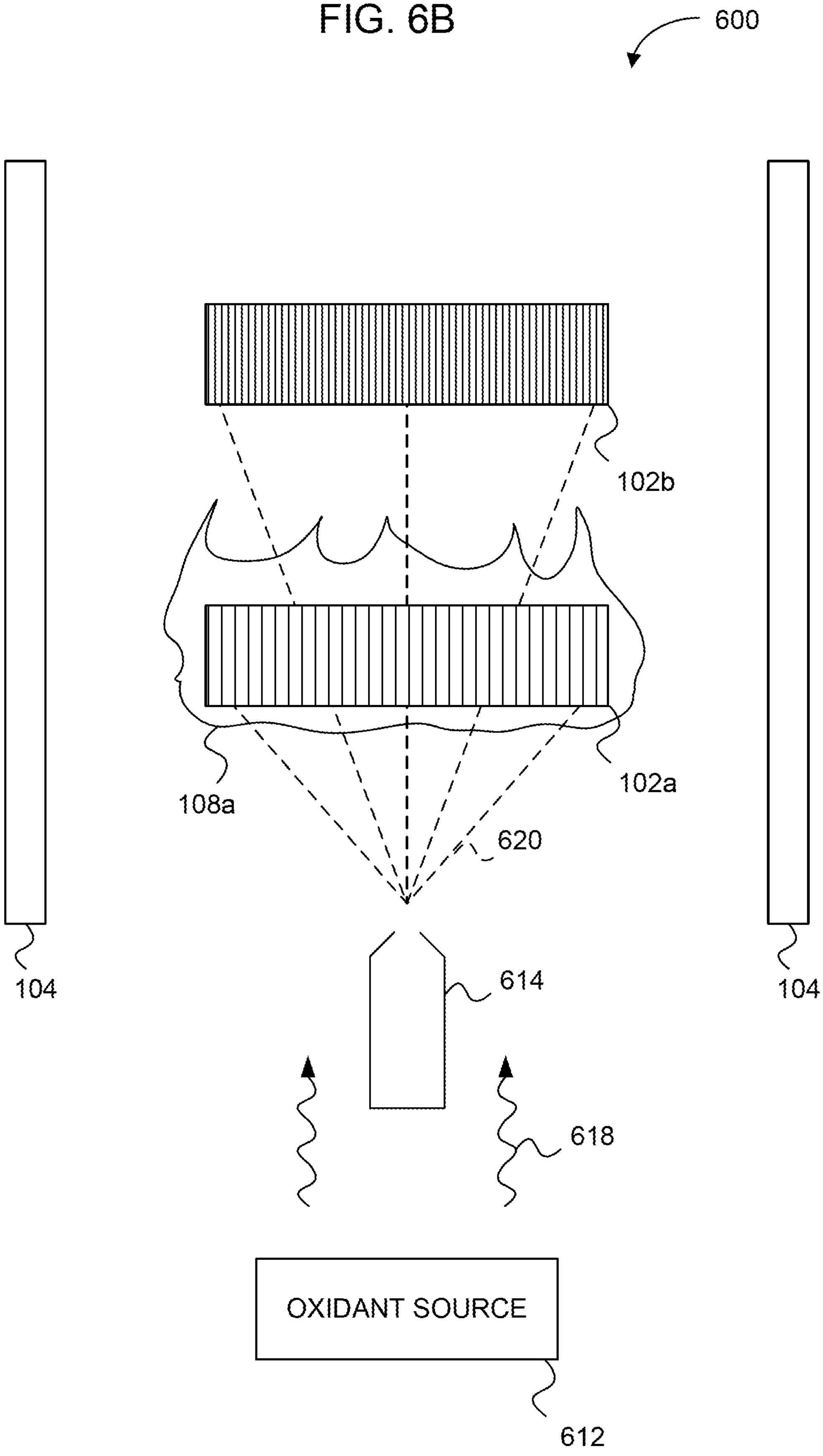

FIG. 6B is an illustration of the combustion system 600 in a first operating condition, according to one embodiment. The oxidant source 612 outputs an oxidant 618. The fuel nozzle 614 outputs the flow of fuel 620. The oxidant 618 and the flow of fuel 620 mix together to form the flow of fuel and oxidant 106. The first distal flame holder body 102*a* receives the flow of fuel and oxidant 106. Because the first distal flame holder body 102*a* has been preheated to the threshold temperature, the first distal flame holder body 102*a* supports and holds a first combustion reaction 108*a* of the fuel and oxidant.

According to an embodiment, the first distal flame holder body 102*a* generates combustion products 110 with the first combustion reaction 108*a*. The combustion products 110 can include products of the first combustion reaction 108*a* including partially combusted fuel, oxidant, and flue gases. According to an embodiment, the combustion products 110 are very hot. The flow of hot combustion products 110 is received by the second distal flame holder body 102*b*. The flow of hot combustion products 110 heat the second distal flame holder body 102*b*.

According to an embodiment, a portion of the flow of fuel and oxidant 106 is received by the second distal flame holder body 102*b*. The portion of the flow of fuel and oxidant 106 received by the second distal flame holder body 102*b* is heated by passing through or adjacent to the first distal flame holder body 102*a*.

While FIG. 6B shows that the second combustion reaction 108*b* is not present, in practice, a relatively small amount combustion may be held by the second distal flame holder body 102*b* while the first distal flame holder body 102*a* holds nearly all of the combustion occurring within the combustion system 600, according to one embodiment.

Figure 6C:
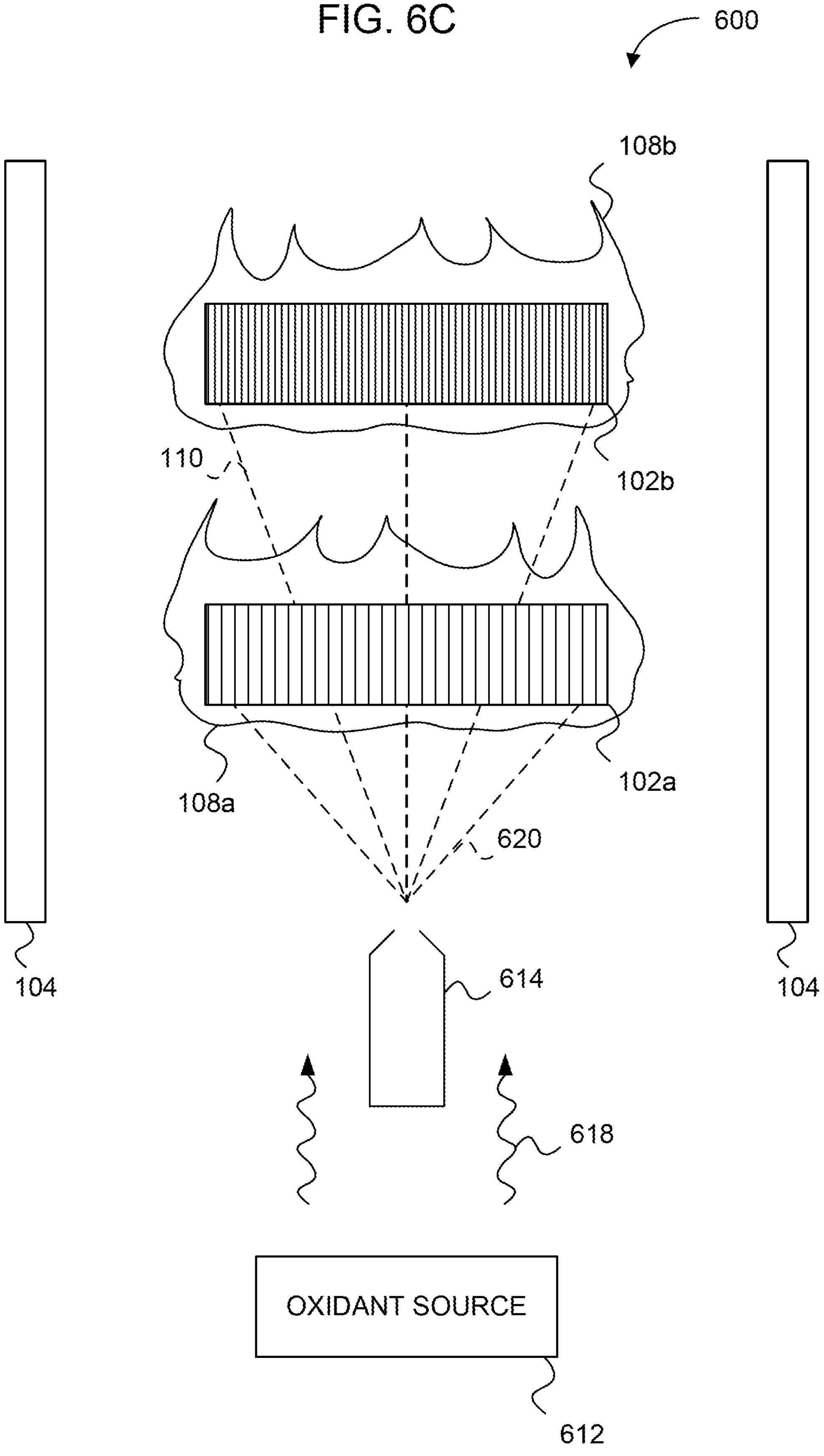

FIG. 6C is an illustration of the combustion system 600 in a second operating condition. In the second operating condition, the first distal flame holder body 102*a* holds the first combustion reaction 108*a* and the second distal flame holder body 102*b* holds the second combustion reaction 108*b*.

According to an embodiment, the oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder body 102*a* receives the flow of fuel and oxidant 106 from the oxidant source 612 and the fuel nozzle 614. Because the first distal flame holder body 102*a* has been preheated to the threshold temperature, the first distal flame holder body 102*a* supports and holds a first combustion reaction 108*a* of the fuel and oxidant.

According to an embodiment, the second distal flame holder body 102*b* receives a portion of the flow of fuel and oxidant 106 and/or a flow of combustion products 110. Because the second distal flame holder body 102*b* has been preheated to the threshold temperature, the second distal flame holder body 102*b* supports the second combustion reaction 108*b*. Thus, in one embodiment, the combustion system 600 can operate in a second operating condition in which the first distal flame holder body 102*a* and the second distal flame holder body 102*b* simultaneously support substantial first and second combustion reactions 108*a*, 108*b*.

According to an embodiment, the combustion products 110 can include compounds that are at intermediate steps in the process of complete combustion and thus have not been completely combusted. The second distal flame holder body 102*b* receives the incompletely combusted combustion products 110 and the combustion process continues within the second distal flame holder body 102*b*, resulting in complete or more complete combustion of the incompletely combusted combustion products 110 from the first combustion reaction 108*a*. In this way, the combustion of the flow of fuel and oxidant 106 can be spread between the first and second distal flame holder bodies 102*a*, 102*b*. According to an embodiment, the second distal flame holder body 102*b* holds a second combustion reaction 108*b* of a portion of the flow of fuel and oxidant 106 and the incompletely combusted combustion products 110.

Figure 6D:
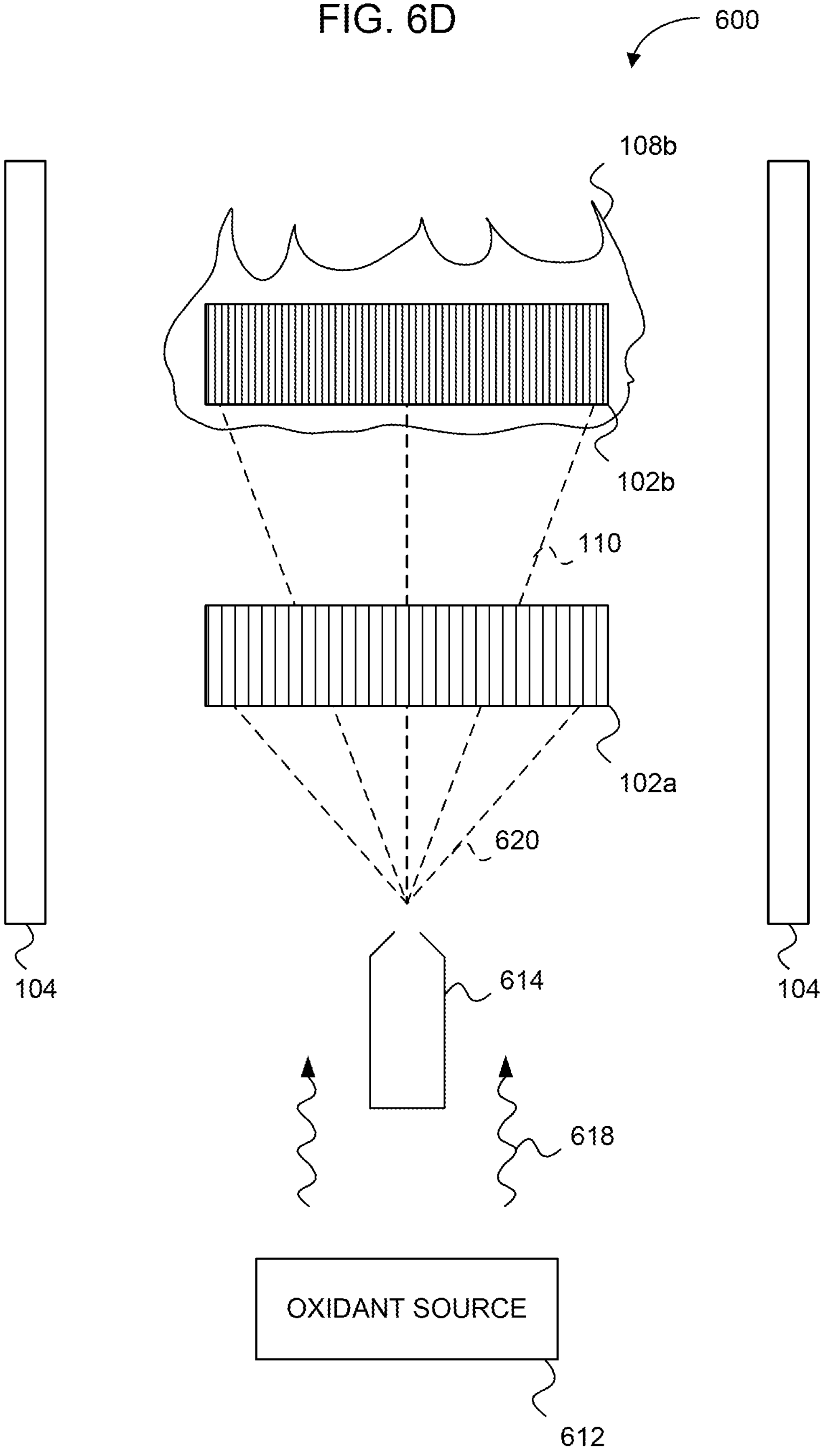

FIG. 6D is an illustration of the combustion system 600 in a third operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The second distal flame holder body 102*b* receives the flow of fuel and oxidant 106. Because the second distal flame holder body 102*b* has been preheated to the threshold temperature, the second distal flame holder body 102*b* supports a second combustion reaction 108*b* of the fuel and oxidant.

According to an embodiment, conditions within the combustion system 600, including one or more of fuel flow parameters, oxidant flow parameters, fuel type, thermal load 104 conditions, and relative positioning of the components of the combustion system, can result in the first distal flame holder body 102*a* being unable to hold the first combustion reaction 108*a* of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support a second combustion reaction 108*b* of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame holder body 102*b* to stably support a second combustion reaction 108*b* of the flow of fuel and oxidant 106, including more complete combustion of the flow of fuel and oxidant 106.

While FIG. 6D shows that the first combustion reaction 108*a* is not present, in practice, a relatively small amount of combustion reaction may be held by the first distal flame holder body 102*a* while the second distal flame holder body 102*b* holds nearly all of the combustion occurring within the combustion system 600, according to one embodiment.

According to an embodiment, the combustion system 600 can transfer between the various operating conditions based on the parameters of the combustion system 600 including fuel type, fuel speed, the type of thermal load 104, and current conditions of the thermal load 104.

Figure 7A:
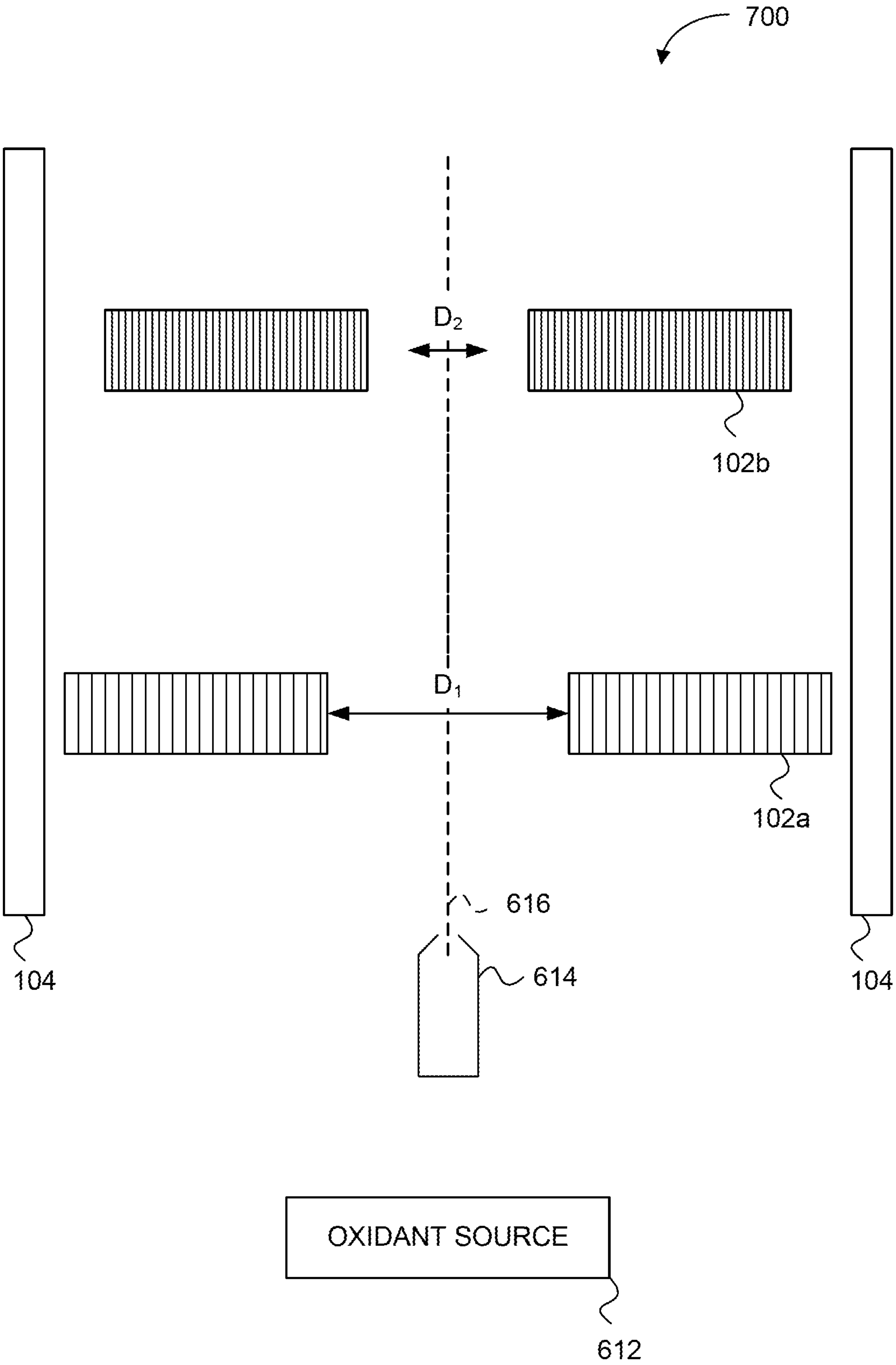
FIGS. 7A-7D are illustrations of a combustion system including multiple distal flame holder bodies in various states of operation, according to an embodiment.

FIG. 7A is an illustration of a combustion system 700, according to an embodiment. The combustion system 700 includes multiple first distal flame holder bodies 102*a*, multiple second distal flame holder bodies 102*b*, a thermal load 104, a fuel nozzle 614, and an oxidant source 612. According to an embodiment, the fuel nozzle 614, the first distal flame holder bodies 102*a*, and the second distal flame holder bodies 102*b* are aligned along an axis 616. The first distal flame holder bodies 102*a* are separated from each other by a gap around the axis 616. The second distal flame holder bodies 102*b* are separated from each other by a smaller gap around the axis 616. The components of the combustion system 700 cooperate together to support one or more combustion reactions, according to one embodiment.

According to an embodiment, the fuel nozzle 614 is configured to output a flow of fuel 620 (see FIGS. 7B-7D) toward the first distal flame holder bodies 102*a* and the second distal flame holder bodies 102*b*.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory nearer to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 7B-7D) into a combustion environment including the fuel nozzle 614 and the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow the oxidant 618 into the combustion environment. The oxidant 618 mixes with the flow of fuel 620 to form a flow of fuel and oxidant 106.

According to an embodiment, the first distal flame holder body 102*a* is aligned to receive the flow of fuel and oxidant 106 from the fuel nozzle 614 and the oxidant source 612. The first distal flame holder body 102*a* is configured to support a first combustion reaction 108*a* of the flow of fuel and oxidant 106 at least partially within the first distal flame holder body 102*a*.

According to an embodiment, the second distal flame holder body 102*b* is configured to receive combustion products 110 from the first combustion reaction 108*a*. Alternatively, or additionally, the second distal flame holder body 102*b* is configured to receive a portion of the flow of fuel and oxidant 106 via the first distal flame holder body 102*a*. The second distal flame holder body 102*b* configured to support a second combustion reaction 108*b* from one or both of the combustion products 110 and the flow of fuel and oxidant 106.

According to an embodiment, the combustion system 700 can include one or more preheating mechanisms to preheat the first distal flame holder body 102*a* and/or the second distal flame holder body 102*b* to a threshold temperature. According to an embodiment, the first combustion reaction 108*a* preheats the second distal flame holder body 102*b* to the threshold temperature.

Figure 7B:
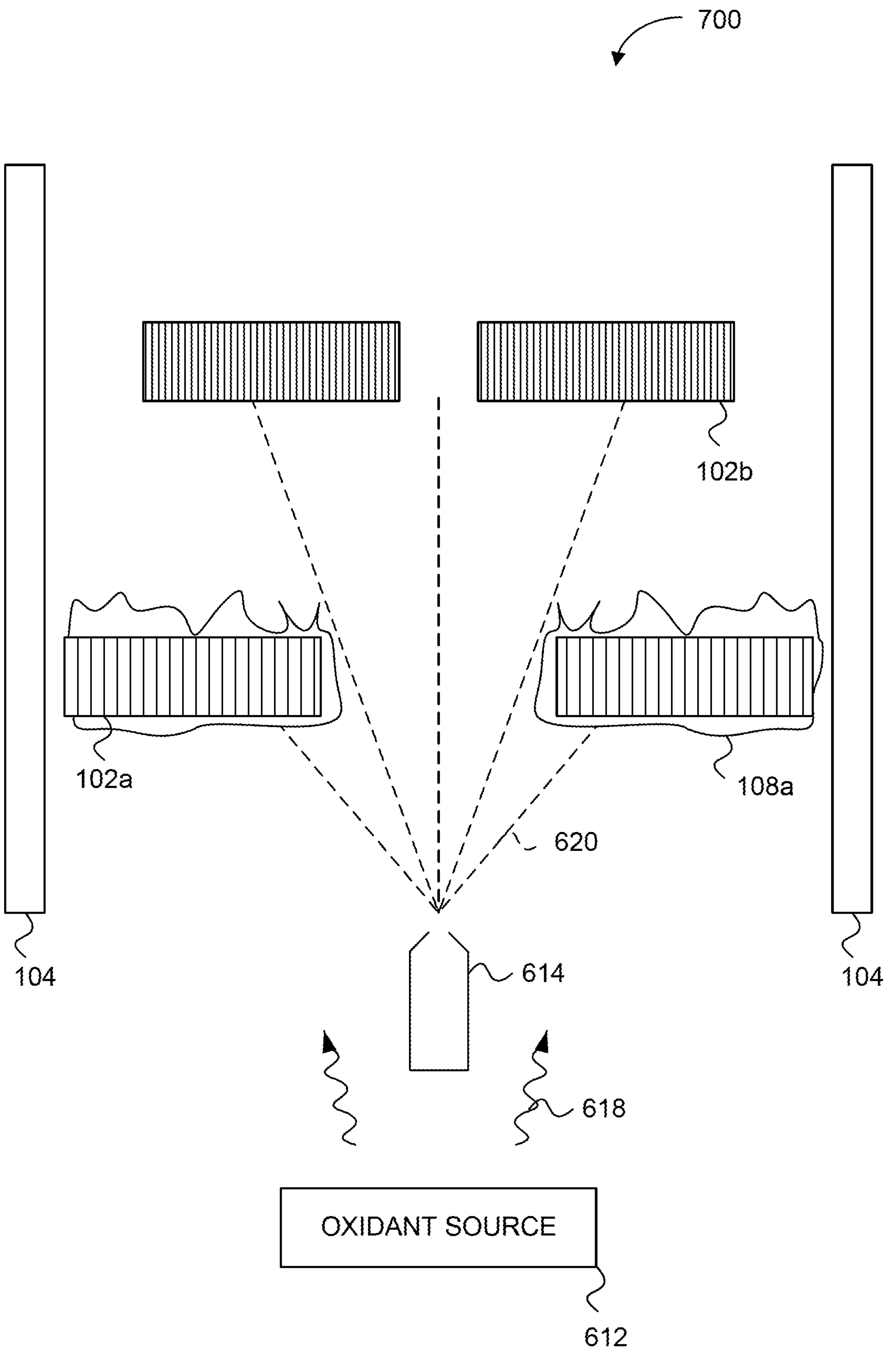

FIG. 7B is an illustration of the combustion system 700 in a first operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder bodies 102*a* receive the flow of fuel and oxidant 106. Because the first distal flame holder bodies 102*a* have been preheated to the threshold temperature, the first distal flame holder bodies 102*a* support a first combustion reaction 108*a* of the fuel and oxidant.

According to an embodiment, the first distal flame holder body 102*a* generates combustion products 110 with the first combustion reaction 108*a*. The combustion products 110 can include products of the first combustion reaction 108*a* including partially combusted fuel, oxidant, and flue gases. According to an embodiment, the combustion products 110 are very hot. The flow of hot combustion products 110 is received by the second distal flame holder bodies 102*b*. The flow of hot combustion products 110 heat the second distal flame holder body 102*b*.

According to an embodiment, a portion of the flow of fuel and oxidant 106 is received by the second distal flame holder bodies 102*b* via the gap that separates the first distal flame holder bodies 102*a*. The portion of the flow of fuel and oxidant 106 received by the second distal flame holder bodies 102*b* is heated by passing adjacent to the first distal flame holder body 102*a*.

While FIG. 7B shows that the second combustion reaction 108*b* is not present, in practice, a relatively small amount combustion may be held by the second distal flame holder body 102*b* while the first distal flame holder body 102*a* holds nearly all of the combustion occurring within the combustion system 700, according to one embodiment.

Figure 7C:
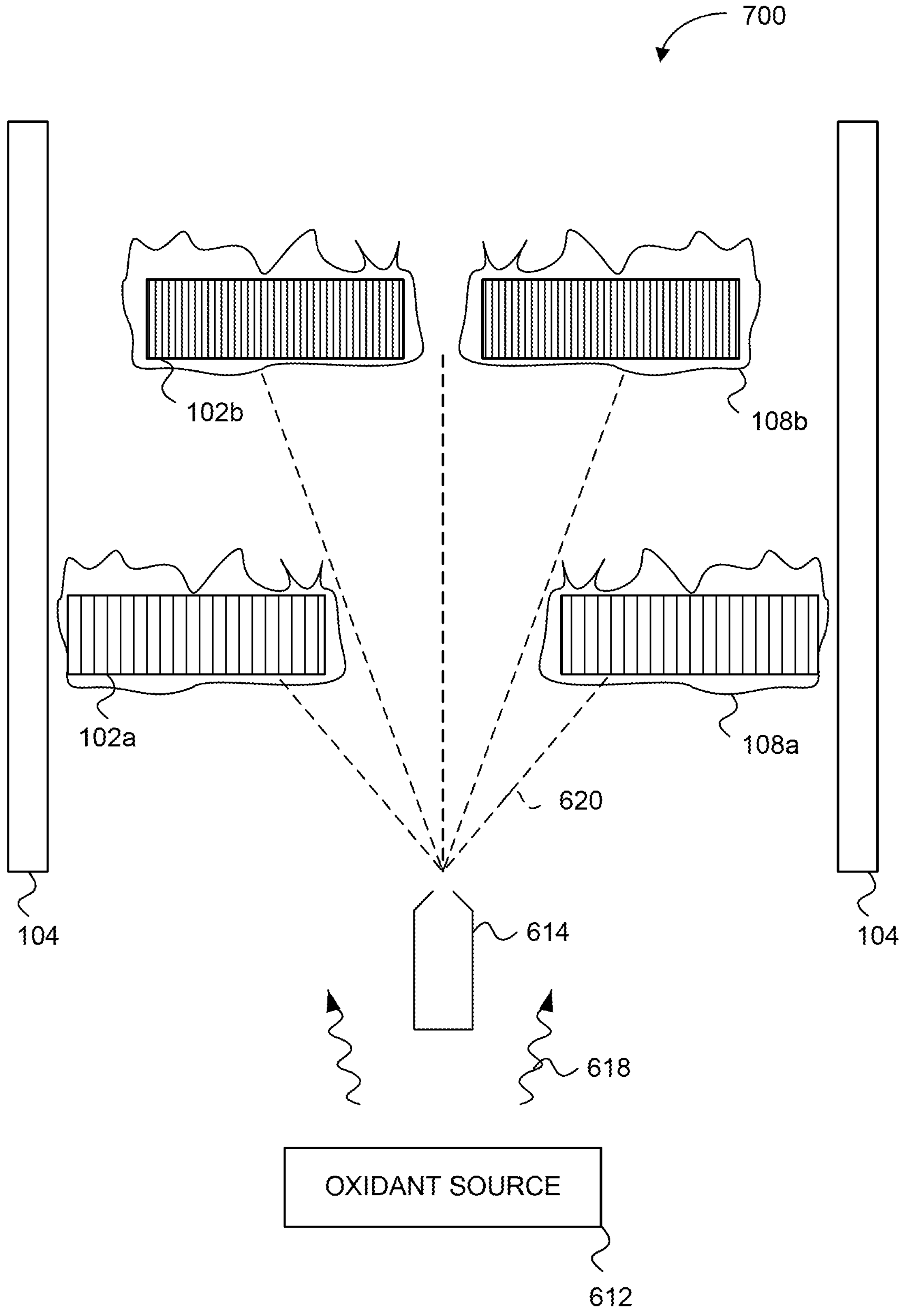

FIG. 7C is an illustration of the combustion system 700 in a second operating condition. In the second operating condition, the first distal flame holder bodies 102*a* hold the first combustion reaction 108*a* and the second distal flame holder bodies 102*b* hold the second combustion reaction 108*b*.

According to an embodiment, the oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder bodies 102*a* receive the flow of fuel and oxidant 106 from the oxidant source 612 and the fuel nozzle 614. Because the first distal flame holder bodies 102*a* have been preheated to the threshold temperature, the first distal flame holder bodies 102*a* support and hold a first combustion reaction 108*a* of the fuel and oxidant.

According to an embodiment, the second distal flame holder bodies 102*b* receive a portion of the flow of fuel and oxidant 106 and/or a flow of combustion products 110. Because the second distal flame holder bodies 102*b* have been preheated to the threshold temperature, the second distal flame holder bodies 102*b* support the second combustion reaction 108*b*. Thus, in one embodiment, the combustion system 700 can operate in a second operating condition in which the first distal flame holder bodies 102*a* and the second distal flame holder bodies 102*b* simultaneously support substantial first and second combustion reactions 108*a*, 108*b*.

According to an embodiment, the combustion products 110 can include compounds that are at intermediate steps in the process of complete combustion and thus have not been completely combusted. The second distal flame holder body 102*b* receives the incompletely combusted combustion products 110 and the combustion process continues within the second distal flame holder body 102*b*, resulting in complete or more complete combustion of the incompletely combusted combustion products 110 from the first combustion reaction 108*a*. In this way, the combustion of the flow of fuel and oxidant 106 can be spread between the first and second distal flame holder bodies 102*a*, 102*b*. According to an embodiment, the second distal flame holder body 102*b* holds a second combustion reaction 108*b* of a portion of the flow of fuel and oxidant 106 and the incompletely combusted combustion products 110.

Figure 7D:
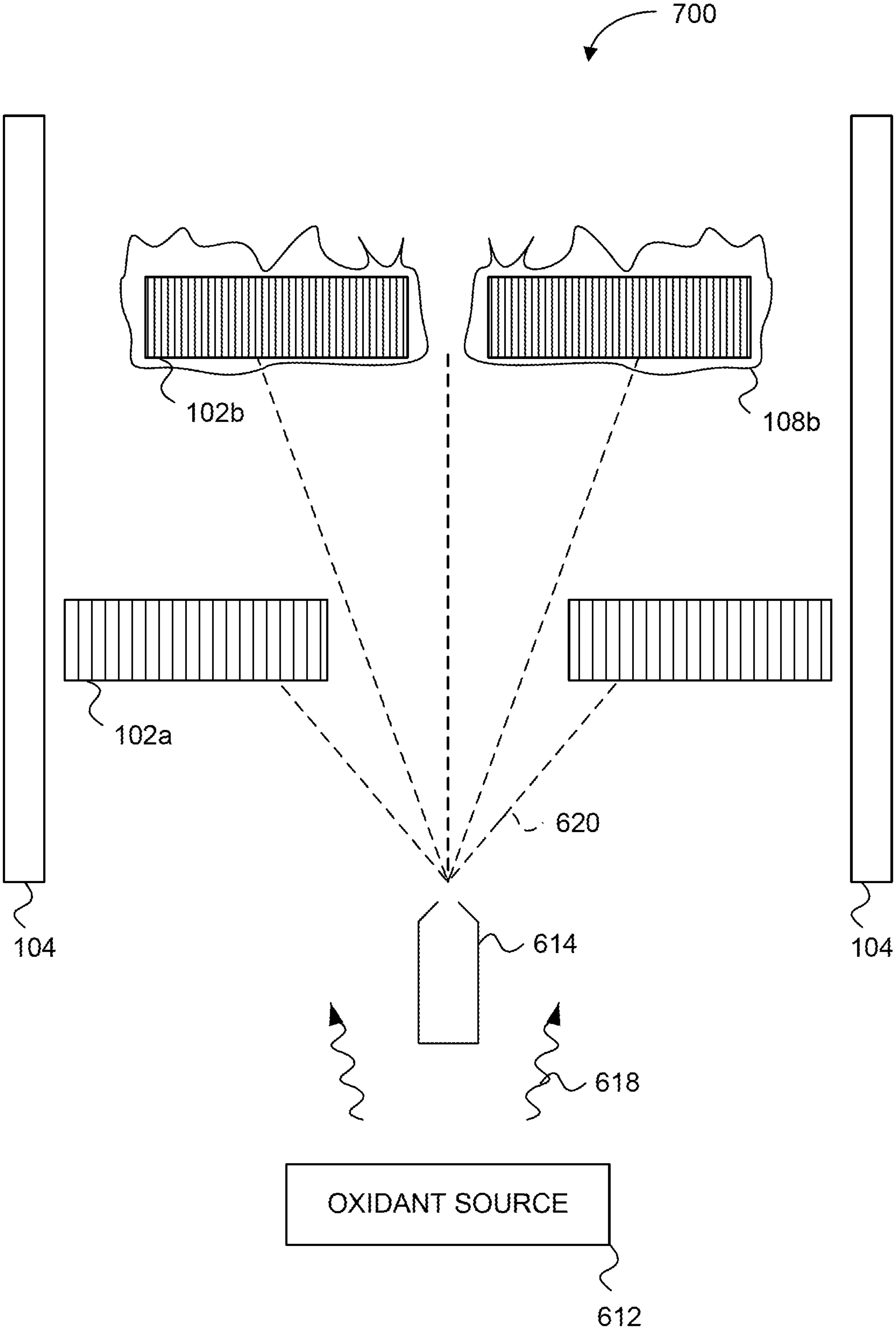

FIG. 7D is an illustration of the combustion system 700 in a third operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The distal perforated flame holder bodies 102*b* receive the flow of fuel and oxidant 106 from the fuel nozzle 614 and the oxidant source 612. Because the second distal flame holder bodies 102*b* have been preheated to the threshold temperature, the second distal flame holder bodies 102*b* support a second combustion reaction 108*b* of the fuel and oxidant.

According to an embodiment, conditions within the combustion system 700, including one or more of fuel flow parameters, oxidant flow parameters, fuel type, thermal load 104 conditions, and relative positioning of the components of the combustion system, can result in the first distal flame holder body 102*a* being unable to hold the first combustion reaction 108*a* of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support a second combustion reaction 108*b* of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame holder body 102*b* to stably support a second combustion reaction 108*b* of the flow of fuel and oxidant 106, including more complete combustion of the flow of fuel and oxidant 106.

While FIG. 7D shows that the first combustion reaction 108*a* is not present, in practice, a relatively small amount of combustion reaction may be held by the first distal flame holder bodies 102*a* while the second distal flame holder bodies 102*b* hold nearly all of the combustion occurring within the combustion system 700, according to one embodiment.

According to an embodiment, the combustion system 700 can transfer between the various operating conditions based on the parameters of the combustion system 700 including fuel type, fuel speed, the type of thermal load 104, and current conditions of the thermal load 104.

Figure 8A:
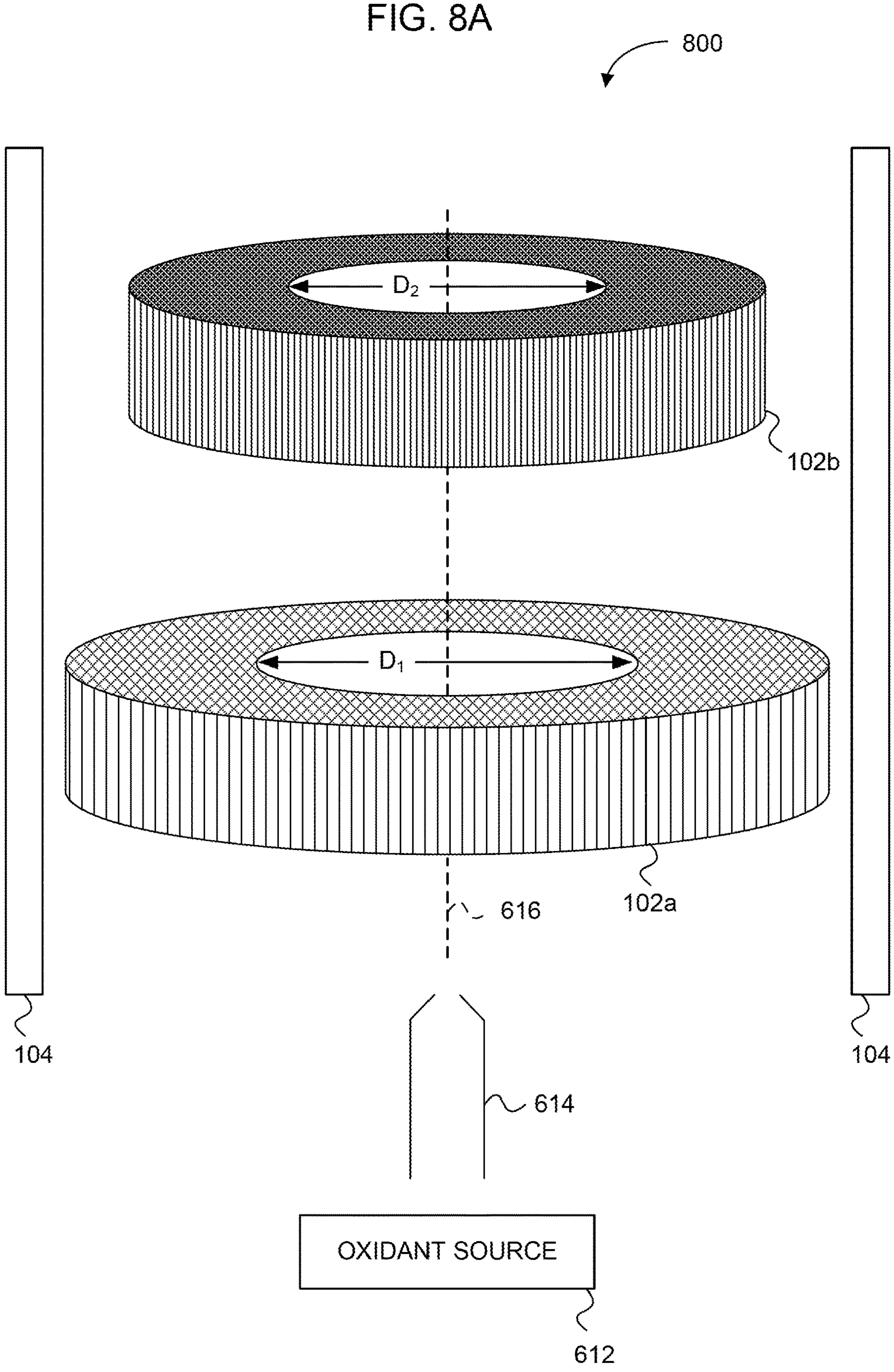
FIGS. 8A-8D are illustrations of a combustion system including multiple distal flame holder bodies in various states of operation, according to an embodiment.

FIG. 8A is an illustration of a combustion system 800, according to an embodiment. The combustion system 800 includes a first distal flame holder body 102*a*, a second distal flame holder body 102*b*, a thermal load 104, a fuel nozzle 614, and an oxidant source 612. According to an embodiment, the fuel nozzle 614, the first distal flame holder body 102*a*, and the second distal flame holder body 102*b* are aligned along an axis 616. The first distal flame holder body 102*a* is a toroid including an inner aperture having a diameter D1. The second distal flame holder body 102*b* is a toroid including an inner aperture having a diameter D2. The components of the combustion system 800 cooperate together to support one or more combustion reactions, according to one embodiment.

According to an embodiment, the fuel nozzle 614 is configured to output a flow of fuel 620 (see FIGS. 8B-8D) toward the first distal flame holder body 102*a*.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory near to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 6B-6D) into a combustion environment including the fuel nozzle 614 and the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow oxidant 618 into the combustion environment. The oxidant 618 mixes with the flow of fuel 620 to form a flow of fuel and oxidant 106.

According to an embodiment, the first distal flame holder body 102*a* is aligned to receive the flow of fuel and oxidant 106 from the fuel nozzle 614 and the oxidant source 612. The first distal flame holder body 102*a* is configured to support a first combustion reaction 108*a* of the flow of fuel and oxidant 106 at least partially within the first distal flame holder body 102*a*.

According to an embodiment, the second distal flame holder body 102*b* is configured to receive combustion products 110 from the first combustion reaction 108*a*. Alternatively, or additionally, the second distal flame holder body 102*b* is configured to receive a portion of the flow of fuel and oxidant 106 via the aperture in the first distal flame holder body 102*a*. The second distal flame holder body 102*b* configured to support a second combustion reaction 108*a* from one or both of the combustion products 110 and the flow of fuel and oxidant 106.

According to an embodiment, the combustion system 800 can include one or more preheating mechanisms to preheat the first distal flame holder body 102*a* and/or the second distal flame holder body 102*b* to a threshold temperature. According to an embodiment, the first combustion reaction 108*a* preheats the second distal flame holder body 102*b* to the threshold temperature.

As used herein, the term "threshold temperature" may be substantially equal to an autoignition temperature of the fuel and air mixture.

Figure 8B:
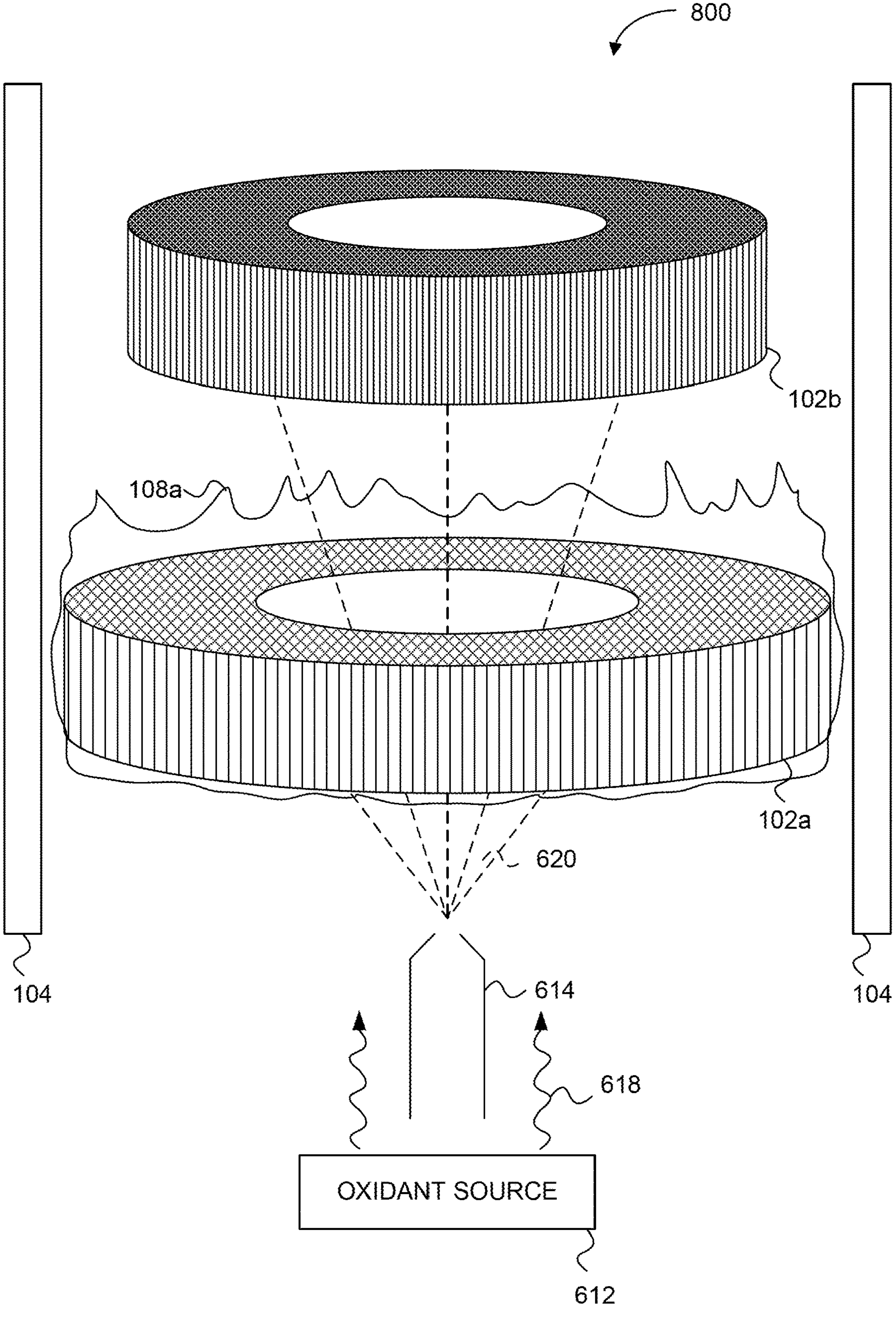

FIG. 8B is an illustration of the combustion system 800 in a first operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder body 102*a* receives the flow of fuel and oxidant 106 from the fuel and oxidant source 101. Because the first distal flame holder body 102*a* has been preheated to the threshold temperature, the first distal flame holder body 102*a* supports and holds a first combustion reaction 108*a* of the fuel and oxidant.

According to an embodiment, the first distal flame holder body 102*a* generates combustion products 110 with the first combustion reaction 108*a*. The combustion products 110 can include products of the first combustion reaction 108*a* including partially combusted fuel, oxidant, and flue gases. According to an embodiment, the combustion products 110 are very hot. The flow of hot combustion products 110 is received by the second distal flame holder body 102*b*. The flow of hot combustion products 110 heat the second distal flame holder body 102*b*.

According to an embodiment, a portion of the flow of fuel and oxidant 106 is received by the second distal flame holder body 102*b*. The portion of the flow of fuel and oxidant 106 received by the second distal flame holder body 102*b* is heated by passing through or adjacent to the first distal flame holder body 102*a*.

While FIG. 8B shows that the second combustion reaction 108*b* is not present, in practice, a relatively small amount combustion may be held by the second distal flame holder body 102*b* while the first distal flame holder body 102*a* holds nearly all of the combustion occurring within the combustion system 800, according to one embodiment.

Figure 8C:
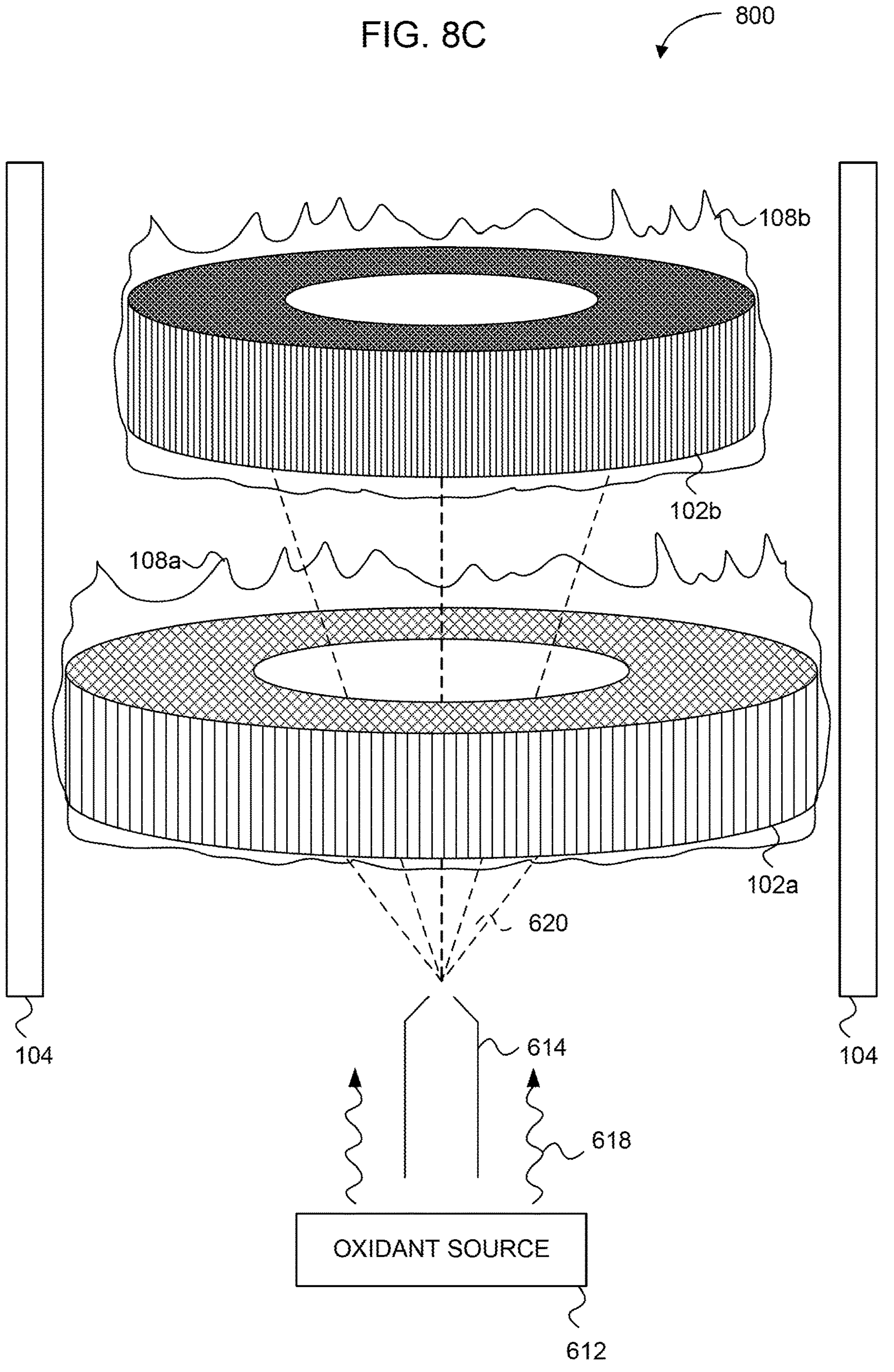

FIG. 8C is an illustration of the combustion system 800 in a second operating condition. In the second operating condition, the first distal flame holder body 102*a* holds the first combustion reaction 108*a* and the second distal flame holder body 102*b* holds the second combustion reaction 108*b*.

According to an embodiment, the oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder body 102*a* receives the flow of fuel and oxidant 106 from the oxidant source 612 and the fuel nozzle 614. Because the first distal flame holder body 102*a* has been preheated to the threshold temperature, the first distal flame holder body 102*a* supports and holds a first combustion reaction 108*a* of the fuel and oxidant.

According to an embodiment, the second distal flame holder body 102*b* receives a portion of the flow of fuel and oxidant 106 and/or a flow of combustion products 110. Because the second distal flame holder body 102*b* has been preheated to the threshold temperature, the second distal flame holder body 102*b* supports the second combustion reaction 108*b*. Thus, in one embodiment, the combustion system 800 can operate in a second operating condition in which the first distal flame holder body 102*a* and the second distal flame holder body 102*b* simultaneously support substantial first and second combustion reactions 108*a*, 108*b*.

According to an embodiment, the combustion products 110 can include compounds that are at intermediate steps in the process of complete combustion and thus have not been completely combusted. The second distal flame holder body 102*b* receives the incompletely combusted combustion products 110 and the combustion process continues within the second distal flame holder body 102*b*, resulting in complete or more complete combustion of the incompletely combusted combustion products 110 from the first combustion reaction 108*a*. In this way, the combustion of the flow of fuel and oxidant 106 can be spread between the first and second distal flame holder bodies 102*a*, 102*b*. According to an embodiment, the second distal flame holder body 102*b* holds a second combustion reaction 108*b* of a portion of the flow of fuel and oxidant 106 and the incompletely combusted combustion products 110.

Figure 8D:
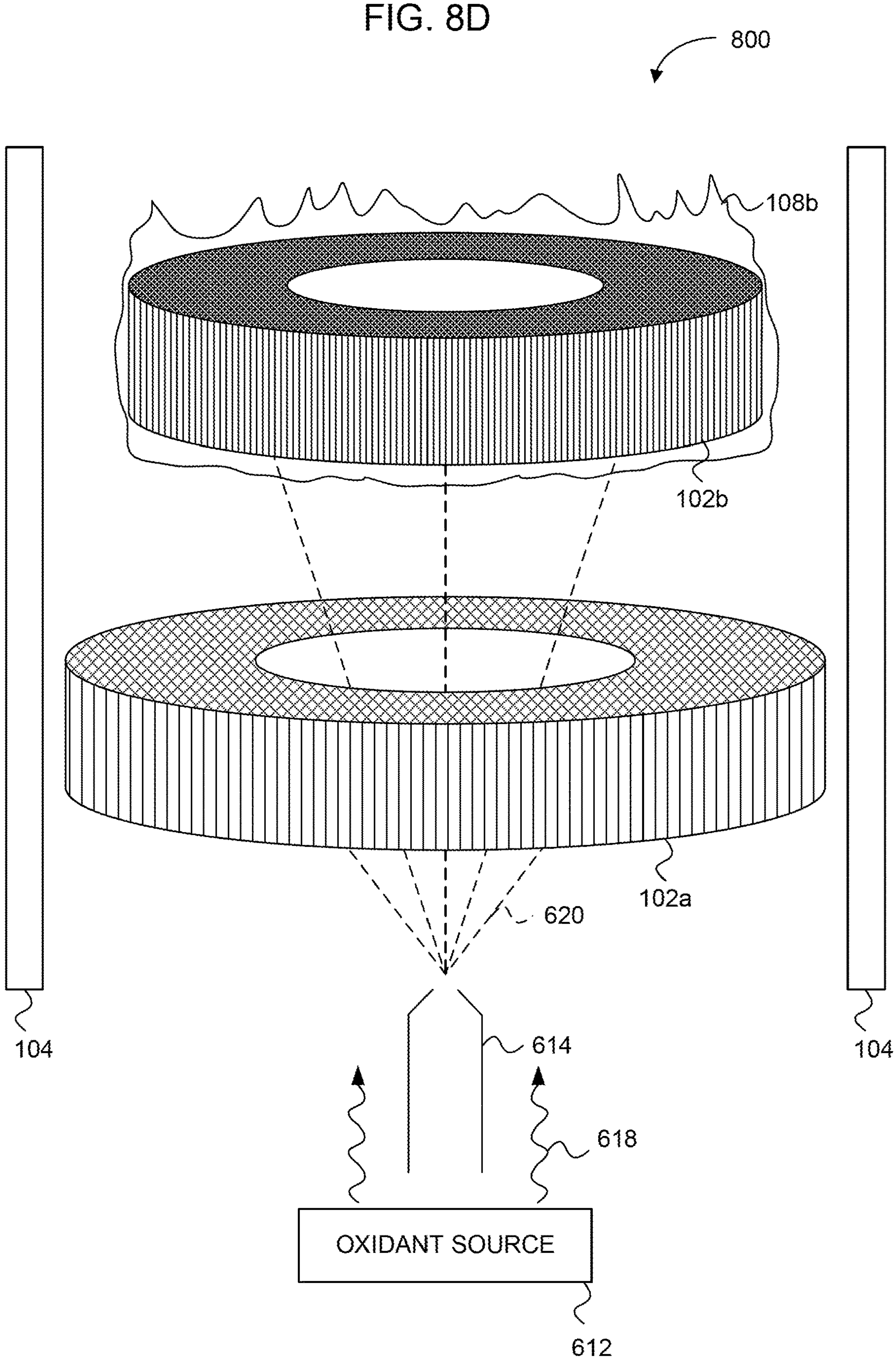

FIG. 8D is an illustration of the combustion system 800 in a third operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The second distal flame holder body 102*b* receives the flow of fuel and oxidant 106 from the fuel and oxidant source 101. Because the second distal flame holder body 102*b* has been preheated to the threshold temperature, the second distal flame holder body 102*b* supports a second combustion reaction 108*b* of the fuel and oxidant.

According to an embodiment, conditions within the combustion system 800, including one or more of fuel flow parameters, oxidant flow parameters, fuel type, thermal load 104 conditions, and relative positioning of the components of the combustion system, can result in the first distal flame holder body 102*a* being unable to hold the first combustion reaction 108*a* of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support a second combustion reaction 108*b* of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame holder body 102*b* to stably support a second combustion reaction 108*b* of the flow of fuel and oxidant 106, including more complete combustion of the flow of fuel and oxidant 106.

While FIG. 8D shows that the first combustion reaction 108*a* is not present, in practice, a relatively small amount of combustion reaction may be held by the first distal flame holder body 102*a* while the second distal flame holder body 102*b* holds nearly all of the combustion occurring within the combustion system 800, according to one embodiment.

According to an embodiment, the combustion system 800 can transfer between the various operating conditions based on the parameters of the combustion system 800 including fuel type, fuel speed, the type of thermal load 104, and current conditions of the thermal load 104.

Figure 9A:
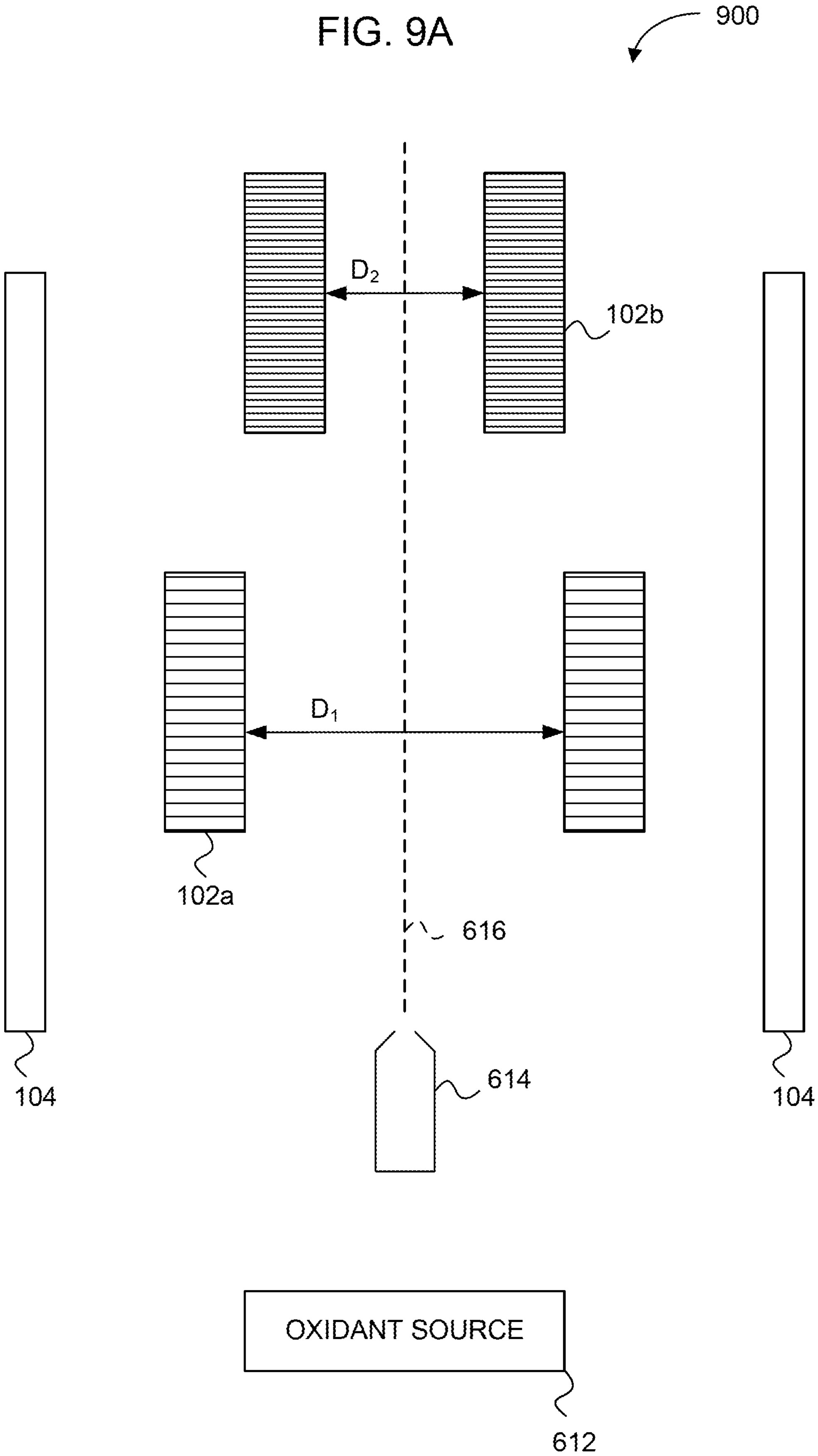
FIGS. 9A-9D are illustrations of a combustion system including multiple distal flame holder bodies in various states of operation, according to an embodiment.

FIG. 9A is an illustration of a combustion system 900, according to an embodiment. The combustion system 900 includes multiple first distal flame holder bodies 102*a*, multiple second distal flame holder bodies 102*b*, a thermal load 104, a fuel nozzle 614, and an oxidant source 612. According to an embodiment, the fuel nozzle 614, the first distal flame holder bodies 102*a*, and the second distal flame holder bodies 102*b* are aligned along an axis 616. The first distal flame holder bodies 102*a* are separated from each other by a gap around the axis 616. The second distal flame holder bodies 102*b* are separated from each other by a smaller gap around the axis 616. The first and second distal flame holder bodies 102*a*, 102*b* are arranged so that their input surfaces face in a direction transverse to the axis 616. The components of the combustion system 900 cooperate together to support one or more combustion reactions, according to one embodiment.

According to an embodiment, the fuel nozzle 614 is configured to output a flow of fuel 620 (see FIGS. 9B-9D) toward the first distal flame holder bodies 102*a* and the second distal flame holder bodies 102*b*.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory nearer to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 9B-9D) into a combustion environment including the fuel nozzle 614 and the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow oxidant 618 into the combustion environment. The oxidant 618 mixes with the flow of fuel 620 to form a flow of fuel and oxidant 106.

According to an embodiment, the first distal flame holder body 102*a* is aligned to receive the flow of fuel and oxidant 106 from the fuel nozzle 614 and the oxidant source 612. The first distal flame holder body 102*a* is configured to support a first combustion reaction 108*a* of the flow of fuel and oxidant 106 at least partially within the first distal flame holder body 102*a*.

According to an embodiment, the second distal flame holder body 102*b* is configured to receive combustion products 110 from the first combustion reaction 108*a*. Alternatively, or additionally, the second distal flame holder body 102*b* is configured to receive a portion of the flow of fuel and oxidant 106 via the first distal flame holder body 102*a*. The second distal flame holder body 102*b* configured to support a second combustion reaction 108*b* from one or both of the combustion products 110 and the flow of fuel and oxidant 106.

According to an embodiment, the combustion system 900 can include one or more preheating mechanisms to preheat the first distal flame holder body 102*a* and/or the second distal flame holder body 102*b* to a threshold temperature. According to an embodiment, the first combustion reaction 108*a* preheats the second distal flame holder body 102*b* to the threshold temperature.

Figure 9B:
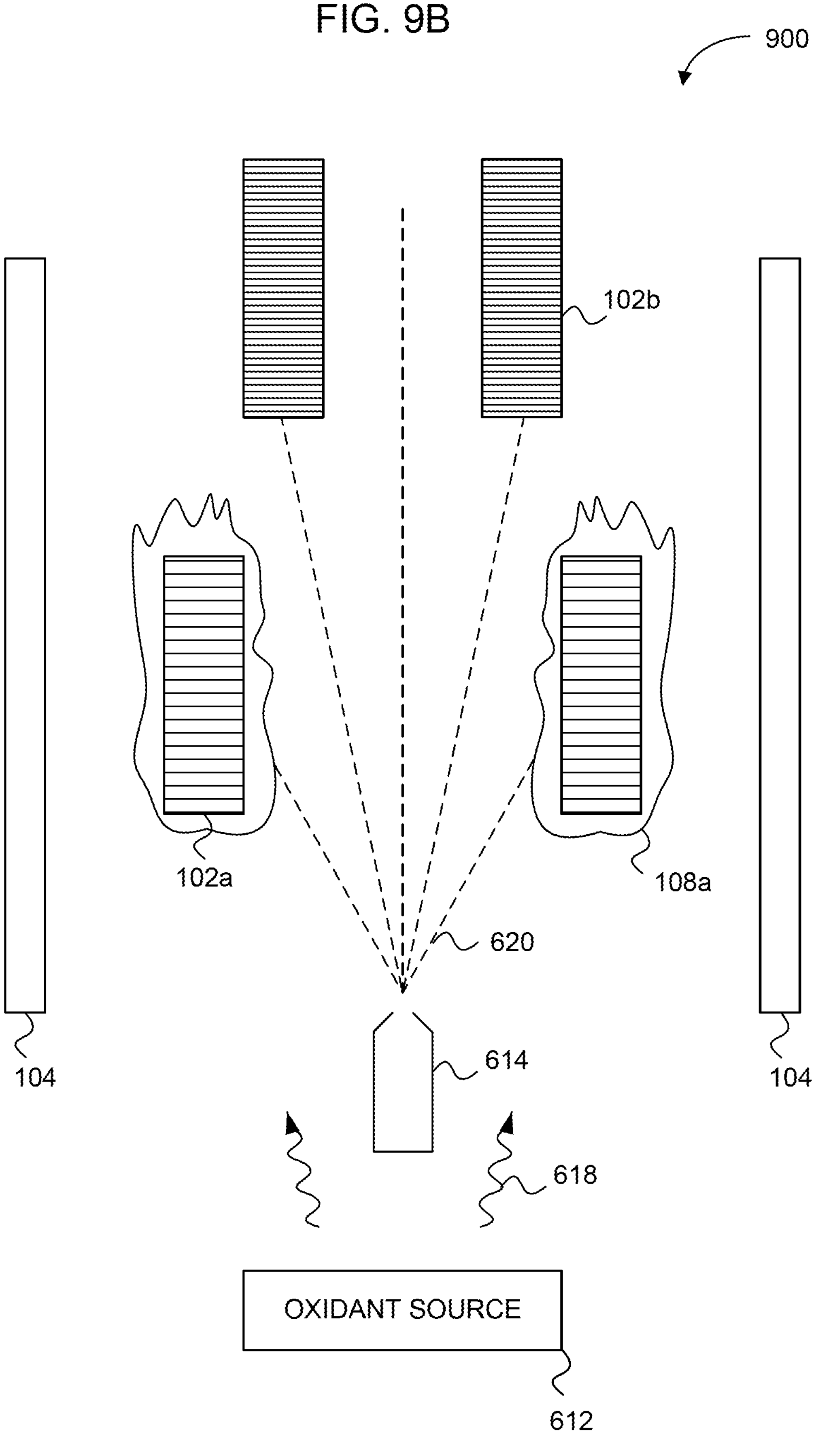

FIG. 9B is an illustration of the combustion system 900 in a first operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder bodies 102*a* receive the flow of fuel and oxidant 106 from the fuel and oxidant source 101. Because the first distal flame holder bodies 102*a* have been preheated to the threshold temperature, the first distal flame holder bodies 102*a* support a first combustion reaction 108*a* of the fuel and oxidant.

According to an embodiment, the first distal flame holder body 102*a* generates combustion products 110 with the first combustion reaction 108*a*. The combustion products 110 can include products of the first combustion reaction 108*a* including partially combusted fuel, oxidant, and flue gases. According to an embodiment, the combustion products 110 are very hot. The flow of hot combustion products 110 is received by the second distal flame holder bodies 102*b*. The flow of hot combustion products 110 heat the second distal flame holder body 102*b*.

According to an embodiment, a portion of the flow of fuel and oxidant 106 is received by the second distal flame holder bodies 102*b* via the gap that separates the first distal flame holder bodies 102*a*. The portion of the flow of fuel and oxidant 106 received by the second distal flame holder bodies 102*b* is heated by passing adjacent to the first distal flame holder body 102*a*.

While FIG. 9B shows that the second combustion reaction 108*b* is not present, in practice, a relatively small amount combustion may be held by the second distal flame holder body 102*b* while the first distal flame holder body 102*a* holds nearly all of the combustion occurring within the combustion system 900, according to one embodiment.

Figure 9C:
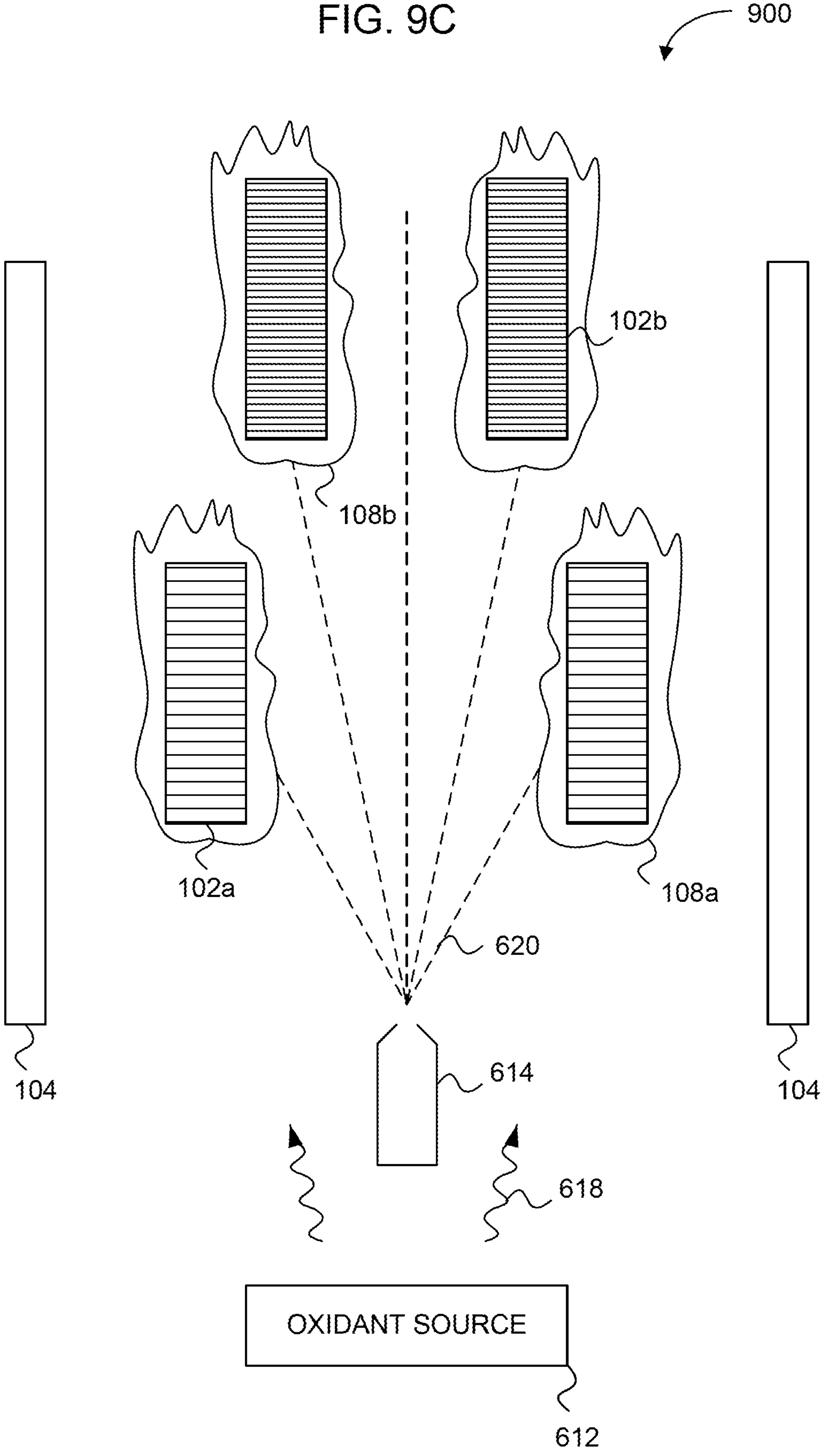

FIG. 9C is an illustration of the combustion system 900 in a second operating condition. In the second operating condition, the first distal flame holder bodies 102*a* hold the first combustion reaction 108*a* and the second distal flame holder bodies 102*b* hold the second combustion reaction 108*b*.

According to an embodiment, the oxidant source 612 outputs an oxidant 618. The fuel nozzle 614 outputs the flow of fuel 620. The oxidant 618 and the flow of fuel 620 mix together to form a flow of fuel and oxidant 106. The first distal flame holder bodies 102*a* receive the flow of fuel and oxidant 106 from the oxidant source 612 and the fuel nozzle 614. Because the first distal flame holder bodies 102*a* have been preheated to the threshold temperature, the first distal flame holder bodies 102*a* support and hold a first combustion reaction 108*a* of the fuel and oxidant.

According to an embodiment, the second distal flame holder bodies 102*b* receive a portion of the flow of fuel and oxidant 106 and/or a flow of combustion products 110. Because the second distal flame holder bodies 102*b* have been preheated to the threshold temperature, the second distal flame holder bodies 102*b* support the second combustion reaction 108*b*. Thus, in one embodiment, the combustion system 900 can operate in a second operating condition in which the first distal flame holder bodies 102*a* and the second distal flame holder bodies 102*b* simultaneously support substantial first and second combustion reactions 108*a*, 108*b*.

According to an embodiment, the combustion products 110 can include compounds that are at intermediate steps in the process of complete combustion and thus have not been completely combusted. The second distal flame holder body 102*b* receives the incompletely combusted combustion products 110 and the combustion process continues within the second distal flame holder body 102*b*, resulting in complete or more complete combustion of the incompletely combusted combustion products 110 from the first combustion reaction 108*a*. In this way, the combustion of the flow of fuel and oxidant 106 can be spread between the first and second distal flame holder bodies 102*a*, 102*b*. According to an embodiment, the second distal flame holder body 102*b* holds a second combustion reaction 108*b* of a portion of the flow of fuel and oxidant 106 and the incompletely combusted combustion products 110.

Figure 9D:
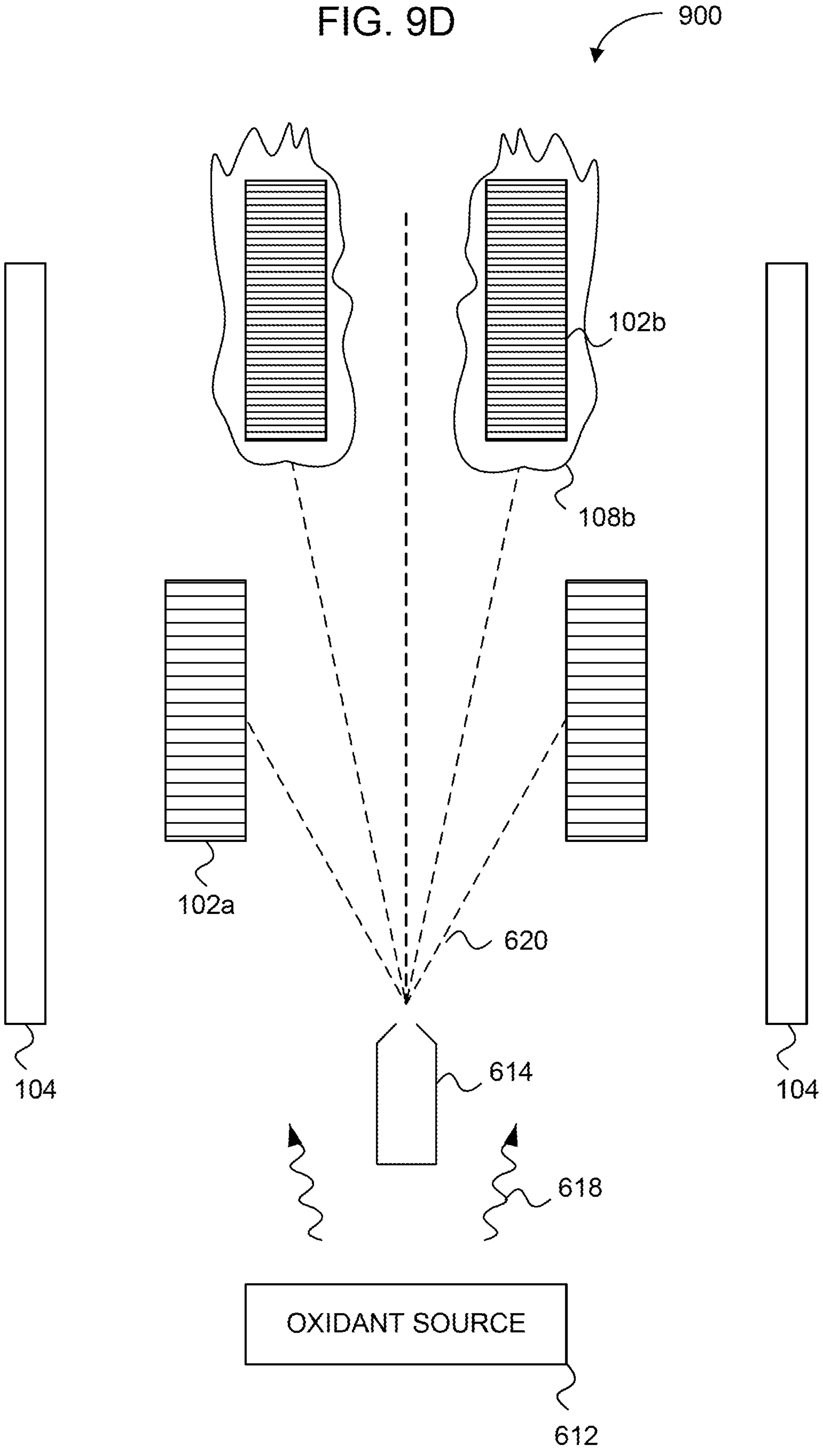

FIG. 9D is an illustration of the combustion system 900 in a third operating condition, according to one embodiment. The oxidant source 612 outputs an oxidant 618. The fuel nozzle 614 outputs the flow of fuel 620. The oxidant 618 and the flow of fuel 620 mix together to form a flow of fuel and oxidant flow. The second distal flame holder bodies 102*b* receive the flow of fuel and oxidant 106 from the fuel nozzle 614 and the oxidant source 612. Because the second distal flame holder bodies 102*b* have been preheated to the threshold temperature, the second distal flame holder bodies 102*b* support a second combustion reaction 108*b* of the fuel and oxidant.

According to an embodiment, conditions within the combustion system 900, including one or more of fuel flow parameters, oxidant flow parameters, fuel type, thermal load 104 conditions, and relative positioning of the components of the combustion system, can result in the first distal flame holder body 102*a* being unable to hold the first combustion reaction 108*a* of the fuel and oxidant. For example, when the flow rate of fuel and oxidant is high or when the thermal load 104 is high, the fuel may not have time to reach its autoignition temperature inside the first distal flame holder body 102*a*. In this case, the second distal flame holder body 102*b* can support a second combustion reaction 108*b* of the flow of fuel and oxidant 106 while combustion is substantially absent within the first distal flame holder body 102*a*. The second distal flame holder body 102*b* transfers heat to the first distal flame holder body 102*a*. As the flow of fuel and oxidant 106 passes through or adjacent to the first distal flame holder body 102*a*, the first distal flame holder body 102*a* heats the flow of fuel and oxidant 106. Preheating the flow of fuel and oxidant 106 in this manner can enhance the ability of the second distal flame holder body 102*b* to stably support a second combustion reaction 108*b* of the flow of fuel and oxidant 106, including more complete combustion of the flow of fuel and oxidant 106.

While FIG. 9D shows that the first combustion reaction 108*a* is not present, in practice, a relatively small amount of combustion reaction may be held by the first distal flame holder bodies 102*a* while the second distal flame holder bodies 102*b* hold nearly all of the combustion occurring within the combustion system 900, according to one embodiment.

According to an embodiment, the combustion system 900 can transfer between the various operating conditions based on the parameters of the combustion system 900 including fuel type, fuel speed, the type of thermal load 104, and current conditions of the thermal load 104.

Figure 10:
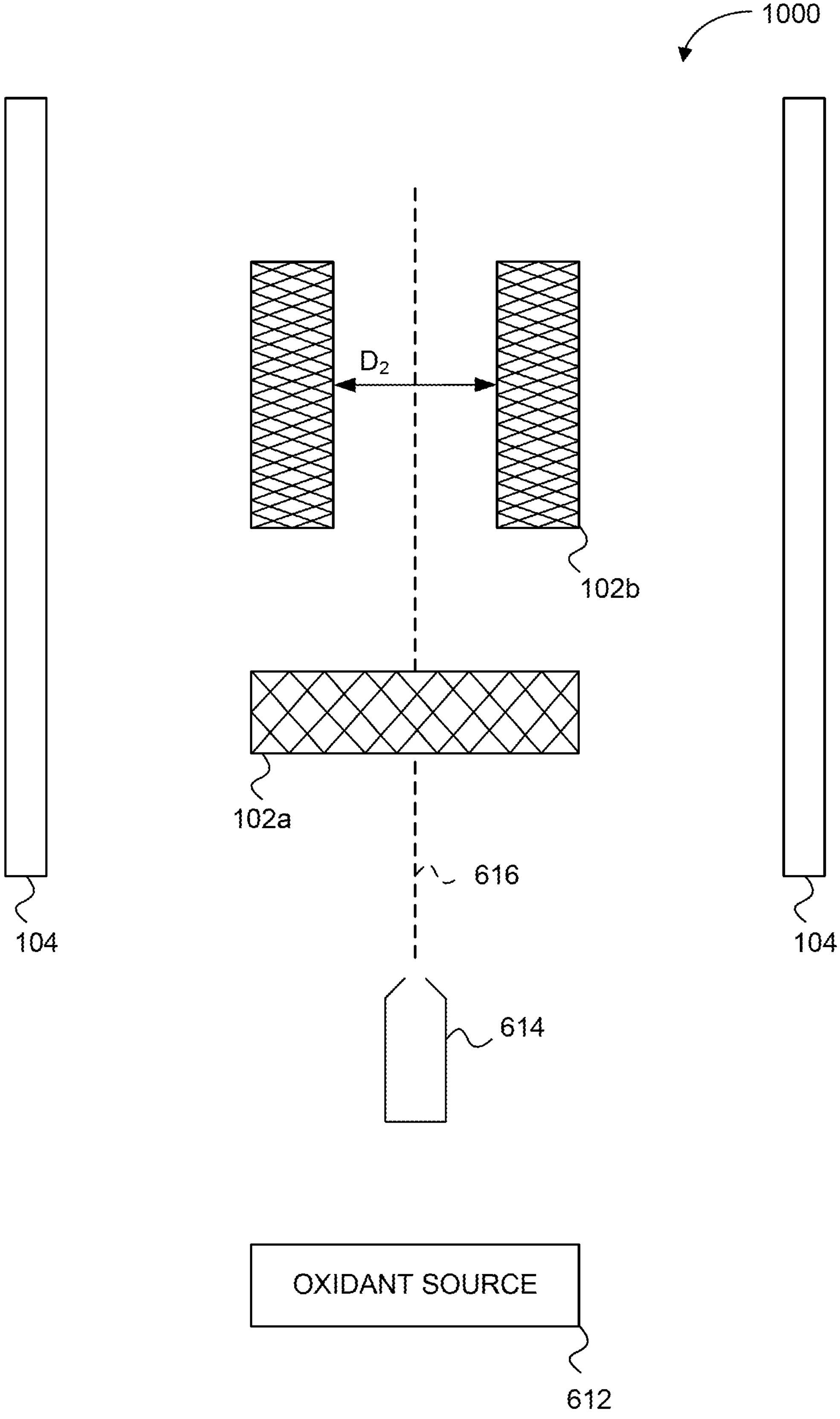
FIG. 10 is an illustration of a combustion system including multiple distal flame holder bodies, according to an embodiment.

FIG. 10 is an illustration of a combustion system 1000, according to one embodiment. The combustion system 1000 includes a first distal flame holder body 102*a*, multiple second distal flame holder bodies 102*b*, a thermal load 104, a fuel nozzle 614, and an oxidant source 612. The first distal flame holder body 102*a* is aligned with an axis 616. The second distal flame holder bodies 102*b* are oriented so that their input faces face in a direction transverse to the axis 616. The components of the combustion system 1000 cooperate together to support one or more combustion reactions, according to one embodiment.

According to an embodiment, the fuel nozzle 614 is configured to output a flow of fuel 620 (see FIGS. 6B-6D) toward the first distal flame holder body 102*a*.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory near to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 6B-6D) into a combustion environment including the fuel nozzle 614 and the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow oxidant 618 into the combustion environment. The oxidant 618 mixes with the flow of fuel 620 to form a flow of fuel and oxidant 106.

According to an embodiment, the first distal flame holder body 102*a* is aligned to receive the flow of fuel and oxidant 106 from the fuel nozzle 614 and the oxidant source 612. The first distal flame holder body 102*a* is configured to support a combustion reaction 108*a* (see FIG. 6B-6D) of the flow of fuel and oxidant 106 at least partially within the first distal flame holder body 102*a*.

According to an embodiment, the second distal flame holder body 102*b* is configured to receive combustion products 110 from the first combustion reaction 108*a*. Alternatively, or additionally, the second distal flame holder body 102*b* is configured to receive a portion of the flow of fuel and oxidant 106 via the first distal flame holder body 102*a*. The second distal flame holder body 102*b* configured to support a second combustion reaction 108*b* (see FIG. 6B-6D) from one or both of the combustion products 110 and the flow of fuel and oxidant 106.

According to an embodiment, the combustion system 1000 can include one or more preheating mechanisms to preheat the first distal flame holder body 102*a* and/or the second distal flame holder body 102*b* to a threshold temperature. According to an embodiment, the first combustion reaction 108*a* preheats the second distal flame holder body 102*b* to the threshold temperature.

According to an embodiment, the combustion system 1000 can operate in a first operational state in which the first distal flame holder body 102*a* holds a first combustion reaction 108*a* while the second distal flame holder bodies 102*b* hold comparatively little or no combustion reaction. According to an embodiment, the combustion system 1000 can operate in a second operational state in which the first distal flame holder body 102*a* holds a first combustion reaction 108*a* while the second distal flame holder bodies 102*b* hold a second combustion reaction 108*b*. According to an embodiment, the combustion system 1000 can operate in ⅓ operational state in which the second distal flame holder bodies 102*b* hold a second combustion reaction 108*b* while the first distal flame holder body 102*a* holds little or no combustion reaction.

Figure 11:
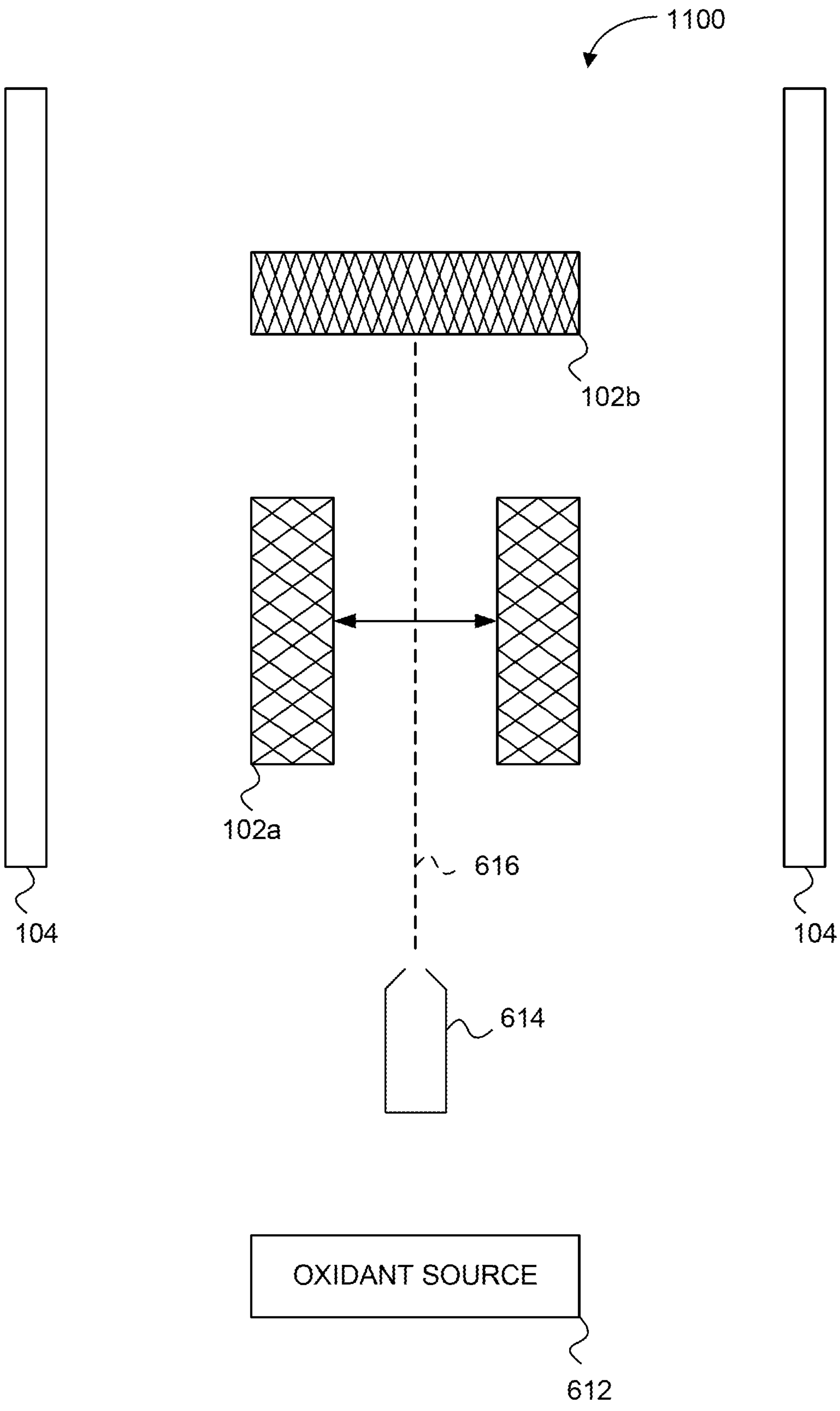
FIG. 11 is an illustration of a combustion system including multiple distal flame holder bodies, according to an embodiment.

FIG. 11 is an illustration of a combustion system 1100, according to one embodiment. The combustion system 1100 includes multiple first distal flame holder bodies 102*a*, a second distal flame holder body 102*b*, a thermal load 104, a fuel nozzle 614, and an oxidant source 612. The first distal flame holder bodies 102*a* are oriented peripheral to the axis 616 and with their input faces facing in a direction transverse to the direction of the axis 616. The second distal flame holder body 102*b* is aligned with the axis 616. The components of the combustion system 1100 cooperate together to support one or more combustion reactions, according to one embodiment.

According to an embodiment, the fuel nozzle 614 is configured to output a flow of fuel 620 (see FIGS. 6B-6D) toward the first distal flame holder bodies 102*a*.

According to an embodiment, the flow of fuel 620 is centered around the axis 616. According to an embodiment, the portions of the flow of fuel 620 that have a trajectory that diverges more from the axis 616 have a lower velocity than the portions of the flow of fuel 620 that have a trajectory near to the direction of the axis 616.

According to an embodiment, the fuel nozzle 614 can include multiple fuel nozzles 614 each configured to output a flow of fuel 620. The fuel nozzles 614 can be arranged about the axis 616, according to one embodiment.

According to an embodiment, the oxidant source 612 is configured to output an oxidant 618 (see FIG. 6B-6D) into a combustion environment including the fuel nozzle 614 and the first distal flame holder body 102*a*, and the second distal flame holder body 102*b*. According to an embodiment, the oxidant source 612 can draft the oxidant 618 into the combustion environment. According to an embodiment, the oxidant source 612 can include a blower configured to blow oxidant 618 into the combustion environment. The oxidant 618 mixes with the flow of fuel 620 to form a flow of fuel and oxidant 106.

According to an embodiment, the first distal flame holder bodies 102*a* are aligned to receive the flow of fuel and oxidant 106 from the fuel nozzle 614 and the oxidant source 612. The first distal flame holder bodies 102*a* are configured to support a first combustion reaction 108*a* (see FIG. 6B-6D) of the flow of fuel and oxidant 106 at least partially within the first distal flame holder body 102*a*.

According to an embodiment, the second distal flame holder bodies 102*b* are configured to receive combustion products 110 from the first combustion reaction 108*a*. Alternatively, or additionally, the second distal flame holder bodies 102*b* can be configured to receive a portion of the flow of fuel and oxidant 106 via the first distal flame holder bodies 102*a*. The second distal flame holder body 102*b* is configured to support a second combustion reaction 108*b* (see FIG. 6B-6D) from one or both of the combustion products 110 and the flow of fuel and oxidant 106.

According to an embodiment, the combustion system 1100 can include one or more preheating mechanisms to preheat the first distal flame holder bodies 102*a* and/or the second distal flame holder body 102*b* to a threshold temperature. According to an embodiment, the first combustion reaction 108*a* preheats the second distal flame holder bodies 102*b* to the threshold temperature.

According to an embodiment, the combustion system 1100 can operate in a first operational state in which the first distal flame holder bodies 102*a* hold a first combustion reaction 108*a* while the second distal flame holder body 102*b* holds comparatively little or no combustion reaction. According to an embodiment, the combustion system 1100 can operate in a second operational state in which the first distal flame holder body 102*a* holds a first combustion reaction 108*a* while the second distal flame holder body 102*b* holds a second combustion reaction 108*b*. According to an embodiment, the combustion system 1100 can operate in third operational state in which the second distal flame holder body 102*b* holds a second combustion reaction 108*b* while the first distal flame holder bodies 102*a* hold little or no combustion reaction.

Figure 12:
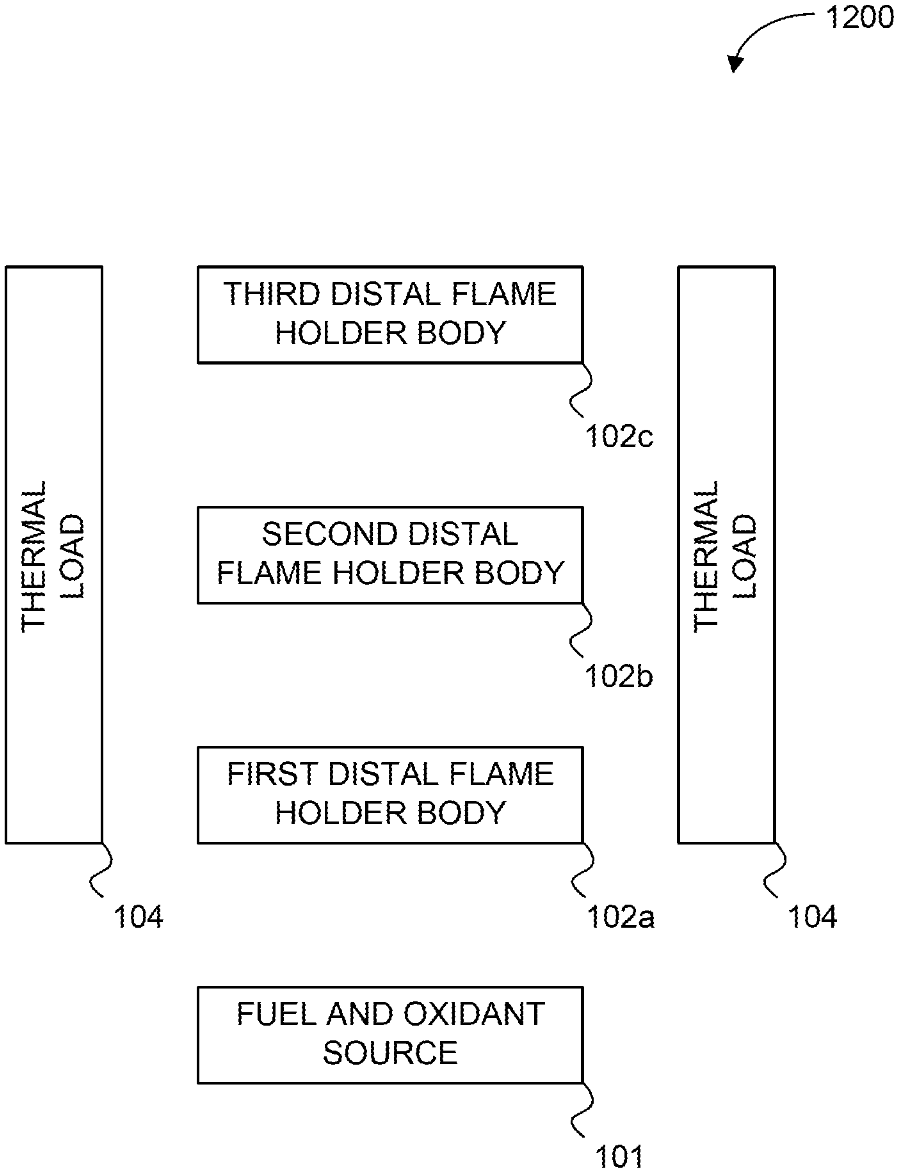
FIG. 12 is a block diagram of a combustion system including multiple distal flame holder bodies, according to an embodiment.

FIG. 12 is a block diagram of a combustion system 1200, according to one embodiment. The combustion system 1200 includes a first distal flame holder body 102*a*, a second distal flame holder body 102*b*, a third distal flame holder body 102*c*, a thermal load 104, and a fuel and oxidant source 101. The combustion system 1200 operates substantially similar to the combustion system 100 described with relation to FIG. 1. Each distal flame holder body 102*a*, 102*b*, 102*c* can hold a separate combustion reaction of the fuel and oxidant, of combustion products, or of a combination of combustion products and fuel and oxidant. According to an embodiment, the combustion system 1200 can operate in a first operational state in which only one of the distal flame holder bodies 102*a*, 102*b*, 102*c* holds a combustion reaction. According to an embodiment, the combustion system 1200 is configured to operate in an operational state in which two of the distal flame holder bodies 102*a*, 102*b*, 102*c* hold combustion reactions. According to an embodiment, the combustion system 1200 can operate in a third operational state in which all three of the distal flame holder bodies, 102*a*, 102*b*, 102*c* hold combustion reactions.

Figure 13:
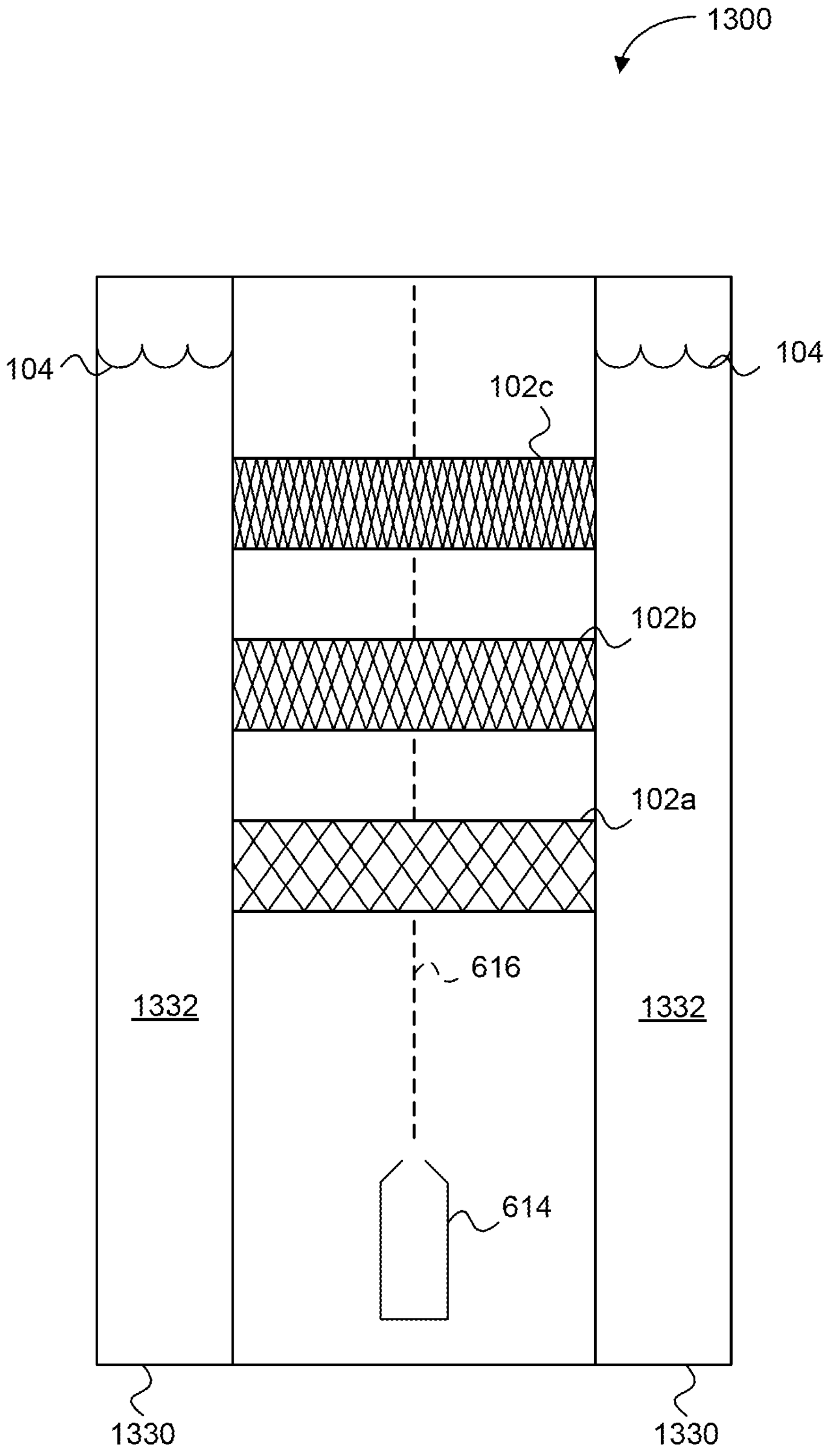
FIG. 13 is an illustration of a fire tube boiler including multiple distal flame holder bodies, according to an embodiment.

FIG. 13 is an illustration of a boiler combustion system 1300, according to an embodiment. The boiler includes a fluid compartment 1330 configured to hold the working fluid, such as water or steam. The water or steam, and the wall defining the fluid chamber, correspond to a thermal load 104. The boiler combustion system 1300 includes an interior chamber 1332. A first distal flame holder body 102*a*, a second distal flame holder body 102*b*, a third distal flame holder body 102*c*, and the fuel nozzle 614 are positioned within the interior chamber 1332 of the boiler combustion system 1300. The components of the boiler combustion system 1300 cooperate to hold combustion reactions in one or more of the first distal flame holder body 102*a*, the second distal flame holder body 102*b*, and the third distal flame holder body 102*c* in order to transfer heat to the thermal load 104, according to one embodiment.

According to an embodiment, the fuel nozzle 614, an oxidant source (not shown), and the first, second, and third distal flame holder bodies 102*a*, 102*b*, and 102*c* operate to support one or more combustion reactions as set forth in FIGS. 1A-12. Each distal flame holder body 102*a*, 102*b*, 102*c* can hold a separate combustion reaction of the fuel and oxidant, of combustion products, or of a combination of combustion products and fuel and oxidant. According to an embodiment, the boiler combustion system 1300 can operate in a first operational state in which only one of the distal flame holder bodies 102*a*, 102*b*, 102*c* holds a combustion reaction. According to an embodiment, the boiler combustion system 1300 is configured to operate in an operational state in which two of the distal flame holder bodies 102*a*, 102*b*, 102*c* hold combustion reactions. According to an embodiment, the boiler combustion system 1300 can operate in a third operational state in which all three of the distal flame holder bodies 102*a*, 102*b*, 102*c* hold combustion reactions.

According to an embodiment, the perforations of the first distal flame holder body 102*a* are relatively wide to enable a portion of the fuel and oxidant to pass to the second distal flame holder body 102*b*. According to an embodiment, the second distal flame holder body 102*b* has perforations that are narrower than the perforations of the first distal flame holder body 102*a*, but still wide enough to enable a portion of the flow of fuel and oxidant 106 the past to the third distal flame holder body 102*c*. According to an embodiment, the third distal flame holder body 102*c* has perforations that are narrower than the perforations of the first distal flame holder body 102*a* and the second distal flame holder body 102*b*.

Figure 14:
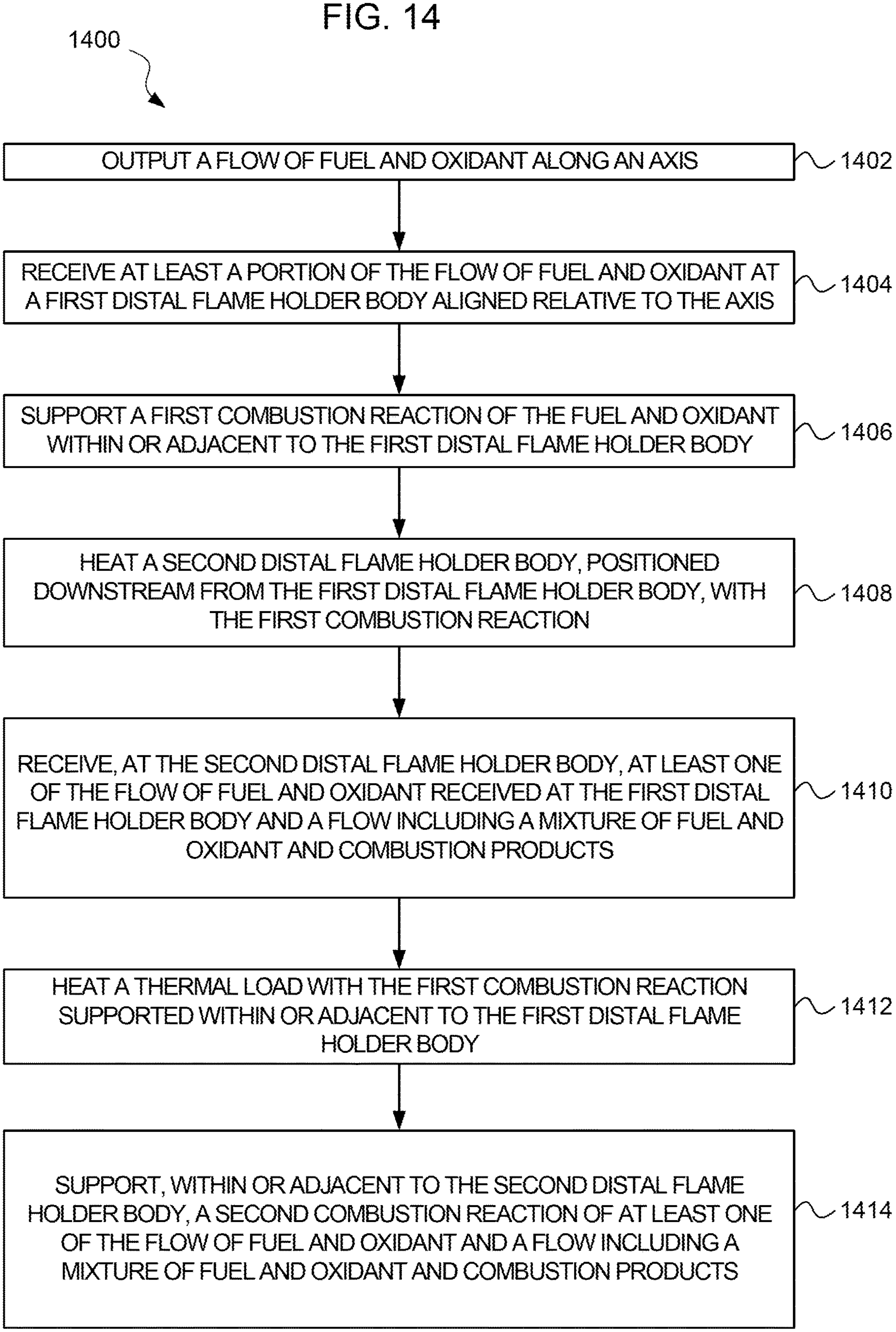
FIG. 14 is a flow diagram of a process for operating a combustion system including multiple distal flame holder bodies, according to an embodiment.

FIG. 14 is a flow diagram of a process 1400 for operating a combustion system, according to one embodiment. At 1402, a flow of fuel and oxidant is output along an axis, according to an embodiment. At 1404, at least a portion of the fuel and oxidant is received at a first distal flame holder body aligned relative to the axis, according to one embodiment. At 1406, a first combustion reaction of the fuel and oxidant is supported within or adjacent to the first distal flame holder body, according to an embodiment. At 1408, a second distal flame holder body positioned downstream from the first distal flame holder body is heated with the first combustion reaction held by the first distal flame holder body, according to one embodiment. At 1410, at least one of the flow of fuel and oxidant received at the first distal flame holder body and a flow including a mixture of fuel and oxidant and combustion products is received at the second distal flame holder body, according to one embodiment. At 1412, a thermal load is heated with the first combustion reaction supported within or adjacent to the first distal flame holder body, according to one embodiment. At 1414, a second combustion reaction of at least one of the flow of fuel and oxidant received at the first distal flame holder body and a flow including a mixture of fuel and oxidant and combustion products is supported within or adjacent to the second distal flame holder body, according to one embodiment.

Figure 15A:
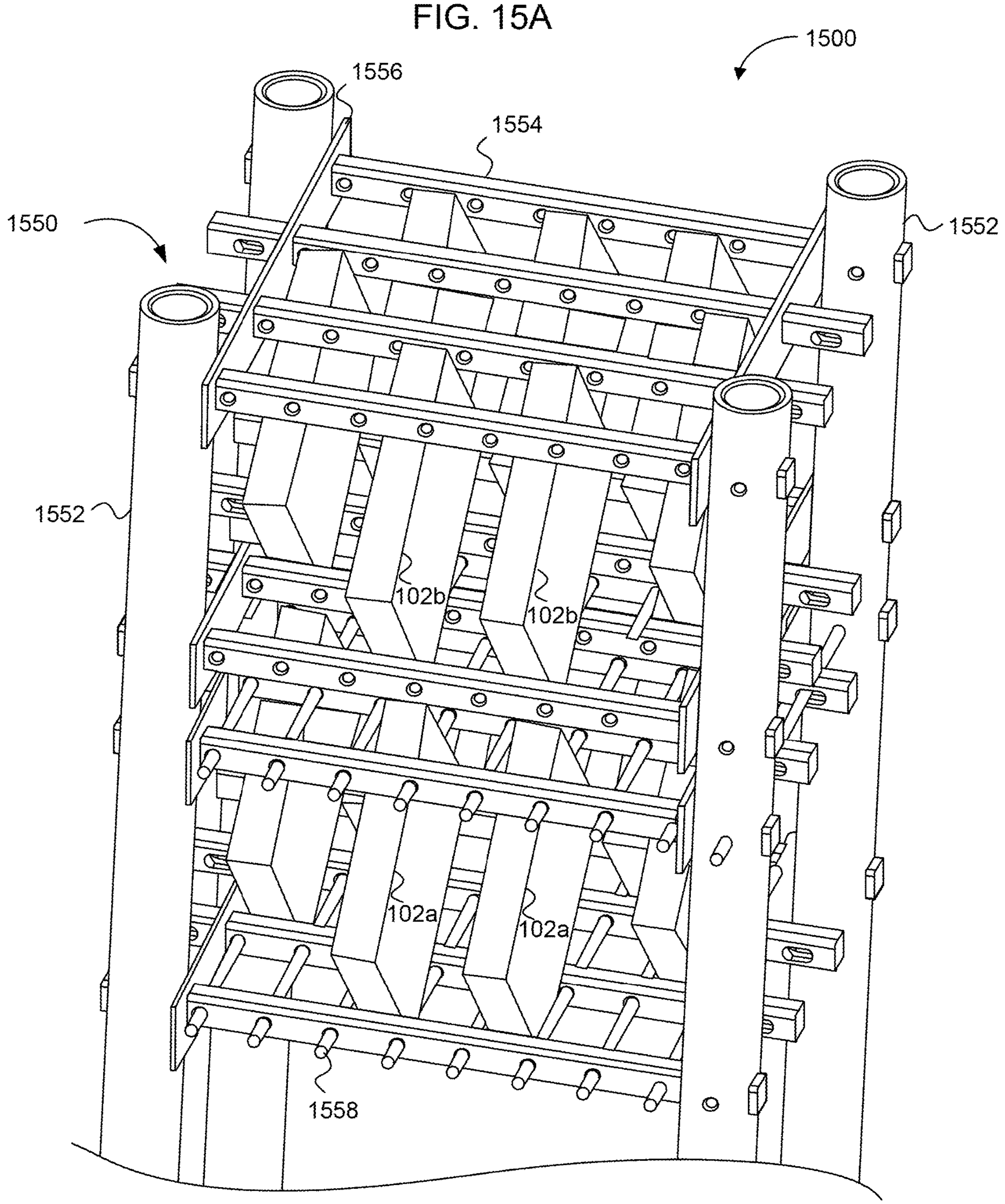
FIGS. 15A-15C are illustrations of various views of a combustion system including multiple distal flame holder bodies supported by a support structure, according to an embodiment.
Figure 15B:
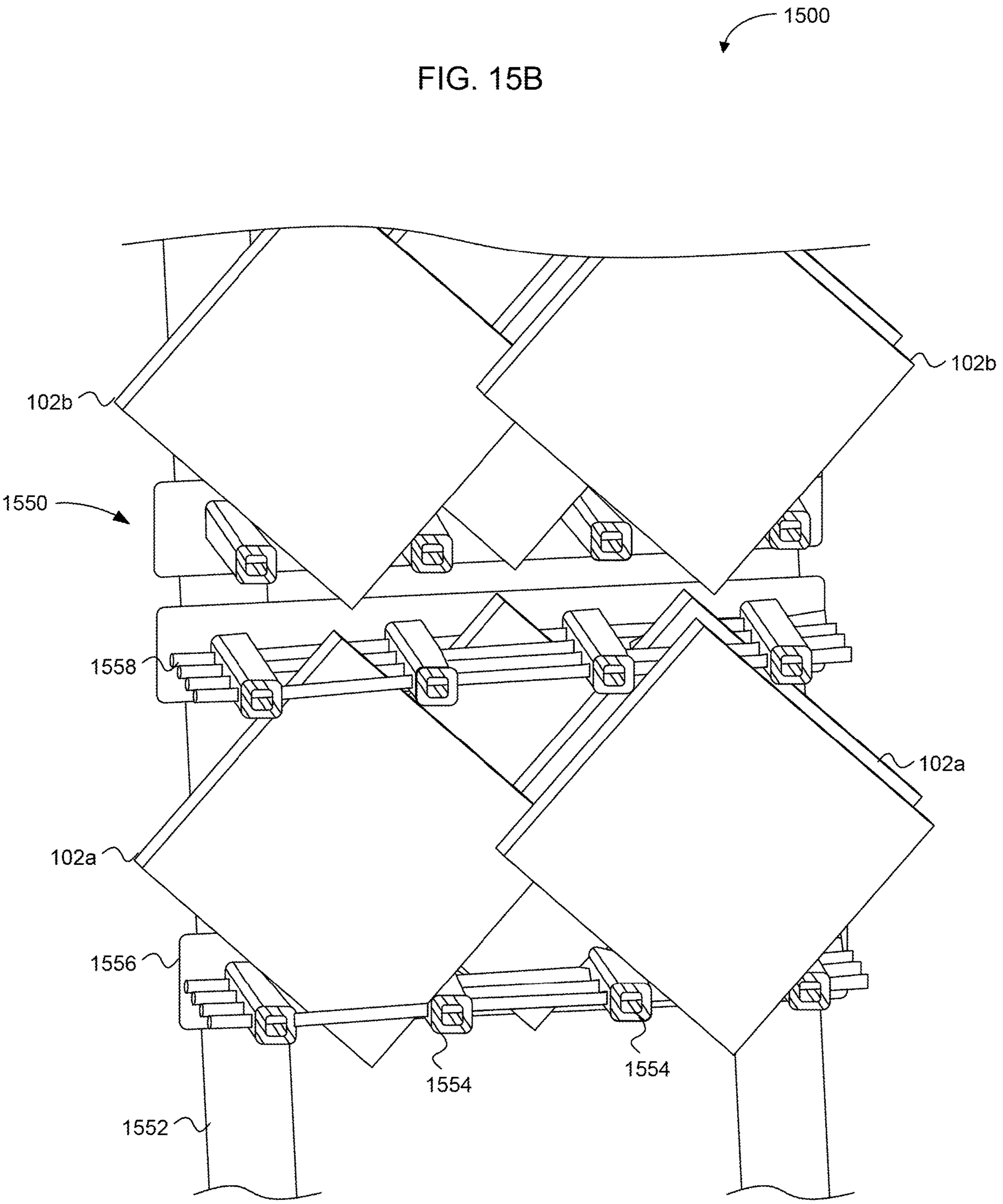
Figure 15C:
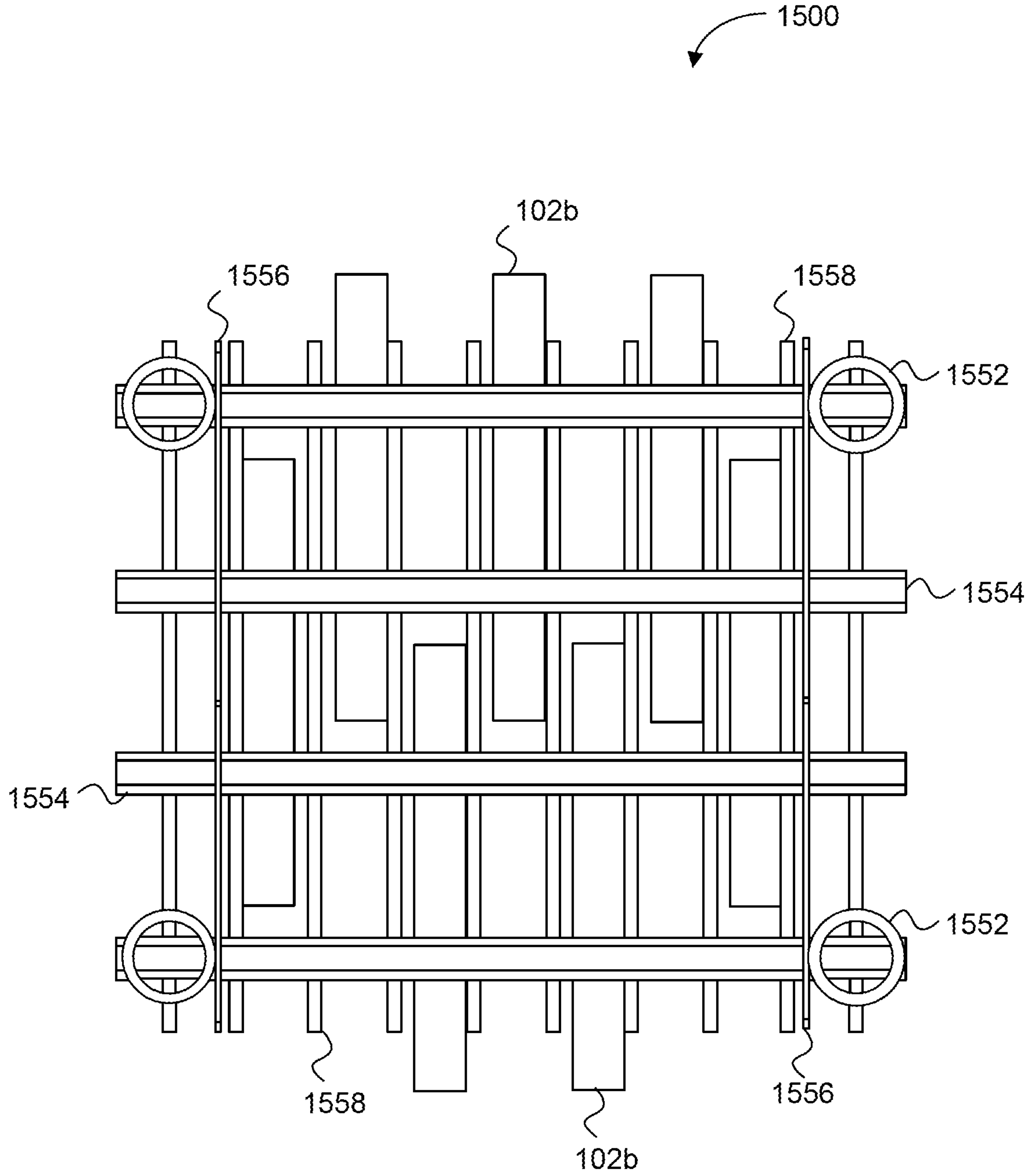

FIG. 15A-15C are illustrations of various views of a combustion system 1500, according to an embodiment. FIG. 15A is a perspective view of the combustion system 1500. The combustion system 1500 includes first distal flame holder bodies 102*a*, second distal flame holder bodies 102*b*, and a support structure 1550 supporting the distal flame holder bodies 102*a*, 102*b*. The first distal flame holder bodies 102*a* are positioned below the second distal flame holder bodies 102*b*. The first and second distal flame holder bodies 102*a*, 102*b* are each oriented vertically.

According to an embodiment, the combustion system 1500 can include a fuel and oxidant source 101 (not shown in FIGS. 15A-15C) positioned below the first distal flame holder bodies 102*a* and configured to output fuel and oxidant toward the first and second distal flame holder bodies 102*a*, 102*b*.

According to an embodiment, the combustion system 1500 can include one or more preheating mechanisms to preheat the first distal flame holder bodies 102*a* and/or the second distal flame holder bodies 102*b* to a threshold temperature. According to an embodiment, the first combustion reaction 108*a* (not shown in FIGS. 15A-15C) preheats the second distal flame holder bodies 102*b* to the threshold temperature.

According to an embodiment, the combustion system 1500 can operate in a first operational state in which the first distal flame holder bodies 102*a* hold a first combustion reaction 108*a* while the second distal flame holder bodies 102*b* hold comparatively little or no combustion reaction. According to an embodiment, the combustion system 1500 can operate in a second operational state in which the first distal flame holder body 102*a* holds a first combustion reaction 108*a* while the second distal flame holder bodies 102*b* hold a second combustion reaction 108*b* (not shown in FIGS. 15A-15C). According to an embodiment, the combustion system 1500 can operate in third operational state in which the second distal flame holder bodies 102*b* hold a second combustion reaction 108*b* while the first distal flame holder bodies 102*a* hold little or no combustion reaction.

According to an embodiment, the support structure 1550 can include support legs 1552, support beams 1554, support plates 1556, and support rods 1558 that collectively maintain a position of the first and second distal flame holder bodies 102*a*, 102*b* in a direction perpendicular to a primary direction of the flow of the fuel and oxidant. The support legs 1552 can extend upward from a floor of a furnace. The support beams 1554 can extend laterally and couple directly to the support legs 1552 or to the support plate 1556. The support plate 1556 can include slots that receive the support beams 1554. The support rods 1558 can extend perpendicularly to the support beams 1554. The support rods 1558 can be coupled to the support beams 1554. The support beams 1554 can include apertures that receive the support rods 1558.

According to an embodiment, the first distal flame holder bodies 102*a* can rest on a first set of support beams 1554. A second set of support beams 1554 can be positioned at an upper portion of the first distal flame holder bodies 102*a*. The second distal flame holder bodies 102*b* can rest on a third set of support beams 1554. A fourth set of support beams 1554 can be positioned at an upper portion of the second distal flame holder bodies 102*b*.

According to an embodiment, the support rods 1558 can laterally support the first and second distal flame holder bodies 102*a*, 102*b*. The support rods 1558 can be positioned at top and bottom portions of the first and second distal flame holder bodies 102*a*, 102*b* and can keep the first and second distal flame holder bodies 102*a*, 102*b* from shifting laterally and from tipping over.

According to an embodiment, the components of the support structure 1550 include one or more ceramic materials that maintain structural integrity in high temperature environments. According to an embodiment, one or more components of the support structure 1550 can include silicon carbide. According to an embodiment, one or more components of the support structure 1550 can include zirconia.

FIG. 15B is a partial side view of the combustion system 1500 of FIG. 15A, according to an embodiment.

FIG. 15C is a top view of the combustion system 1500 of FIG. 15A, according to an embodiment. In the top view of FIG. 15C, only the second distal flame holder bodies 102*b* are visible because the first distal flame holder bodies 102*a* are positioned below the second distal flame holder bodies 102*b*. Alternatively, the relative positions of the first and second distal flame holder bodies 102*a*, 102*b* can render the first distal flame holder bodies 102*a* visible in a top view, according to an embodiment.

Figure 16:
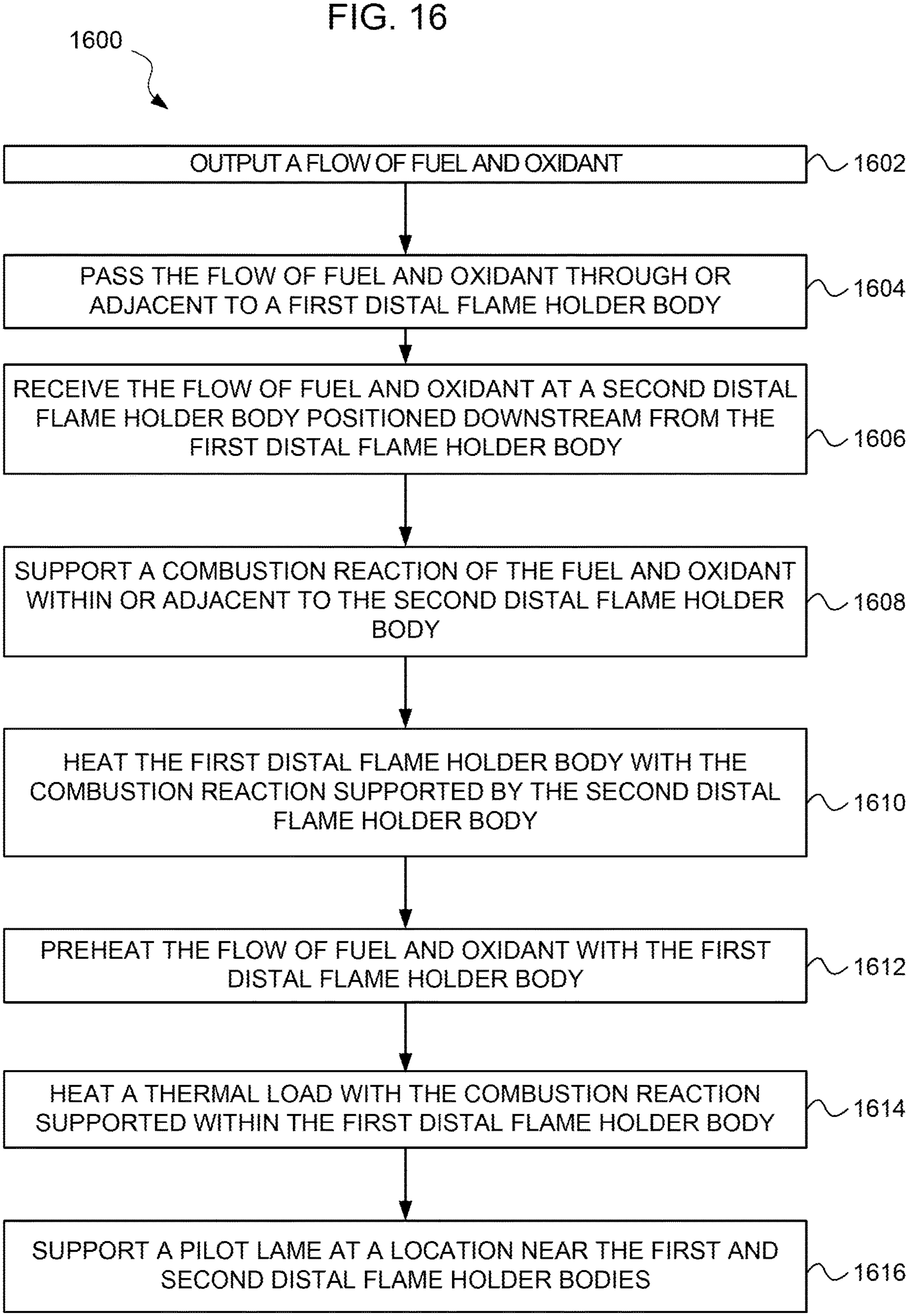
FIG. 16 is a flow diagram of a process for operating a combustion system including multiple distal flame holder bodies, according to an embodiment.

FIG. 16 is a flow diagram of a process 1600 for operating a combustion system, according to one embodiment. At 1602, a flow of fuel and oxidant is output, according to an embodiment. At 1604, the flow of fuel and oxidant is passed through or adjacent to a first distal flame holder body, according to an embodiment. At 1606, the flow of fuel and oxidant is received at a second distal flame holder body positioned downstream from the first distal flame holder body, according to an embodiment. At 1608, a combustion reaction of the fuel and oxidant is supported within or adjacent to the second distal flame holder body, according to an embodiment. At 1610, the first distal flame holder body is heated with the combustion reaction supported by the second distal flame holder body, according to an embodiment. At 1612, the flow of fuel and oxidant is preheated with the first distal flame holder body, according to an embodiment. At 1614, a thermal load is heated with the combustion reaction.

According to an embodiment, the process 1600 further includes heating the first distal flame holder body to a temperature equal to or greater than an autoignition temperature of the fuel, igniting a portion of the fuel with heat transferred from the first distal flame holder body to the fuel, and supporting first and second portions of the combustion reaction within or adjacent to each of the first and second distal flame holder bodies.

According to an embodiment, the process 1600 further includes, in step 1616, supporting a pilot flame at a location near the first and second distal flame holder bodies. The flow of fuel and oxidant may be ignited with the pilot flame. A pilot flame heat output may be maintained after a temperature of at least a portion of the first and second distal flame holder bodies reaches an autoignition temperature of the fuel. In an embodiment, supporting a pilot flame at a location near the first and second distal flame holder bodies includes providing a pilot burner disposed at a location near the first and second distal flame holder bodies.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:

a fuel and oxidant source configured to output a flow of fuel and oxidant along an axis;

a first distal flame holder body aligned to receive at least a portion of the flow of fuel and oxidant from the fuel and oxidant source;

a second distal flame holder body aligned to receive a fluid flow from the first distal flame holder body, the fluid flow including at least one of the flow of fuel and oxidant received by the first distal flame holder body, a flow of combustion products produced by combustion adjacent to the first distal flame holder body from the received flow of fuel and oxidant, and a flow including a mixture of fuel and oxidant and combustion products; and a thermal load disposed peripherally to the axis and the first and second distal flame holder bodies.

2. The combustion system of claim 1, further comprising:

a distal pilot burner disposed near the first and second distal flame holder bodies.

3. The combustion system of claim 1, wherein the first distal flame holder body supports at least a portion of combustion of the flow of fuel and oxidant from the fuel and oxidant source.

4. The combustion system of claim 1, wherein the first distal flame holder body transfers heat to the received flow of fuel and oxidant from the fuel and oxidant source.

5. The combustion system of claim 1, wherein the first distal flame holder body includes a perforated flame holder tile.

6. The combustion system of claim 1, wherein the second distal flame holder body includes a perforated flame holder tile.

7. The combustion system of claim 1, wherein the first distal flame holder body includes a solid bluff body.

8. The combustion system of claim 1, wherein the second distal flame holder body includes a solid bluff body.

9. The combustion system of claim 1, wherein the second distal flame holder body is configured to support combustion of the received fuel and oxidant.

10. The combustion system of claim 1, wherein the first distal flame holder body is aligned with the axis.

11. The combustion system of claim 1, wherein the first distal flame holder body is aligned peripheral to the axis.

12. The combustion system of claim 1, wherein the second distal flame holder body is aligned with the axis.

13. The combustion system of claim 1, wherein the second distal flame holder body is aligned peripheral to the axis.

14. The combustion system of claim 1, wherein a small thermal load causes the first distal flame holder body to retain heat sufficient to support combustion of the received fuel and oxidant within the first distal flame holder body.

15. The combustion system of claim 1, wherein a large thermal load causes the first distal flame holder body to retain heat insufficient to support combustion of the received fuel and oxidant within the first distal flame holder body.

16. The combustion system of claim 1, wherein the second distal flame holder body is configured to radiate heat energy to the first distal flame holder body when the second distal flame holder body supports combustion.

17. The combustion system of claim 1, further comprising multiple second distal flame holder bodies arranged around the axis.

18. The combustion system of claim 1, wherein the fuel includes hydrogen.

19. A method, comprising:

outputting a flow of fuel and oxidant along an axis;

receiving at least a portion of the flow of fuel and oxidant at a first distal flame holder body aligned relative to the axis;

supporting a first combustion reaction of the fuel and oxidant within or adjacent to the first distal flame holder body;

heating a second distal flame holder body, positioned downstream from the first distal flame holder body, with the first combustion reaction;

receiving, at the second distal flame holder body, at least one of the flow of fuel and oxidant received at the first distal flame holder body and a flow including a mixture of fuel and oxidant and combustion products;

heating a thermal load with the first combustion reaction supported within or adjacent to the first distal flame holder body; and supporting, within or adjacent to the second distal flame holder body, a second combustion reaction of at least one of the flow of fuel and oxidant and a flow including a mixture of fuel and oxidant and combustion products.

20. The method of claim 19, further comprising supporting the first and second combustion reactions substantially simultaneously.

21. The method of claim 19, further comprising supporting the first and second distal flame holder bodies with a support structure.

22. A combustion system, comprising:

a fuel and oxidant source configured to output a flow of fuel and oxidant;

at least one first distal flame holder body aligned to receive at least a portion of the flow of fuel and oxidant from the fuel and oxidant source and to hold a first portion of a combustion reaction of the fuel and oxidant within or adjacent to the at least one first distal flame holder body;

at least one second distal flame holder body positioned downstream from the at least one first distal flame holder body relative to the fuel and oxidant source and aligned to receive a fluid flow from one or both of the fuel and oxidant source and the at least one first distal flame holder body, the at least one second distal flame holder body being configured to hold a second portion of the combustion reaction supported by the fluid flow within or adjacent to the at least one second distal flame holder body; and a thermal load disposed peripherally to the first and second distal flame holder bodies and to receive heat from the respective first and second combustion reaction portions.

23. The combustion system of claim 22, wherein the fluid flow includes at least one of the flow of fuel and oxidant received by the at least one first distal flame holder body, a flow of combustion products produced by the first portion of the combustion reaction within or adjacent to the at least one first distal flame holder body and a mixture of fuel and oxidant.

24. The combustion system of claim 23, wherein the at least one first distal flame holder body transfers heat to the received flow of fuel and oxidant from the fuel and oxidant source.

25. The combustion system of claim 22, wherein in a first operational mode the at least one first distal flame holder body holds the first portion of the combustion reaction with an amount of heat output greater than 90% of the total of the first and second portions of the combustion reaction.

26. The combustion system of claim 25, wherein in a second operational mode the at least one first distal flame holder body and the at least one second distal flame holder body hold the respective first and second portions of the combustion reaction to each have appreciable heat outputs such that at least 20% of the total heat output is provided by the first portion and at least 20% of the total heat output is provided by the second portion of the combustion reaction.

27. The combustion system of claim 26, wherein in a third operational mode the at least one second distal flame holder body holds the second portion of the combustion reaction with an amount of heat output greater than 90% of the total of the first and second portions of the combustion reaction.

28. The combustion system of claim 22, wherein at least one of the at least one first distal flame holder bodies is oriented to have a longer dimension substantially parallel to a primary direction of the flow of fuel and oxidant.

29. The combustion system of claim 22, wherein at least one of the at least one first distal flame holder bodies is oriented to have a longer dimension substantially perpendicular to a primary direction of the flow of fuel and oxidant.

30. The combustion system of claim 22, wherein at least one of the at least one first distal flame holder bodies is oriented in a diamond orientation having two longer dimensions disposed at about 45 degrees to a primary direction of the flow of the fuel and oxidant, and a shorter dimension disposed perpendicular to the primary direction of the flow of the fuel and oxidant.

31. The combustion system of claim 22, wherein the at least one first distal flame holder body is oriented substantially perpendicular to an orientation of the at least one second distal flame holder body.

32. The combustion system of claim 22, wherein the at least one second distal flame holder body is oriented to have a longer dimension substantially parallel to a primary direction of the flow of fuel and oxidant.

33. The combustion system of claim 22, wherein the at least one second distal flame holder body is oriented to have a longer dimension substantially perpendicular to a primary direction of the flow of fuel and oxidant.

34. The combustion system of claim 22, wherein the at least one second distal flame holder body is oriented in a diamond orientation having two longer dimensions disposed at about 45 degrees to a primary direction of the flow of the fuel and oxidant, and a shorter dimension disposed perpendicular to the primary direction of the flow of the fuel and oxidant.

35. The combustion system of claim 22, further comprising a support structure configured to support the first and second distal flame holder bodies relative to the fuel and oxidant source.

36. The combustion system of claim 35, wherein the support structure includes a ceramic material.

37. The combustion system of claim 36, wherein the support structure includes at least one of zirconia or silicon carbide.

38. The combustion system of claim 35, wherein the support structure includes:

support legs extending upward from a furnace floor; and support beams extending laterally and coupled to the support legs;

wherein the first and second distal flame holder bodies are supported by the support beams.

39. The combustion system of claim 38, wherein the support structure includes support rods that maintain a position of the first and second distal flame holder bodies in a direction perpendicular to a primary direction of the flow of the fuel and oxidant.

40. The combustion system of claim 39, wherein the support rods are coupled to the support beams.

41. A method comprising:

outputting a flow of fuel and oxidant;

passing the flow of fuel and oxidant through or adjacent to a first distal flame holder body;

receiving the flow of fuel and oxidant at a second distal flame holder body positioned downstream from the first distal flame holder body;

supporting a combustion reaction of the fuel and oxidant within or adjacent to the second distal flame holder body;

heating the first distal flame holder body with the combustion reaction supported by the second distal flame holder body; and preheating the flow of fuel and oxidant with the first distal flame holder body.

42. The method of claim 41, further comprising:

heating the first distal flame holder body to a temperature equal to or greater than an autoignition temperature of the fuel;

igniting a portion of the fuel with heat transferred from the first distal flame holder body to the fuel; and supporting first and second portions of the combustion reaction within or adjacent to each of the first and second distal flame holder bodies.

43. The method of claim 41, further comprising:

heating a thermal load with the combustion reaction.

44. The method of claim 41, further comprising:

supporting a pilot flame at a location near the first and second distal flame holder bodies.

45. The method of claim 44, further comprising:

igniting the flow of fuel and oxidant with the pilot flame.

46. The method of claim 44, further comprising:
maintaining a pilot flame heat output after a temperature of at least a portion of the first and second distal flame holder bodies reaches an autoignition temperature of the fuel.

47. The method of claim 44, wherein supporting a pilot flame at a location near the first and second distal flame holder bodies includes providing a pilot burner disposed at a location near the first and second distal flame holder bodies.

48. A combustion system, comprising:
a fuel and combustion air source; and
a distal flame holder complex configured to receive a fuel and combustion air mixture and provide adaptive combustion reaction positioning responsive to fuel flow, temperature, and thermal load conditions.

49. The combustion system of claim 48, further comprising:
a thermal load configured to receive heat energy from a combustion reaction collectively held by the distal flame holder complex.

50. The combustion system of claim 48, further comprising:
a distal pilot burner configured to maintain a source of ignition for the fuel and combustion air mixture.

* * * * *